US008885979B2

(12) United States Patent
Machitani et al.

(10) Patent No.: US 8,885,979 B2
(45) Date of Patent: Nov. 11, 2014

(54) APPARATUS AND ASSOCIATED METHODOLOGY FOR ANALYZING SUBJECT MOTION IN IMAGES

(75) Inventors: Yasufumi Machitani, Tokyo (JP); Hiroyuki Watanabe, Kanagawa (JP)

(73) Assignee: Sony Corporation, Tokyo (JP)

( * ) Notice: Subject to any disclaimer, the term of this patent is extended or adjusted under 35 U.S.C. 154(b) by 261 days.

(21) Appl. No.: 13/277,402

(22) Filed: Oct. 20, 2011

(65) Prior Publication Data

US 2012/0106869 A1 May 3, 2012

(30) Foreign Application Priority Data

Oct. 27, 2010 (JP) ................ P2010-240299

(51) Int. Cl.
*G06K 9/36* (2006.01)
*H04N 5/232* (2006.01)

(52) U.S. Cl.
CPC ................ *H04N 5/23254* (2013.01)
USPC ...................................................... 382/284

(58) Field of Classification Search
None
See application file for complete search history.

(56) References Cited

U.S. PATENT DOCUMENTS

| | | | | |
|---|---|---|---|---|
| 5,947,742 | A * | 9/1999 | Katayama | 434/247 |
| 2002/0001449 | A1* | 1/2002 | Sato et al. | 386/46 |
| 2004/0125115 | A1* | 7/2004 | Takeshima et al. | 345/634 |
| 2006/0008116 | A1* | 1/2006 | Kiraly et al. | 382/103 |
| 2009/0042627 | A1* | 2/2009 | Nicora | 463/2 |
| 2010/0039447 | A1* | 2/2010 | Nakao | 345/634 |
| 2010/0151957 | A1* | 6/2010 | Hohla et al. | 473/221 |
| 2012/0105657 | A1* | 5/2012 | Yokohata et al. | 348/208.4 |

FOREIGN PATENT DOCUMENTS

| | | |
|---|---|---|
| JP | 2004-186994 | 7/2004 |
| JP | 2006-195525 | 7/2006 |
| JP | 2010-45727 | 2/2010 |

OTHER PUBLICATIONS

Bradwell, Jason, "Stroboscopic Golf," http://www.dpchallenge.com/image.php?IMAGE_ID=400637 (Sep. 24, 2006).*
Theobalt, Christian, et al. "Pitching a baseball: tracking high-speed motion with multi-exposure images." ACM Transactions on Graphics (TOG). vol. 23. No. 3. ACM, 2004.*
ProjectCOE, "E3 2010—Hands-on: Kinect Bowling," http://www.youtube.com/watch?v=KFLIhn0oMpA (Jun. 16, 2010).*
DeadSolidGolf.com, "Swing Analysis," Jun. 12, 2009, http://web.archive.org/web/20090612235843/http://www.deadsolidgolf.com/swingAnalysis.html.*
Office Action issued Jun. 17, 2014, in Japanese Patent Application No. 2010-240299 filed Oct. 27, 2010.

* cited by examiner

*Primary Examiner* — Bhavesh Mehta
*Assistant Examiner* — Andrew Moyer
(74) *Attorney, Agent, or Firm* — Oblon, Spivak, McClelland, Maier & Neustadt, L.L.P.

(57) ABSTRACT

An image processing apparatus includes circuitry that inputs frame image data and generates motion transition image data. The motion transition data expresses motion transition of a moving subject as moving subject images sequentially arranged side by side in a predetermined direction. The moving subject images are included in a plurality of frame image data and used to generate moving object image data expressing a moving object that moves according to the motion transition of the moving subject images. The circuitry then performs a composition process that generates moving object image-attached motion transition image data including the moving object images by composing the moving object image data and the motion transition image data.

18 Claims, 33 Drawing Sheets

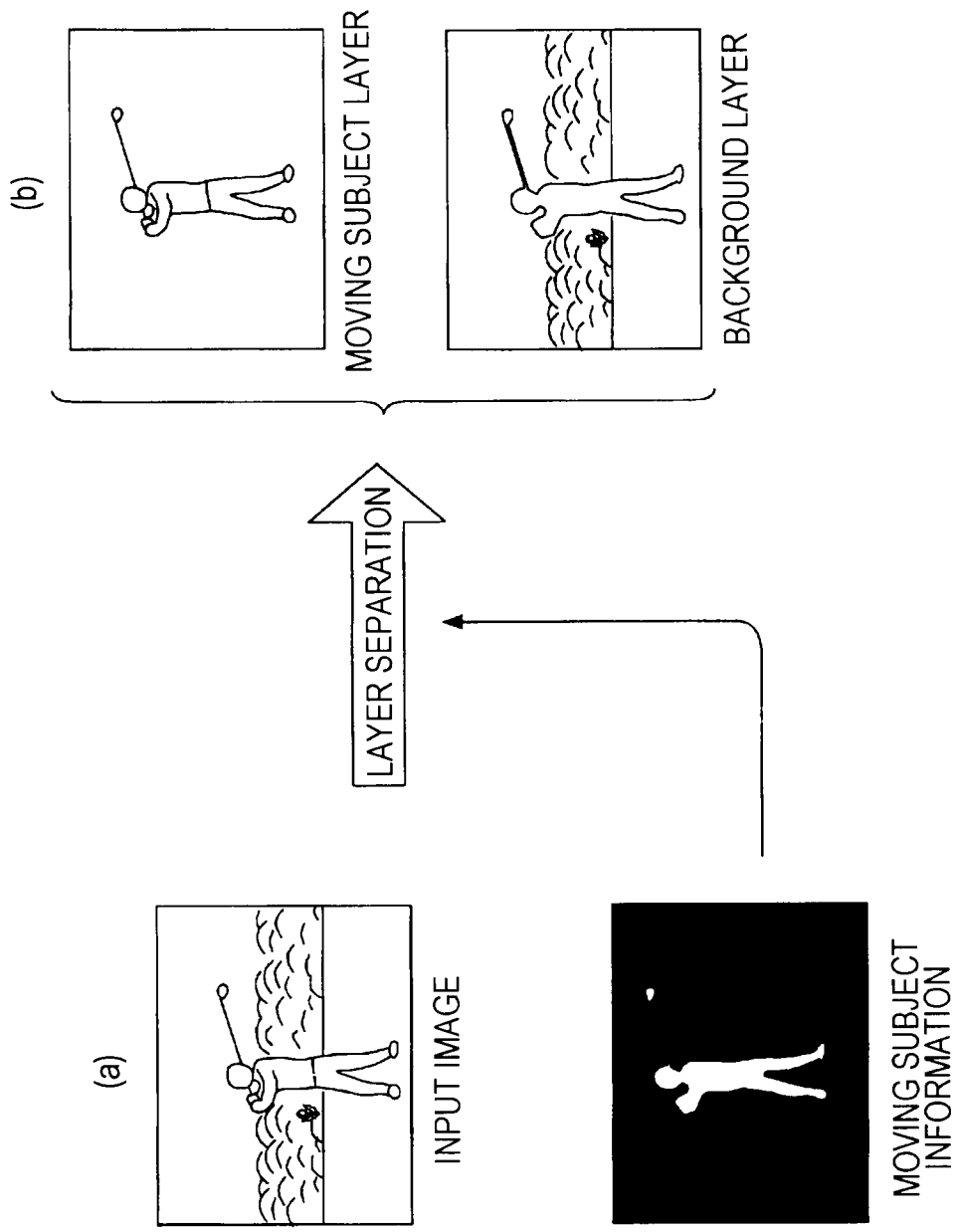

INPUT IMAGE

TRANSITION MOTION
EFFECTIVE AREA

REMAINING
BACKGROUND AREA

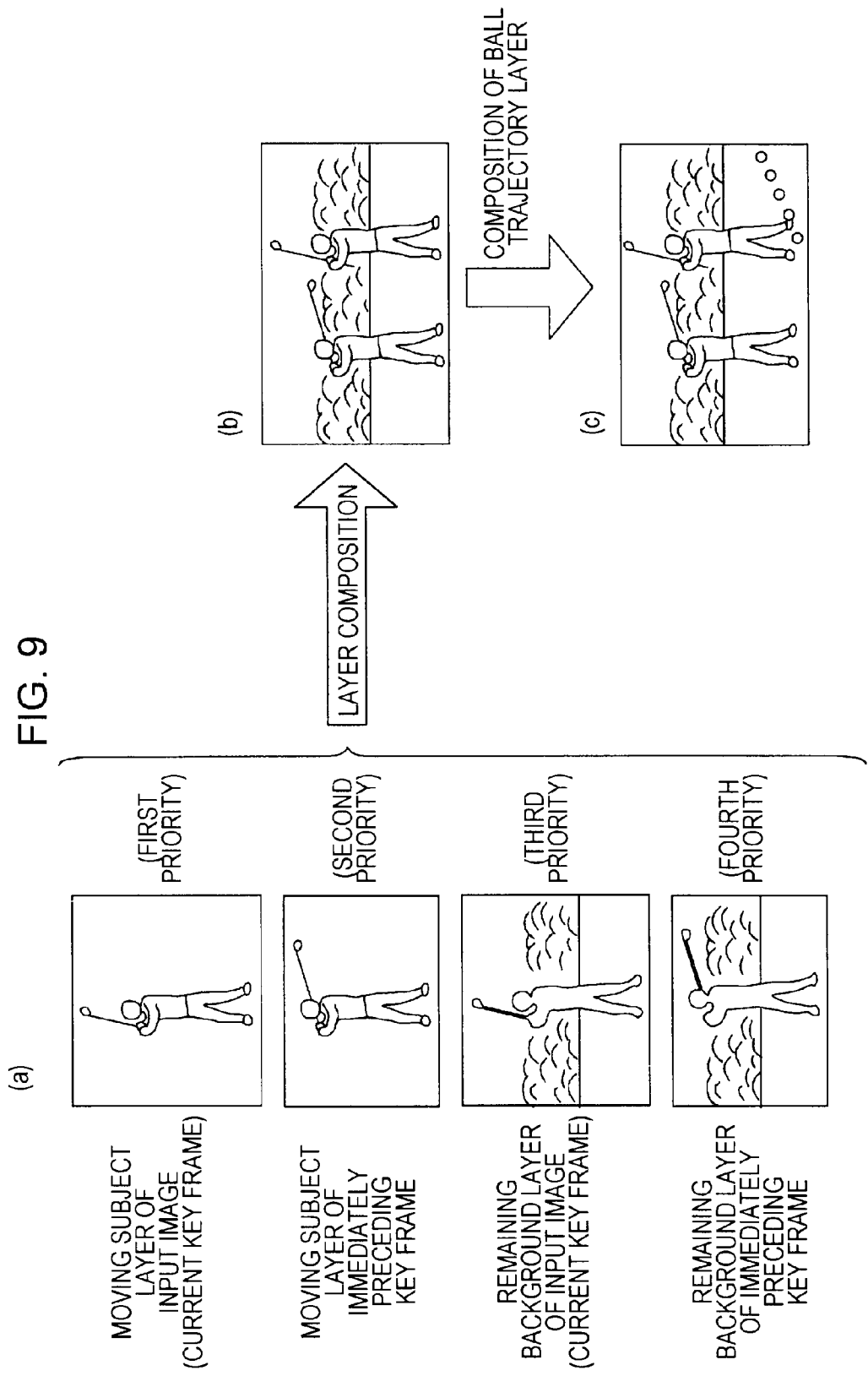

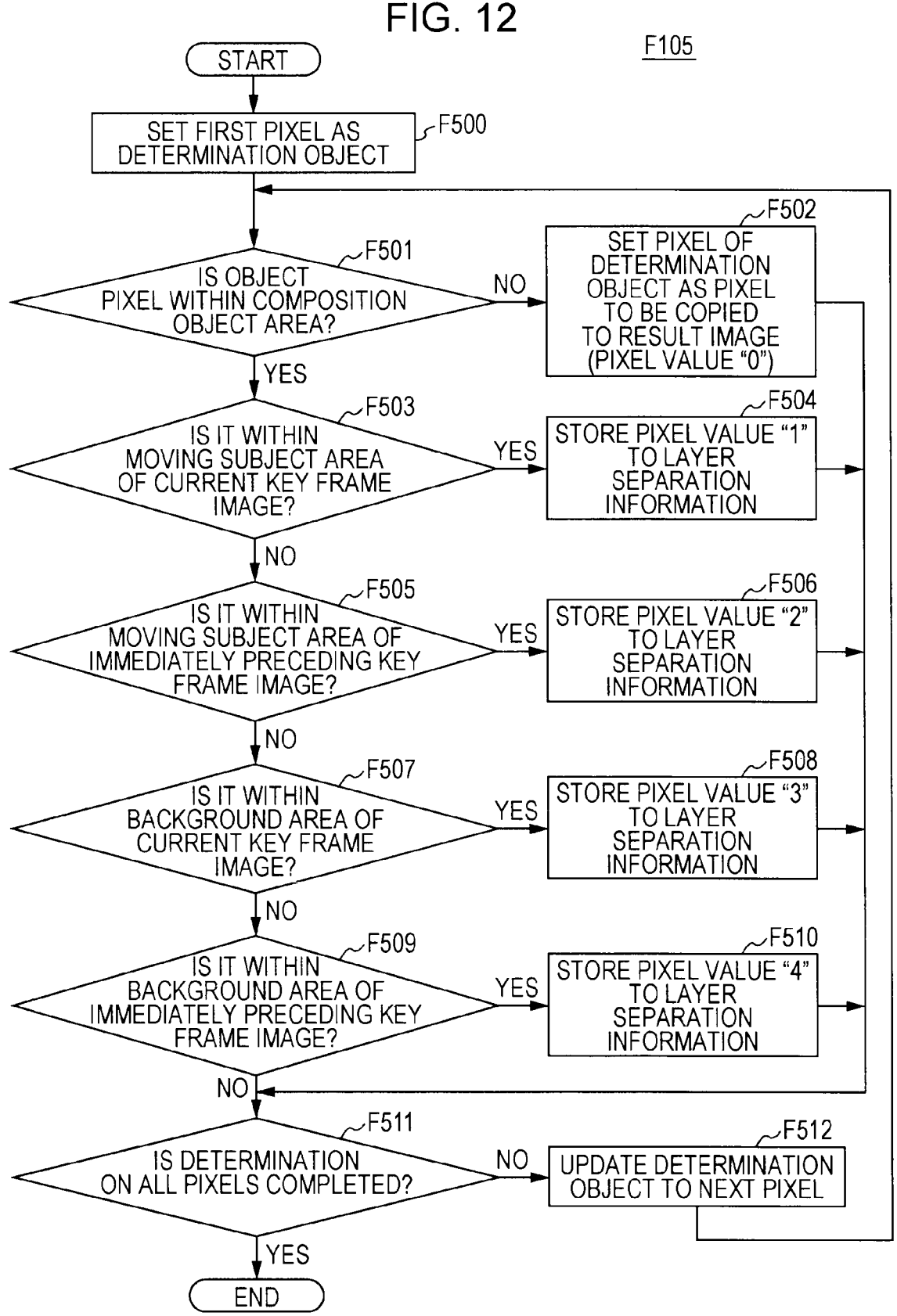

INPUT IMAGE

TRANSITION MOTION
EFFECTIVE AREA

APPARATUS AND ASSOCIATED METHODOLOGY FOR ANALYZING SUBJECT MOTION IN IMAGES

BACKGROUND

The present disclosure relates to an image processing apparatus, an image processing method, and a program, and more particularly, to a technology capable of obtaining a motion transition image expressing a motion transition of a subject.

As described in Japanese Unexamined Patent Application Publication No. 2010-45727, a method of appropriately expressing a sufficient motion expression and a motion range of a moving subject by using a plurality of frame images is disclosed. For example, it is possible to generate a motion transition image shown in FIG. 32.

Such a motion transition image is made by clipping the person or object (moving subject) performing the motion at a characteristic time (key frame), and by spatially arranging the clipped images to allow motion transition to be easily recognized. This technology has a characteristic of generating a spatially moved image, even though the moving subject does not spatially move.

In the case of FIG. 32, a moving picture is captured with a subject person performing a golf swing set as a moving subject, and thereby a plurality of frame image data is obtained. Several key frames are taken from the series of frame image data, and image composition is performed such that the image of the moving subject of each key frame is sequentially arranged in a predetermined direction. Therefore, it is possible to obtain an image capable of showing a golf swing form at a glance.

SUMMARY

This motion transition image is effective for use starting with golf, but also for form confirmation in baseball, soccer, tennis, or the like.

However, this image is appropriate for the form confirmation, but it is difficult to express a moving object that moves according to the motion transition.

For example, in the case of the motion transition image of the golf swing form shown in FIG. 32, a golf ball is captured until the moment of impact when a head of a golf club comes into contact with the ball, but after the impact, the ball is not captured and disappears from the image.

The motion transition image is not only for the form confirmation, and this image is interesting enough that it may be considered for use by a user as an image to be enjoyed. From this viewpoint, it may be more appropriate in a case where the ball hit by the subject person is expressed in the image.

The reason why the ball disappears after impact in an example of FIG. 32 is that the ball takes off immediately after the impact with a high speed, and instantaneously becomes out of frame from a screen during image-capturing, and therefore the ball is not captured.

Therefore, when it is intended for the ball to remain in the image, it is considered that frames immediately after the impact are extracted among the serial frame image data and are composed. In this case, the ball that is not yet out of frame is captured on an image portion of several frames immediately after the impact, such that it is possible to allow the ball that begins to move to be included in the motion transition image to an extent similar to the example shown in FIG. 33.

However, on the contrary, in regard to the motion transition image similar to FIG. 33, it becomes difficult to understand the motion transition of the moving subject. Particularly, the number of images of the moving subject immediately after the impact immoderately increases, such that there is concern that it may be difficult to express a smooth motion transition.

In addition, even though the ball is captured to a certain extent, batting is fast and there are a few frames of image data in which the ball is present, such that it is difficult to allow a ball trajectory to be clearly seen in terms of an image, and it is inefficient as an expression of the ball.

Therefore, it is desirable to produce a more effective image and a highly interesting image by sufficiently expressing a moving object (for example, a ball) that moves according to a motion transition of a moving subject while satisfactorily expressing the motion transition of the moving subject.

According to an embodiment of the present disclosure, there is provided an image processing apparatus including an image input unit that inputs frame image data; and a composition processing unit that generates motion transition image data expressing a motion transition of a moving subject in such a manner that a plurality of moving subject images are sequentially arranged side by side in a predetermined direction by performing a composition process using moving subject images included in a plurality of frame image data that is input by the image input unit, generates moving object image data expressing a moving object that moves according to the motion transition of the moving subject images, and performs a composition process that generates a moving object image-attached motion transition image data including the moving object images by composing the moving object image data and the motion transition image data.

In addition, the composition processing unit may generate a moving object trajectory image data based on a trajectory determining process on the moving object as the moving object image data, compose the moving object trajectory image data with the moving transition image data, and generate the moving object image-attached motion transition image data.

In addition, the trajectory determining process on the moving object may include a process of predicting, by using a location of the moving object image present in the input frame image data, a location of the moving object after a point in time when the moving object is expressed by the frame image data, and of determining a movement trajectory of the moving object.

In addition, the trajectory determining process on the moving object may be a process of determining a movement trajectory of the moving object based on moving object trajectory information that is input.

In addition, the trajectory determining process on the moving object may be a process of analyzing a moving subject motion expressed by the motion transition image data, and of determining a movement trajectory of a moving object that is not present in the input frame image data as an image.

In addition, the image processing apparatus may further include an image output unit that outputs the moving object image-attached motion transition image data that is generated in the composition processing unit.

In addition, the composition processing unit may perform the composition process of the moving object trajectory image data and the motion transition image data in such a manner that the moving object image is arranged at an image area subsequent to a final moving subject image of the plurality of moving subject images that is sequentially arranged side by side in a predetermined direction.

In this case, the composition processing unit may perform the composition process by using a background image included in the frame image data as a background image of an image area in which the moving object image is arranged.

In addition, the composition processing unit may perform the composition process by using a background image not included in the frame image data as a background image of an image area in which the moving object image is arranged.

In addition, the image processing apparatus may further include a designation unit that designates the final moving subject image of the plurality of moving subject images that is sequentially arranged side by side in a predetermined direction, and the composition processing unit may generate a motion transition image data until the final moving subject image designated by the designation unit, and perform the composition process of the moving object trajectory image data and the motion transition image data in such a manner that a moving object image according to the moving object image data is disposed at an image area subsequent to the final moving subject image.

In addition, the image processing apparatus may further include a designation unit that designates an image area in which the moving object image is disposed, and the composition processing unit may perform the composition process of the moving object trajectory image data and the motion transition image data in such a manner that the plurality of moving subject images are arranged side by side in an image area until reaching the image area designated by the designation unit, and the moving object image according to the moving object image data is arranged in the designated image area that is subsequent to the final moving subject image.

In addition, the composition processing unit may perform the composition process of the moving object trajectory image data and the motion transition image data in such a manner that the moving object image is arranged to overlap on the plurality of moving subject images that is sequentially arranged side by side in a predetermined direction.

In this case, the composition processing unit may generate, through the composition process, the moving object image-attached motion transition image data in which the image according to the moving object trajectory image data is displayed in preference to the image of the motion transition image data.

In addition, the image processing apparatus may further include a designation unit that designates one subject image among the plurality of moving subject images that is sequentially arranged side by side in a predetermined direction, and the composition processing unit may perform a composition process of an enlarged image of the moving subject image designated by the designation unit and the moving object trajectory image data.

In addition, the composition processing unit may generate the moving object trajectory image data by using a moving object image included in the input frame image data.

In addition, the composition processing unit may generate the moving object trajectory image data by using an image other than a photographed moving object image included in the input frame image data.

In addition, the composition processing unit may generate the motion transition image data by selecting a plurality of key frames from the input frame image data, and by sequentially arranging moving subject images extracted from the selected plurality of key frames side by side in a predetermined direction.

In addition, the composition processing unit may generate the motion transition image data by performing the composition process in a state where a moving subject layer of the newest input frame image data has a first priority, a moving subject layer of the frame image data according to a immediately preceding composition process has a second priority, a background layer of the newest input frame image data has a third priority, and a background layer of the frame image data according to the immediately preceding composition process has a fourth priority.

According to another embodiment of the present disclosure, there is provided an image processing method including generating motion transition image data expressing a motion transition of a moving subject in such a manner that moving subject images are sequentially arranged side by side in a predetermined direction by performing a composition process using the moving subject images included in a plurality of frame image data that is input; generating moving object image data expressing a moving object that moves according to the motion transition of the moving subject images; and performing a composition process that generates a moving object image-attached motion transition image data including the moving object images by composing the moving object image data and the motion transition image data.

According to still another embodiment of the present disclosure, there is provided a program that allows a calculation processing device to execute each step described above.

According to the embodiments of the present disclosure, first, the composition process using the moving subject image included in the plurality of frame image data that is input is performed, and the motion transition image data expressing a motion transition of a moving subject in such a manner that moving subject images are sequentially arranged side by side in a predetermined direction is generated. Therefore, it is possible to exactly express the motion transition of the moving subject. In addition, a moving object image expressing a moving object (for example, a ball hit by the motion of the moving subject, or the like) that moves according to the motion transition of the moving subject is generated. This moving object image includes a moving object trajectory image that expresses a moving object trajectory that is estimated, or the like. In this configuration, an image that is not actually present in the frame image data is used and is set as an image allowing the motion of the moving object to be clearly understood.

In addition, the moving object image is composed with the motion transition image, and thereby the moving object image-attached motion transition image data is generated, but the motion transition of the moving subject and the movement of the moving object are each sufficiently expressed.

According to the embodiments of the present disclosure, it is possible to produce a more effective image and a highly interesting image by sufficiently expressing a moving object (for example, a ball) that moves according to a motion transition of a moving subject while efficiently expressing the motion transition of the moving subject.

BRIEF DESCRIPTION OF THE DRAWINGS

FIGS. 6A and 6B are explanatory views illustrating a layer separation process according to an embodiment;

FIGS. 9A to 9C are explanatory views illustrating a layer composition process of four layers and a composition process of a ball trajectory layer according to an embodiment;

FIG. 12 is a flow chart of a layer separation process according to an embodiment;

DETAILED DESCRIPTION OF EMBODIMENTS

Hereinafter, embodiment of the present disclosure will be described in the following order.
1. Basic configuration and Motion of Embodiment
2. First Embodiment
2-1. Configuration of Image Processing Apparatus
2-2. Production of Moving Object Image-attached Operation Transition Image
2-3. Process Example
3. Second Embodiment
4. Third Embodiment
5. Fourth Embodiment
6. Fifth Embodiment
7. Sixth Embodiment
8. Seventh Embodiment
9. Eighth Embodiment
10. Modification
11. Program 1. Basic Configuration and Motion of Embodiment First, a basic configuration and a motion of an image processing device and an image processing method of an embodiment of the present disclosure will be described.

The image processing apparatus of an embodiment may be mounted on various devices, for example, an information processing device such as a digital still camera, a video camera, an image editing device, an image reproducing device, an image recording device, and a computer, or the like.

In addition, the image processing apparatus of the embodiment may be configured by hardware, or may be realized in a type of software installed on a computer or the like, firmware embedded in various devices, or the like. In addition, a part of a configuration may be configured by hardware and a part thereof may be configured by software. In a case where the image processing apparatus is realized by software, this software may be configured by a program for executing steps of an image processing method of the embodiment, and this program itself may be provided or put on the market.

Figure 1:
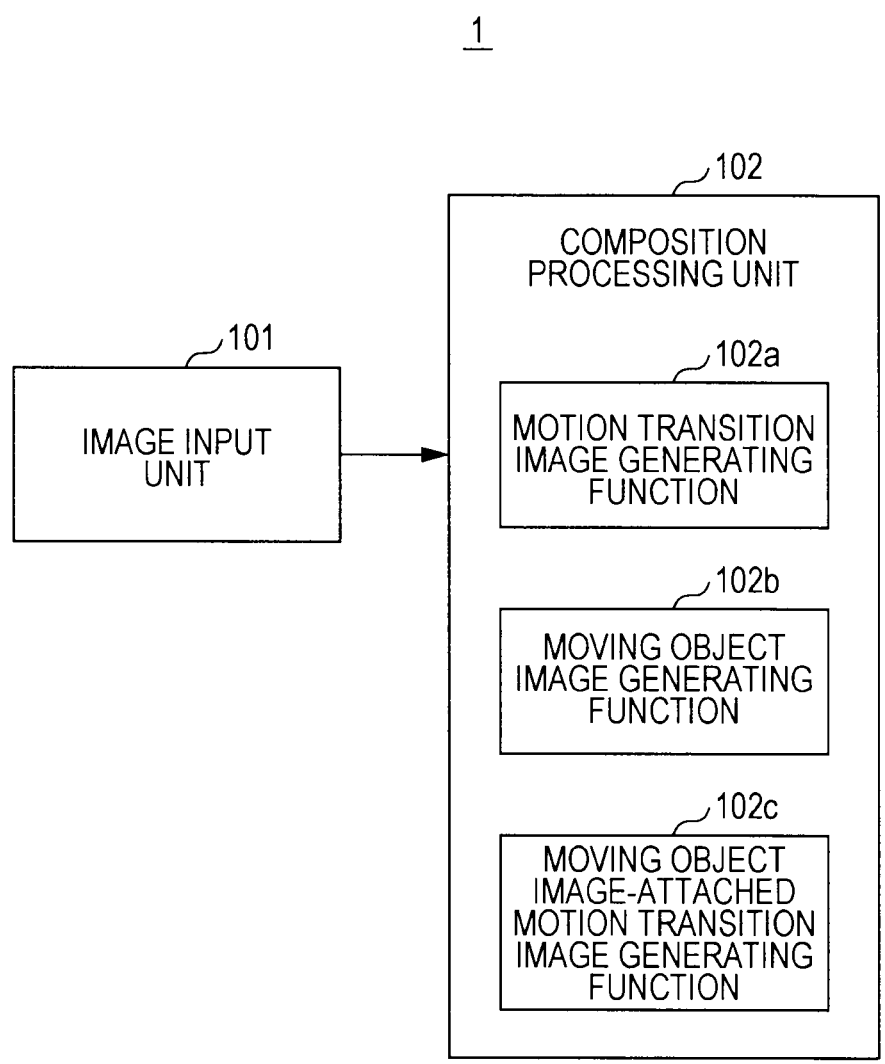
FIG. 1 is a block diagram illustrating a basic configuration of an image processing apparatus according to an embodiment of the present disclosure.

The image processing apparatus of this embodiment may have a configuration shown in FIG. 1. FIG. 1 shows a functional configuration realized by hardware or software as a block diagram.

An image processing apparatus 1 includes an image input unit 101 and a composition processing unit 102.

The image input unit 101 is a functional portion that inputs frame image data.

The frame image data may configure a moving picture, or may be, for example, images configured sheet by sheet by continuously captured still images, or the like. That is, this data broadly indicates image data making up a sheet of image, and the term "frame image data" is used.

The image input unit 101 may be a unit that sequentially inputs frame image data that is captured by, for example, a digital still camera, a video camera, or the like, that is, image data obtained as each frame of a captured moving picture image. Furthermore, the image input unit 101 may be a functional portion to which frame image data is input, which is recorded in or on a recording medium such as a RAM (Random Access Memory), a non-volatile memory, a memory card, an optical disc, and an HDD (Hard Disk Drive) through the capturing of a moving picture and is read from the recording medium.

That is, the image input unit 101 may be a portion to which serial frame image data segments are input with an arbitrary time interval. A plurality of frame image data may be sequentially input, for example, at a time interval corresponding to a predetermined frame rate, or may be input at a relatively high speed.

Frame image data that is taken in by the image input unit 101 is sequentially subjected to, for example, a process in the composition processing unit 102 at a time interval corresponding to the original frame rate of the frame image data, or at a relatively high speed time interval according to the processing capacity of the composition processing unit 102.

The composition processing unit 102 has a motion transition image generating function 102a, a moving object image generating function 102b, and a moving object image-attached motion transition image generating function 102c.

Figure 32:
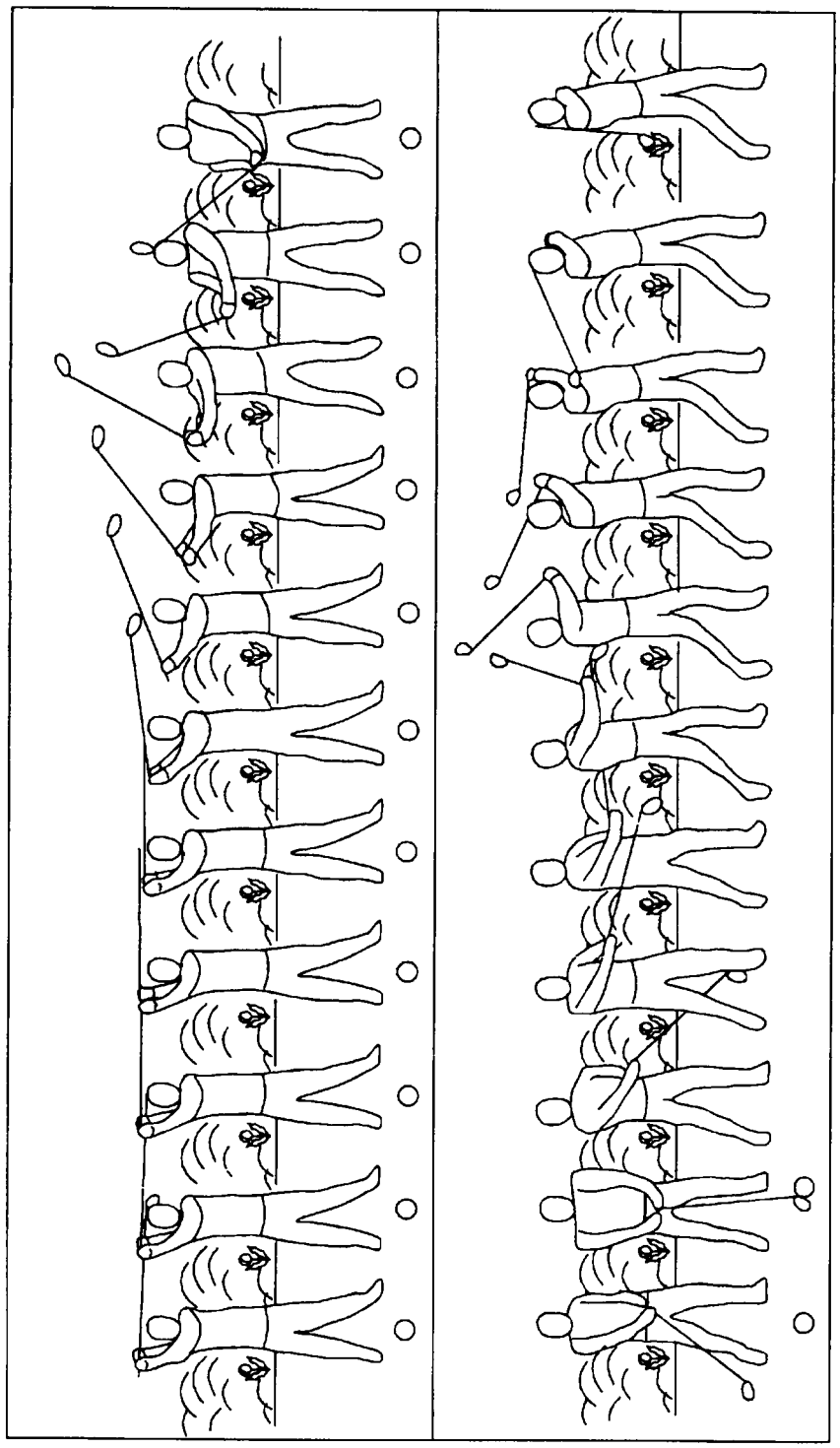
FIG. 32 is an explanatory view illustrating a composite image in the related art.
Figure 33:
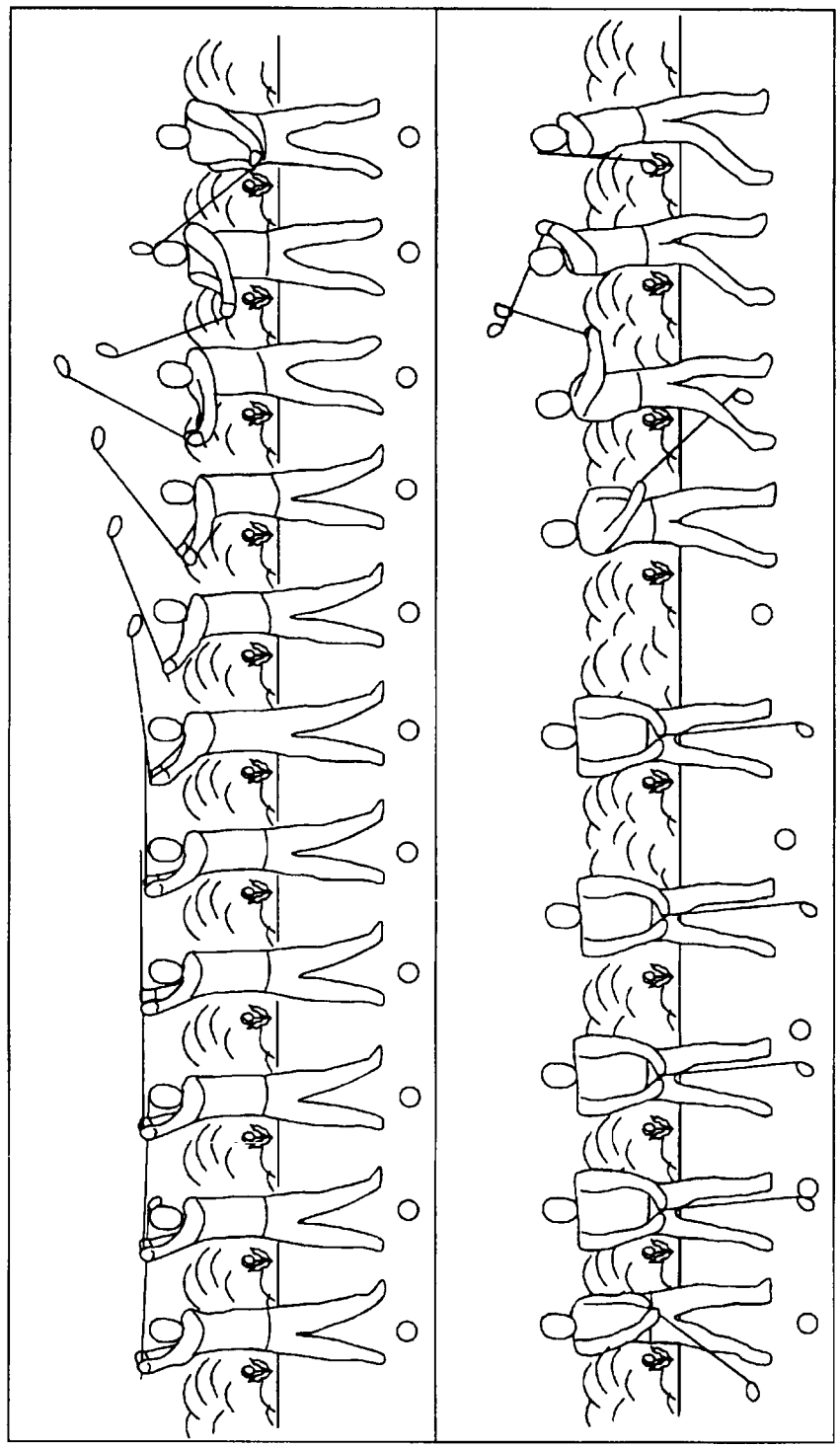
FIG. 33 is an explanatory view illustrating a composite image in which a ball display is performed.

In regard to the motion transition image generating function 102a, a composition process using a moving subject image included in a plurality of frame image data input by the image input unit 101 is performed, and motion transition image data, which represents a motion transition of a moving subject by sequentially arranging a plurality of moving subject images side by side in a predetermined direction, is generated. For example, in the case of a plurality frame image data obtained by capturing a golf swing, images of a person who performs a golf swing are made to be recognized as moving subjects, and a motion transition image data in which the moving subjects are sequentially arranged side by side in a predetermined direction as shown in FIG. 32 is generated.

In regard to the moving object image generating function 102b, moving object image data, which represents a moving object that moves according to the motion transition of the moving subject images, is generated. The moving object that moves according to the motion transition of the moving subject may be a golf ball (hereinafter, simply referred to as a ball) in the case of a golf swing, for example. That is, the moving object is a second moving subject whose location on an image is moved according to a motion transition of the moving subject.

In a real motion, the ball is hit at a high speed from the moment of impact of the golf swing and moves. Therefore, a ball image is captured with a few frames from the moment of impact.

Therefore, for example, in regard to the moving object image generating function 102b, a ball trajectory is estimated actually from a location of the ball image included in a few frames of image data and an image that expresses the ball trajectory is generated.

In addition, in a case where a ball is not moved at all in regard to serial frame image data, the image representing the ball trajectory may be generated by estimating the ball trajectory from the swing form.

In regard to the moving object image-attached motion transition image generating function 102c, the motion transition image generated by the motion transition image generating function 102a, and the moving object image generated by the moving object image generating function 102b, for example, a moving object trajectory image are composed, and a motion transition image including the moving object image, that is, a moving object image-attached motion transition image data is generated.

In the image processing apparatus 1 of such an embodiment, the composition process using the moving subject image included in the plurality of frame image data that is input is performed, and the motion transition image data is generated by the motion transition image generating function 102a. Therefore, it is possible to exactly express the motion transition of the moving subject.

In addition, in regard to the moving object image generating function 102b, a moving object image expressing a moving object (for example, a ball hit by the motion of the moving subject, or the like) that moves according to the motion transition of the moving subject is generated. This moving object image includes a moving object trajectory image that expresses a moving object trajectory that is estimated, or the like. In this configuration, an image that is not actually present in the frame image data is used and is set as an image allowing the motion of the moving object to be clearly understood.

In addition, by the moving object image-attached motion transition image generating function 102c, the moving object image is composed with the motion transition image, and thereby the moving object image-attached motion transition image data is generated, but the motion transition of the moving subject and the movement of the moving object are expressed independently.

Figure 2:
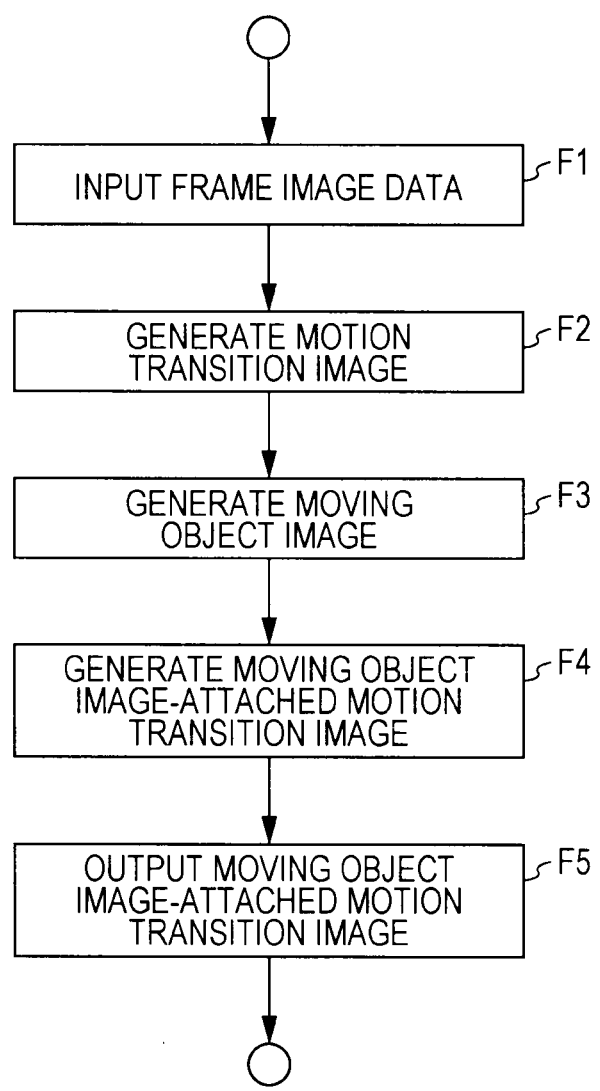
FIG. 2 is a flow chart illustrating an image processing method according to an embodiment.

FIG. 2 shows a sequence of an image processing method which the image processing apparatus 1 shown in FIG. 2 performs.

In step F1, the image processing apparatus 1 inputs the frame image data by the function of the image input unit 101.

In step F2, the composition processing unit 102 produces the motion transition image data based on the input serial frame image data using the moving object image generating function 102a.

In step F3, the composition processing unit 102 produces the moving object image data based on, for example, the ball image in the input serial frame image data by using the moving object image generating function 102b. In addition, the sequence of the processes in steps F2 and F3 may be reversed or these processes may be performed concurrently.

In step F4, the composition processing unit 102 composes the motion transition image data generated in step F2 and the moving object image data generated in step F3 by using the moving object image-attached motion transition image generating function 102c, and produces the moving object image-attached motion transition image.

In step F5, the image processing apparatus 1 outputs the moving object image-attached motion transition image. For example, this image is output as still image data in which the motion transition image and the moving object image are composed.

2. First Embodiment

2-1. Configuration of Image Processing Apparatus

Hereinafter, relatively specific configuration and operation will be described as first to eighth embodiments.

Figure 3:
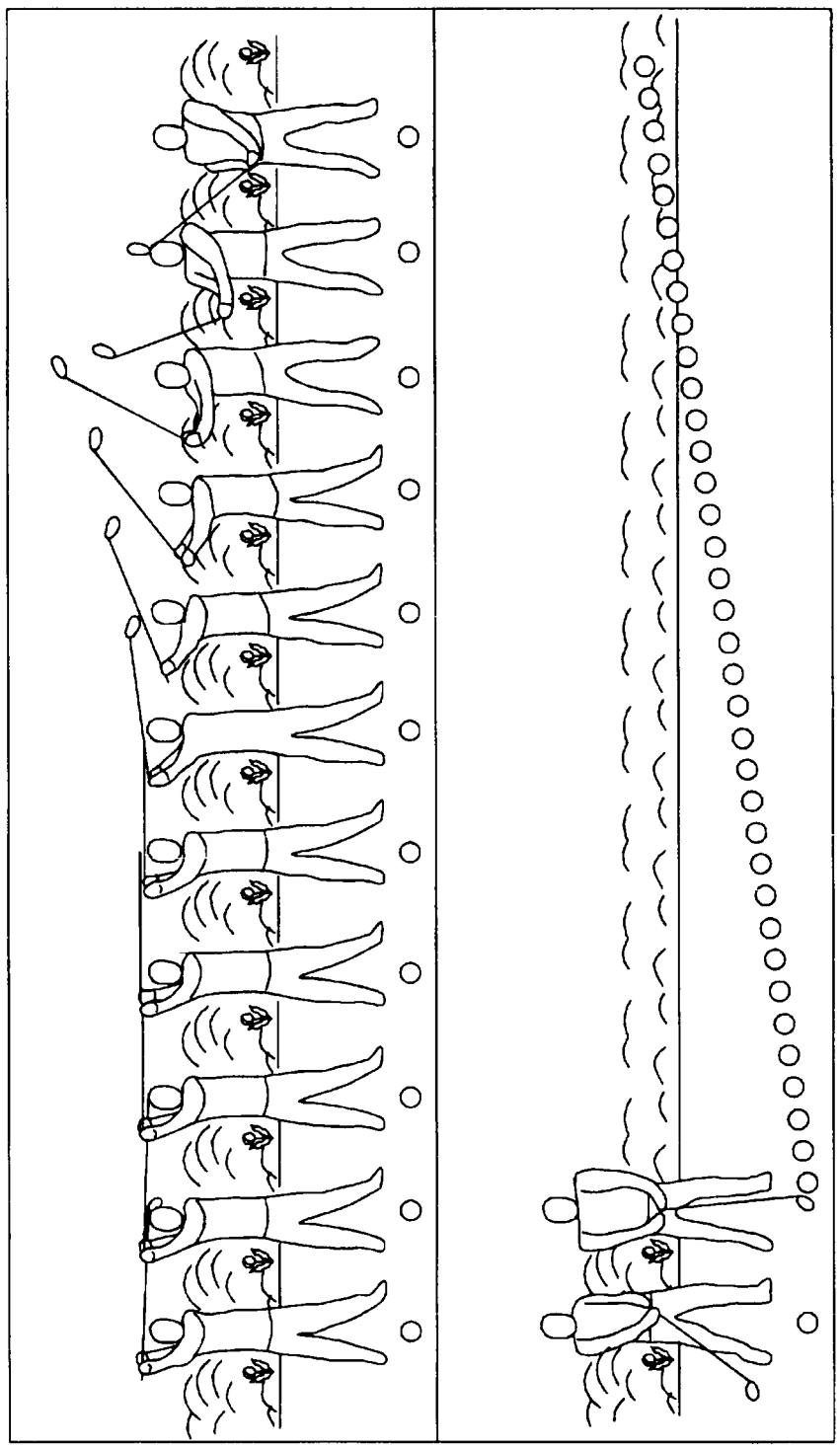
FIG. 3 is an explanatory view illustrating a moving object image-attached motion transition image according to a first embodiment.

First, in regard to the first embodiment, an example in which a moving object image-attached motion transition still image as shown in FIG. 3 is generated will be described.

The moving object image-attached motion transition still image shown in FIG. 3 is an image in which an image of a person who performs a golf swing (and a golf club) is recognized as a moving subject. The image includes two stages, and images of the moving subject are sequentially arranged side by side from a left side to an upper right. In addition, a left end of the lower stage is subsequent to a right end of the upper stage, and images of the moving subject are sequentially arranged side by side from a left side to a lower right.

In addition, in each embodiment described later, a predetermined direction in which the moving subject is sequentially arranged side by side will be described as the directions of upper left→upper right→lower left→lower right in a two-stage image as shown in FIG. 3. This predetermined direction is not limited to this example, but another example will be described later as a modification.

In the case of the first embodiment shown in FIG. 3, the moving subject image is arranged on a screen with the directionality, but the moving subject image until the moment of impact when the golf club comes into contact with the ball is arranged.

In addition, most of the lower stage of the screen is configured by an image representing a ball trajectory. That is, for example, a golf swing image of a subject person is expressed until the impact of the first half of the swing, and then the hit ball is expressed.

That is, a ball trajectory is predicted and composed from several frames immediately after the impact, and thereby a swing form until the impact and the ball trajectory are expressed concurrently.

For example, a more specific configuration of the image processing apparatus 1 for realizing the moving object image-attached motion transition still image will be described later.

Figure 4:
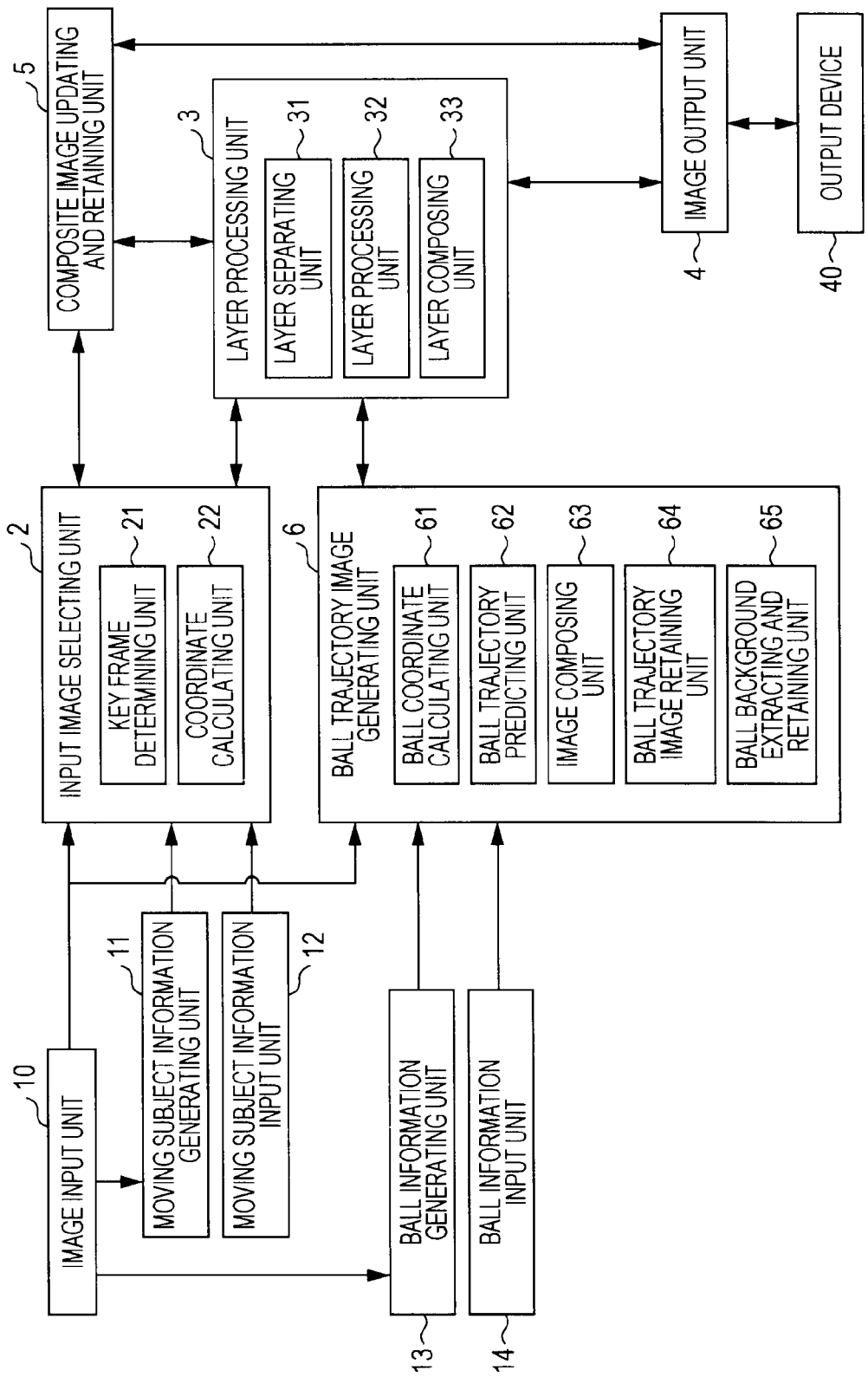
FIG. 4 is a block diagram illustrating a configuration of an image forming apparatus according to the first embodiment.

FIG. 4 shows a configuration example of the image processing apparatus 1 of the embodiment.

The image processing apparatus 1 includes an input image selecting unit 2, a layer processing unit 3, an image output unit 4, a composite image updating and retaining unit 5, a ball trajectory image generating unit 6, an image input unit 10, a moving subject information generating unit 11, a moving subject information input unit 12, a ball information generating unit 13, a ball information input unit 14, and an output device 40.

Each unit described above is not necessarily limited so as to be configured as a configuration portion in the same case. For example, the image input unit 10, the moving subject information generating unit 11, the moving subject information input unit 12, the ball movement information generating unit 13, the ball movement information input unit 14, and the output device 40 may be configured as a configuration portion with a different form.

In addition, in regard to the moving subject information producing unit 11 and the moving subject information input unit 12, only any one unit may be provided.

Similarly, in regard to the ball information producing unit 13 and the ball information input unit 14, only any one unit may be provided.

In addition, in regard to the input image selecting unit 2, the layer processing unit 3, the image output unit 4, the composite image updating and retaining unit 5, and the ball trajectory image producing unit 6, each of these may be configured by a hardware block, but may be realized as a functional block that is realized by a software program in a computing device such as a microcomputer.

The image processing apparatus 1 configured as described above may be provided in a device such as an image capturing apparatus (video camera or the like) and a video reproducing device, or may be configured as a device dedicated for image processing. In addition, the image processing apparatus 1 may be configured to execute an image processing function realized in cooperation with software and hardware in a personal computer or the like.

The image input unit 10 performs an input of a frame image data group that becomes the origin of a motion transition image that is generated.

When the image processing apparatus 1 is mounted on an image capturing apparatus, the image input unit 10 includes a lens system or a light sensing element, and may be configured as a portion that receives frame image data from an image capturing system that performs a signal processing and obtains a captured image signal.

In addition, when a captured image obtained from an external image capturing apparatus is taken in, the image input unit 10 is configured as a portion that receives frame image data from an image signal reception processing system to which the image signal is transmitted, received, downloaded, and the like from an external apparatus. As the reception processing system, for example, a tuner unit with respect to a broadcasting wave, an external device interface unit such as a universal serial bus (USB) interface, a wired or wireless network communication unit, or the like may be assumed.

In addition, in a case where an image signal is recorded on or in a recording medium such as a memory card (a solid-state memory), and an optical disc, the image input unit 10 may be configured as a portion that receives frame image data from a reproducing system that performs a reproduction with respect to such a recording medium.

Depending on the image input unit 10, each frame image data as a moving picture, or a plurality of frame image data obtained by a still image continuous capturing or the like is input, and the image input unit 10 supplies this frame image data to the input image selecting unit 2, the ball trajectory image producing unit 6, the moving subject information producing unit 11, and the ball information producing unit 13.

In addition, the image input unit 10 may perform a preprocessing. That is, the image input unit 10 may perform a conversion, which is appropriate to the type necessary for a process, such as a deployment to each frame in the case of receiving a moving picture file, and the performing conversion to progressive scan in the case of receiving an interlaced image. In addition, the scaling may be performed.

The moving subject information generating unit 11 generates moving subject information by using an original image group (frame image data group) received from the image input unit 10, or other external information (depth information or the like).

The moving subject information is information from which it can be determined which portion is a moving subject and which portion is a background in at least input frame image data.

The moving subject information generating unit 11 generates moving subject information corresponding to each frame image data that is input and supplies it to the input image selecting unit 2.

The moving subject information may be expressed by a moving subject image, and in this case, whether each pixel is a moving subject or a background is expressed by a pixel value. In addition, information indicating a location of each moving subject may be expressed by an equation or vector.

In a case where a plurality of subjects is present, the moving subject information generating unit 11 separates each of the subjects in addition to the separation of the moving subject and the background, or may perform the separation for each depth. In this case, when the moving subject information is expressed by an image, a binary image expressing whether each pixel is a moving subject or a background is not used, and a multi-valued image (or multi-channel image) expressing which depth each pixel belongs to is used.

In addition, the generation of the moving subject information may not be performed in a device of the image processing apparatus 1 of this embodiment, and the moving subject information generated by another device or program may be received. The moving subject information input unit 12 is a portion that receives the moving subject information with respect to each frame image data input by the image input unit 10 from the outside. The moving subject information input unit 12 inputs the moving subject information corresponding to each input frame image data from the outside and supplies to the input image selecting unit 2.

Therefore, in regard to the moving subject information generating unit 11 and the moving subject information input unit 12, at least one of these may be provided. However, the moving subject information generated by the moving subject information generating unit 11 and the moving subject information input by the moving subject information input unit 12 may be used together with each other, such that in that sense, both of the moving subject information generating unit 11 and the moving subject information input unit 12 may be effectively provided.

The ball information generating unit 13 generates ball information (moving object information) by using an original image group (frame image data group) received from the image input unit 10.

The ball information is information from which it can be determined that which portion is a ball image as a moving object. For example, with respect to each pixel of frame image data, a ball image portion and other portions are expressed by a pixel value.

The ball information generating unit 13 performs object recognition of the ball image which is subjected to an image analysis of each input frame image data, and as a result thereof, generates ball information representing a location of the ball image and supplies it to the ball trajectory image generating unit 6.

In addition, the generation of the ball information may not be performed in a device of the image processing apparatus 1 of this embodiment, and the moving subject information generated by another device or program may be received. The ball information input unit 14 is a portion that receives the ball information with respect to each frame image data input by the image input unit 10 from the outside. The ball information input unit 14 inputs the ball information corresponding to each input frame image data from the outside and supplies to the ball trajectory image generating unit 6.

Therefore, in regard to the ball information generating unit 13 and the ball information input unit 14, at least one of these may be provided. However, the ball information generated by the ball information generating unit 13 and the ball information input by the ball information input unit 14 may be used together with each other, such that in that sense, both of the ball information generating unit 13 and the ball information input unit 14 may be effectively provided.

In addition, as the ball information, the ball trajectory information itself supplied from the outside may be input from the ball information input unit 14.

The input image selecting unit 2 performs a process for generating a motion transition image with respect to frame image data sequentially supplied from the image input unit 10. That is, the input image selecting unit 2 selects image data necessary for being used in a composition process in the layer processing unit 3 and outputs an appropriate image combination to the layer processing unit 3. In addition, the input image selecting unit 2 outputs information necessary for the composition process such as moving subject information corresponding to the frame image data output to the layer processing unit 3, and coordinate information for the composition, to the layer processing unit 3.

In FIG. 1, a key frame determining unit 21 and a coordinate calculating unit 22 are shown in the input image selecting unit 2. The key frame determining unit 21 performs a key frame determining process or a selection of frame image data that is output to the layer processing unit 3 on the basis of the key frame determining process. In addition, the coordinate calculating unit 22 performs a coordinate calculation for the composition process.

The key frame is a plurality of images which remain in the same still image as a motion transition trajectory and have a different time axis from each other, in regard to a final output image as the motion transition image. For example, it is generally assumed that among a frame image data group that is temporally continuous, a frame captured per unit time at a regular interval is set as the key frame, but it is not necessary for the interval to be temporally regular, and may be changed to an interval that is appropriate for visually recognizing the motion transition of an object be to captured.

The key frame determining unit 21 performs a process of selecting the frame image data that becomes the key frame among the frame image data sequentially supplied from the image input unit 10. As will be described later, in the case of generating a motion transition still image, only a key frame that is selected is subjected to a process by the layer processing unit 3.

The ball trajectory image generating unit 6 performs a process using the input frame image data or ball information, and generates a ball trajectory image.

In FIG. 4, a ball coordinate calculating unit 61, a ball trajectory predicting unit 62, an image composing unit 63, a ball trajectory image retaining unit 64, and a ball background extracting and retaining unit 65 are shown in the ball trajectory image generating unit 6.

The ball coordinate calculating unit 61 calculates the coordinates as a location of a ball image in each frame image data.

The ball trajectory predicting unit 62 predicts a ball trajectory from the ball coordinates of each frame image data. For example, it is possible to estimate a trajectory, from which a ball movement can be confirmed, by using ball location coordinates of current frame image data and immediately preceding frame image data. In regard to the trajectory after the ball is out of frame, this trajectory can be estimated from a movement distance by the ball coordinates in the frame in which the ball is captured and a frame time interval when an image is captured.

The image composing unit 63 generates ball trajectory image data. According to the ball coordinates of each frame image data, a ball image is sequentially composed, and thereby it is possible to generate the ball trajectory image. In addition, in a frame in which the ball is not captured, for example, the ball image is composed in accordance with the ball trajectory predicted by the ball trajectory predicting unit 62, and thereby it is possible to generate the ball trajectory image.

In addition, the image composing unit 63 may generate an image that expresses the estimated ball trajectory by using a ball expressing image as an abstract image. In addition, the term "abstract" described here means that this image is not an actually captured ball image (photographed image), and this image includes various images such as a mark image representing a ball, an animated image of a ball, and an image of a ball trajectory.

The ball trajectory image retaining unit 64 stores and retains the ball trajectory image generated by the image composing unit 63.

The ball background extracting and retaining unit 65 extracts a background image of the ball trajectory image from, for example, the frame image data, and retains it. In addition, an abstract background may be retained. In addition, the term "abstract" described here means that this image is an image other than an actually captured background image (photographed background image during image-capturing), and this image includes various images such as a monotone image, an animated image, and an image.

The layer processing unit 3 includes a layer separating unit 31, a layer processing unit 32, and a layer composing unit 33, and performs a process of generating a motion transition image, and a process of generating a moving object image-attached transition image.

In regard to the generation of the motion transition image, the layer separating unit 31 performs a layer separation of input frame image data by using the moving subject information. The term "layer" means each of a moving subject portion, a background portion, and the like that are separated from each other with respect to one frame image data. The layer separating unit 31 separates each of an input image and the immediately preceding image within a range that is subjected to a layer composition into a background and a moving subject, respectively, based on, for example, the moving subject information, and generates an image of each layer. In a case where a plurality of moving subjects are present and each depth is obtained, they are separated into the number of moving subjects+the number of background layers.

The layer processing unit 32 performs a processing such as a cutting, scaling, and a coordinate movement with respect to each separated layer. That, various processes are performed with respect to each layer that is layer-separated, such that each layer is processed to have a type that can be composed. The process performed by the layer processing unit 32 mainly includes a geometrical calculation such as "scaling", "rotation", and "parallel movement", but an image processing such as the emphasis on the motion portion may be also performed. The scaling is determined depending on the number of key frames, the size of the output image, or the like.

The layer composing unit 33 performs a composition process using a processed layer or an immediately preceding composite image. That is, the composition of an image to be output is performed based on the image processed by the layer processing unit 32, the immediately preceding composite image, the moving subject information, or the like. In the above-described composition, it is determined that a pixel of which layer is reflected based on the moving subject information, and an output image is generated. The pixel may be selected from pixels of a single layer. However, pixels of a plurality of layers may be mixed and output.

In addition, the layer composing unit 33 performs the composition process of the motion transition image and the ball trajectory image and generates the moving object image-attached motion transition image. In this case, for example, the ball trajectory image supplied from the ball trajectory image generating unit 6 is composed into the motion transition image as a layer having the highest priority.

The image output unit 4 outputs the composite image (moving object image-attached motion transition image), which is composed by the layer processing unit 3, to the output device 40.

The output device 40 includes various devices such as a monitor device and a memory device that serve as an output destination of the motion transition image. In regard to the specific output destination of the motion transition image by the image output unit 4 is different depending on a system, and a display output, a deployment to a memory, writing to an external storage medium such as a hard disk, a flash memory, and a network destination, or the like may be exemplified.

In the case of generating a moving object image-attached motion transition still image, the image output unit 4 outputs, to the output device 40, one piece of frame image data as a moving object image-attached motion transition still image, which is completed by performing the composition of the motion transition image with respect to the frame image data composed of a predetermined number of key frames, and furthermore by performing the composition of the ball trajectory image.

In addition, in regard to the process of generating the motion transition still image, the image output unit 4 outputs the composite image data to the composite image updating and retaining unit 5 for renewal storage of this data, so as to use present composite data as immediately preceding existing composite image data at the time of processing next frame image data.

During the process of generating the motion transition still image, the composite image updating and retaining unit 5 retains the composite image data of each point in time.

For example, at the time of generating the motion transition still image, the composite image updating and retaining unit 5 updates and stores the composite, which is output from the image output unit 4, of each point in time. For example, the composite image updating and retaining unit 5 updates and stores past composite image data that is necessary in a composition process as immediately preceding data, second immediately preceding data, or the like. In addition, composite image updating and retaining unit 5 stores and retains the key frame information at the time of generating each composite image, the moving subject information, or the like.

In the configuration of FIG. 4 described above, the image input unit 10 is a portion corresponding to the image input unit 101 shown in FIG. 1.

The motion transition image generating function 102a in the composition processing unit 102 of FIG. 1 is realized by processes in the input image selecting unit 2, the layer processing unit 3, and the composite image updating and retaining unit 5.

The moving object image generating function 102b is realized by a process in the ball trajectory image generating unit 6.

The moving object image-attached motion transition image generating function 102c is realized by a process in the layer processing unit 3.

2-2. Generation of Moving Object Image-Attached Motion Transition Image

Here, description will be given with respect to an example of a process of generating a moving object image-attached motion transition image, which is realized mainly by the input image selecting unit 2, the layer processing unit 3, the image output unit 4, the composite image updating and retaining unit 5, the ball trajectory image generating unit 6.

First, as shown in FIG. 3, a moving object image-attached motion transition still image, which is generated by the image processing apparatus 1 according to this embodiment, is generated based on a plurality of frame image data obtained by capturing a moving picture, or by continuously capturing a still image with a person performing a golf swing as a subject, for example.

In the motion transition still image shown in FIG. 3, images at a plurality of points of time during a period of successive golf swings are expressed by using a plurality of frame image data. In addition, in a moving subject image of a person who performs a golf swing, there is no case in which, for example, the end of a golf club disappears or the like, and the entirety of the moving subject (person and golf club) of each frame are expressed while left and right images do not partially overlap with each other. That is, there is obtained an image in which a sufficient expression of a motion using a plurality of frame images as a motion transition image, and an appropriate expression of a motion range of the moving subject are compatible with each other.

In addition to this, the trajectory of a moving object (ball) is also expressed.

Through a process described below, a moving object image-attached motion transition image is realized.

FIGS. 5A to 5F show an image of a process of generating the moving object image-attached motion transition image.

FIG. 5A schematically shows image data input to the input image selecting unit 2. For example, it is assumed that the image data is moving picture data, and each of FR1, FR2, FR3, . . . expresses one segment of frame image data, respectively.

The input image selecting unit 2 selects key frames from temporally continuous frames as such a moving picture. For example, in a case where frames for every five frames are set as the key frames, frames FR1, FR6, FR11, FR16, FR21, . . . to which O is attached become the key frames. FIG. 5B shows the content of the moving subject image of each key frame as a figure type.

In the case of generating the motion transition still image, only the key frames are used for the composition process.

In this case, the input image selecting unit 2 transmits and receives the key frames to and from the layer processing unit 3.

Through a process described later, whenever images of the frames FR1, FR6, FR11, FR16, FR21, . . . are sequentially supplied from the input image selecting unit 2, the layer processing unit 3 sequentially performs the composition process, and generates a motion transition still image as shown in FIG. 5C. At this time, the composition process is performed in such a manner that an image, which is currently composed, of the key frame of the moving subject is overlapped on an image that is composed until that time.

Furthermore, FIGS. 5D and 5E show an image processed by the ball trajectory image generating unit 6. For example, it is assumed that the frame FR21 is an image at the moment of impact when a golf club comes into contact with a ball.

The ball is present on several frames after this frame FR21. Now, when it is assumed that the ball is already out of frame in the frame FR25, for example, ball images shown in FIG. 5D are present on images of the frames FR21 to FR24.

The ball coordinate calculating unit 61 of the ball trajectory image generating unit 6 calculates the coordinates of the ball image on the images of the frames FR21 to FR24.

The ball trajectory prediction unit 62 estimates a ball trajectory from the ball coordinates of each frame. The image composing unit 63 performs a composition process of the ball image, or the like, and generates ball trajectory image data shown in FIG. 5E.

This ball trajectory image data is transmitted to and received from the layer processing unit 3 as data of a ball trajectory layer.

The layer processing unit 3 composes the data of the ball trajectory layer (ball trajectory image data) having the highest priority with respect to motion transition image data shown in FIG. 5C. In this manner, as shown in FIG. 5F, a motion transition still image including a ball trajectory as a moving object image-attached motion transition image is generated.

Figure 5:
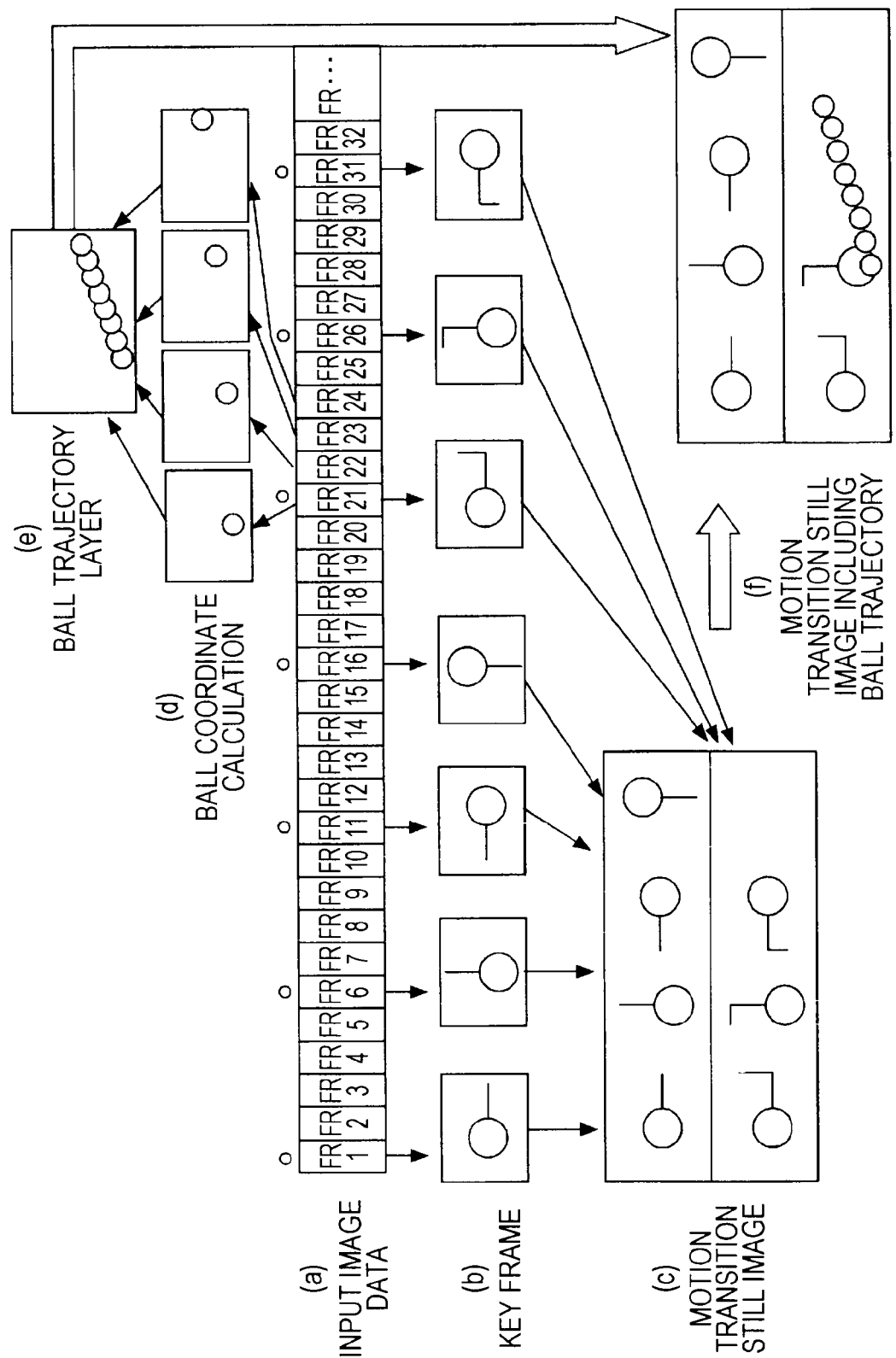
FIG. 5 is an explanatory view illustrating a process of generating a motion transition image according to an embodiment.

In addition, in the case of an image example of the first embodiment as shown in FIG. 3, the motion transition image of the moving subject is expressed until the moment of impact, such that, in the light of description of FIG. 5, images to the key frame FR21 are reflected to the motion transition image. In an embodiment described later, a moving object image of a key frame (for example, FR26, FR31) after the impact may be included in the motion transition image.

As a process of the layer processing unit 3 that performs such an image composition, first, a process of generating a motion transition image is as follows.

The layer separating unit 31 separates each of an input image and the immediately preceding image within a range that is subjected to a layer composition into a background and a moving subject, respectively, based on, for example, the moving subject information, and generates an image of each layer.

FIG. 6A shows the input image (or one segment of frame image data) and moving subject information with respect to the frame image data.

As described above, the input image selecting unit 2 outputs frame image data (for example, F1), which becomes the key frame, among the frame image data FR1, FR2, FR3, . . . that are sequentially supplied from the image input unit 10 to the layer processing unit 3.

In addition, moving subject information corresponding to each frame image data is supplied from the moving subject information generating unit 11 or the moving subject information input unit 12 to the input image selecting unit 2. When the input image selecting unit 2 supplies the frame image data as the key frame to the layer processing unit 3, information, which corresponds to the frame image data, of the moving subject is also supplied to the layer processing unit 3.

The frame image data and the moving subject information that are supplied to the layer processing unit 3 are shown in upper and lower ends of FIG. 6A. Here, the moving subject information is expressed by a binary value. That is, "1" is given to a pixel that makes up the moving subject, and "0" is given to a pixel that makes up the background other than the moving subject. In a lower end of FIG. 6A, a de-colored portion represents "1", that is, the moving subject, and a black portion represents "0", that is, the background.

The layer separating unit 31 separates input frame image data by using such moving subject information.

A moving subject layer and a background layer after the separation are shown in FIG. 6B. The moving subject layer shown in an upper end of FIG. 6B becomes an image formed by extracting a moving subject portion (that is, by extracting only a pixel having moving subject information of "1") from the input image shown in FIG. 6A.

In addition, the background layer shown in a lower end of FIG. 6B becomes an image formed by extracting a background portion (that is, by extracting only a pixel having moving subject information of "0") from the input image shown in FIG. 6A.

In addition, when it is assumed a case where a plurality of moving subjects is present, three-valued or more multi-valued moving subject information is made to be used. In this case, in the moving subject information generating unit 11 or the moving subject information input unit 12, moving subject information, which is made to have different value according to the depth (front and back relationship on an image in the depth direction) of the plurality of moving subjects, is generated (or acquired).

In such a case, the layer separating unit 31 performs the separation to have layers of the number of the moving subjects+the number of the backgrounds.

The layer processing unit 32 performs various processes with respect to each layer that is layer-separated, such that each layer is processed to have a type that can be composed.

In regard to the motion transition image, the process is not performed with the entire area of the input frame image made as a target, but performed in a method where a part of the area is cut.

Furthermore, a range where the moving subject is effective and a background area that remains on the final image are different from each other.

Figure 7A:
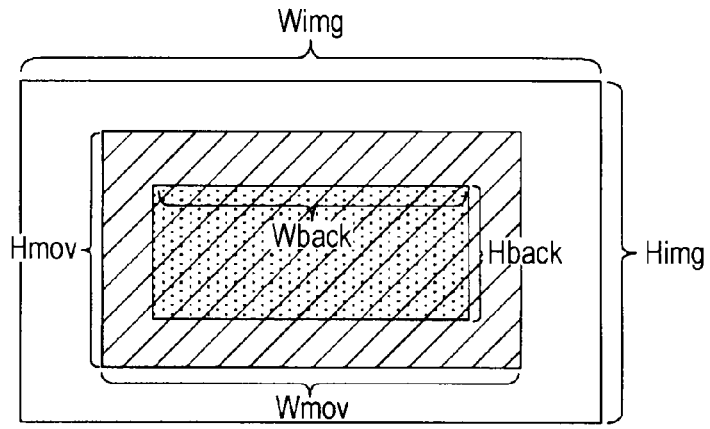
FIGS. 7A to 7C are explanatory views illustrating an area setting example of an input image according to the embodiment.
Figure 7B:
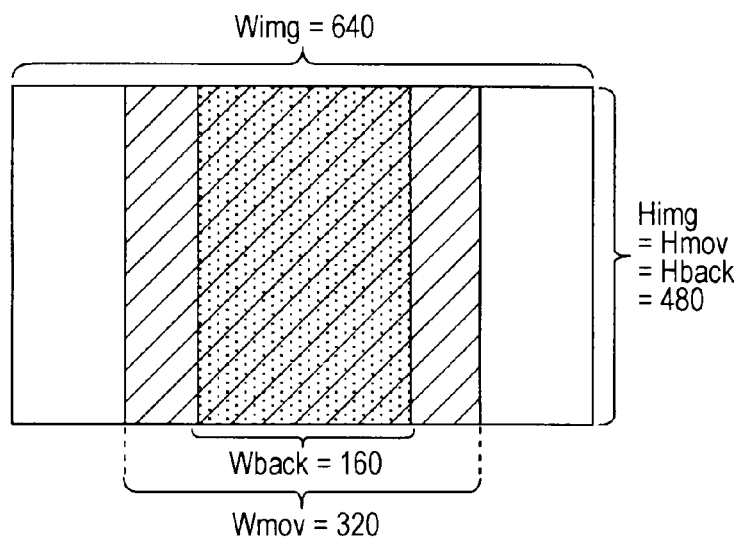
Figure 7C:
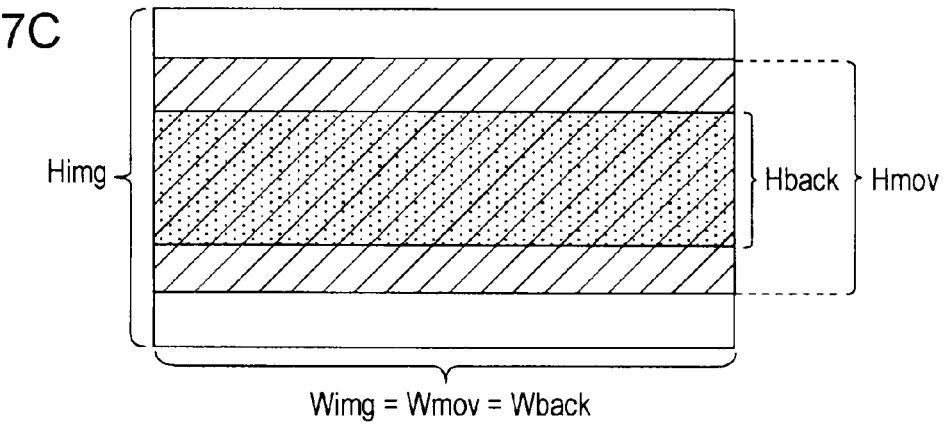

When a width and a height of an image as input frame image data are set to Wing and Himg, a width and a height of a transition motion effective area are set to Wmov and Hmov, and a width and a height of remaining background area are set to Wback and Hback, for example, areas shown in FIGS. 7A to 7C are assumed. In addition, the areas shown in FIGS. 7A to 7C are for illustration and the present disclosure is not limited thereto.

The transition motion effective area shown in FIGS. 7A to 7C becomes a range for cutting a main moving subject. In addition, the remaining background area is an area used as a background image in the composition process.

In regard to such values (Wmov and Hmov) of transition motion effective area or values (Wback and Hback) of remaining background area), the width may be equal or the length may be equal depending on a transition direction of the subject, that is, a direction where an image proceeds temporally when it is expressed as a motion transition image.

In a case where each moving subject image is transitioned in the transverse direction similarly to the motion transition image shown in FIG. 3, it is often very suitable when the height (Hmov and Hback) has a value equal to that of the height (Himg) of the original frame image data, similarly to an example shown in FIG. 7B.

In addition, in a case where each moving subject image is transitioned in the vertical direction, it is often very suitable when the width (Wmov and Wback) has a value equal to that of the width (Wimg) of the original frame image data, similarly to an example shown in FIG. 7C.

In a case where a motion object is a person and this person is standing like the case of the form confirmation of sports, or the like, a transverse transition often occurs, but in a case where a motion movement mainly occurs in the vertical direction, a vertical transition may often occur. In this manner, the transition direction and a magnitude of each image according to the transition direction largely depend on an object to be captured.

Figure 8A:
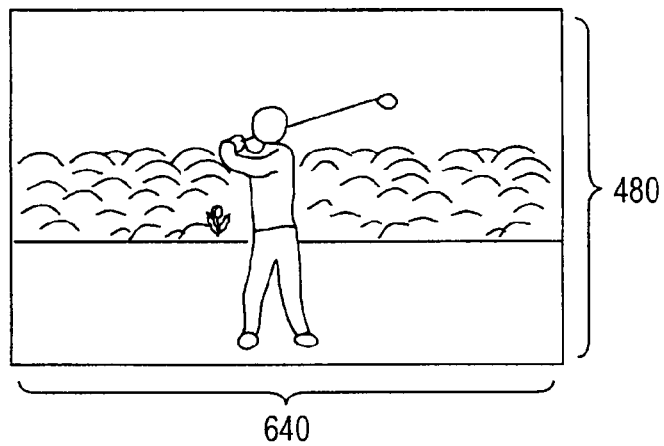
FIGS. 8A to 8C are explanatory views illustrating a transition motion effective area and a remaining background area according to an embodiment.
Figure 8B:
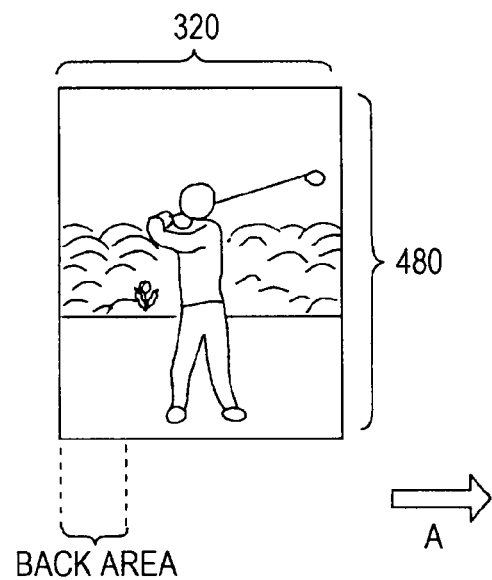
Figure 8C:
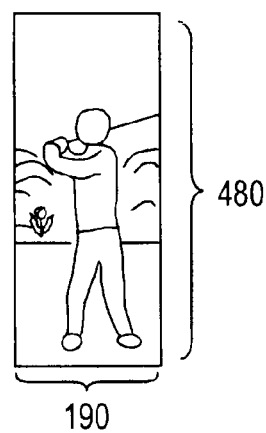

FIGS. 8A to 8C shows examples of setting a transition motion effective area and a remaining background area according to the example shown in FIG. 7B.

FIG. 8A shows the original input frame image data, and the size of the frame image data is assumed to have, for example, VGA (640×480). The transition motion effective area and the remaining background area are assumed to have the same center.

The transition motion effective area is set as an area having a width Wmov of 320 and a height Hmov of 480 as shown in FIG. 8B.

The remaining background area is set as an area having a width Wback of 160 and a height Hback of 480 as shown in FIG. 8C.

This example is illustrative only, and actually, these areas may be appropriately set according to the magnitude of the subject or the movement thereof, and then an image that is used for the composition process may be cut.

The layer composing unit 33 performs the composition of the image that is to be output, based on, for example, an input image (frame image data that is set as current key frame) processed by the layer processing unit 32, the immediately preceding key frame image, moving subject information, and existing composite image data at that point in time.

In addition, the immediately preceding key frame image is an image that is input from the input image selecting unit 2 at the immediately previous time and is used for the composition process. However, this image may be stored in the layer processing unit 3 until this processing point in time, or may be stored in the composite image updating and retaining unit 5 and may be read out from the composite image updating and retaining unit 5 at the time of the composition process together with the composite image data until that time.

A point of view at the time of composition with respect to an input time (current key frame) and the immediately preceding key frame will be described using FIG. 9.

Through a process performed by the above-described layer separating unit 31, the input current key frame is separated into a moving subject layer and a remaining background layer.

In addition, the immediately preceding key frame is also separated into a moving subject layer and a remaining background layer.

FIGS. 9A to 9C show composition with respect to these four layers.

As shown in FIG. 9A, a moving subject layer of the newest input frame image data (a current key frame) has the first priority.

In addition, a moving subject layer of the frame image data (the immediately preceding key frame) according to the immediately preceding composition process has the second priority.

In addition, a remaining background layer of the newest input frame image data (the current key frame) has the third priority.

In addition, a remaining background layer of the frame image data (the immediately preceding key frame) according to the immediately preceding composition process has the fourth priority.

Based on these priorities, the four layer images are composed and thereby a composite image shown in FIG. 9B is obtained.

This composite image is composed into a predetermined area of existing composite image data at that point in time, such that one moving subject image is newly added to a previous composite image using a plurality of key frames.

Figure 10:
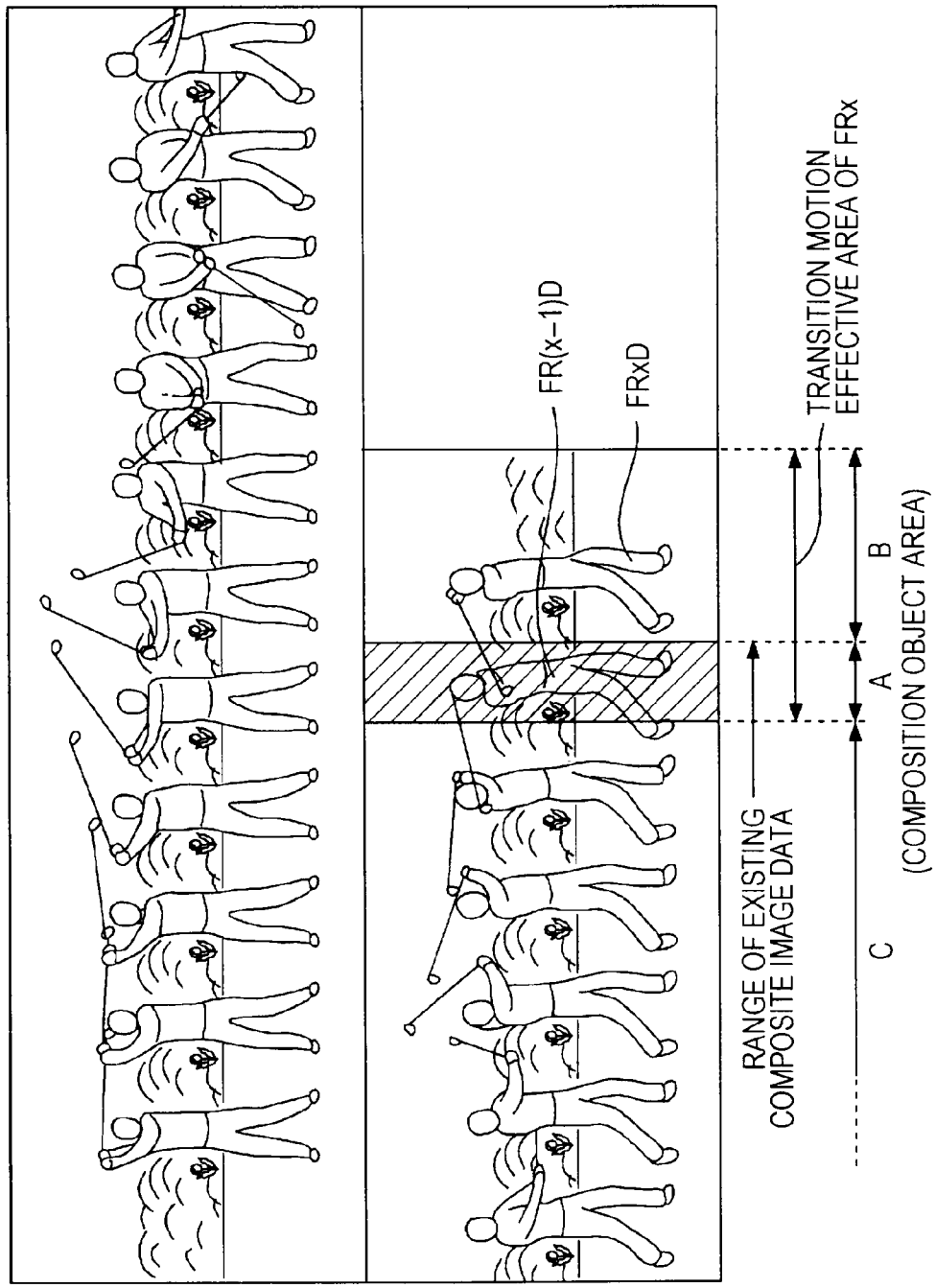
FIG. 10 is an explanatory view illustrating a composition process of a motion transition image.

For example, FIG. 10 shows a composition state at any point in time until the motion transition still image is finally generated. That is, the point in time is a point in time when a composition process with respect to the key frame FRx input at this time is performed.

A transition motion effective area of the currently input key frame FRx, and a range of composite image data, which is composed at the time of inputting the immediately preceding key frame, existing at a current processing point in time are regarded to be within a range shown in this drawing.

When an image of the current key frame FRx is added by the composition process, in regard to an area B in this drawing, a pixel of the transition motion effective area of the current key frame FRx may be copied as is onto new composite image data.

In addition, in regard to an area C, a pixel of composite image data existing at that point in time, that is, composite image data at a point in time after the composition process to the immediately preceding key frame may be copied onto new composite image data as is.

In this case, an area A becomes a problem. That is, in the area A, an image of the moving subject FRxD in the current key frame FRx and an image of the moving subject FR(x−1)D in the immediately preceding key frame are partially overlapped with each other. In regard to this area A, it is necessary to compose each layer with the priorities shown in FIG. 9A.

That is, with respect to the area A, the layer composing unit 33 performs the layer composition shown in FIG. 9 by using the current key frame FRx and the immediately preceding key frame. In addition, with respect to the area B, a portion corresponding to the area B of the current key frame FRx is used as is. In this manner, a composite image of areas A and B is obtained from the current key frame and the immediately preceding key frame. This composite image of the areas A and B is read out from the composite image updating and retaining unit 5, and is composed into remaining composite image data at this point in time. That is, a process of attaching the areas A and B generated at this time to the area C of the existing composite image data subsequently thereto.

In this manner, it is possible to obtain composite image data shown in FIG. 10.

This composite image data is stored in the composite image updating and retaining unit 5, and is similarly used in a composition process related to a next key frame FR (x+1).

As described above, in regard to the area A that becomes an overlapping area at the time of composition, the layer composition shown in FIG. 9 is performed, such that the area A is added to the previous composite image data while a part of the moving subject FRxD is not lost. Therefore, as shown in FIG. 3, even when a plurality of key frames is used, it is possible to generate a motion transition image in which the motion of the moving subject is appropriately expressed.

After the motion transition image is composed as described above, ball trajectory image data is further composed as shown in FIG. 9C. In this case, a portion of the ball trajectory image is composed into the motion transition image as a ball trajectory layer.

Figure 17:
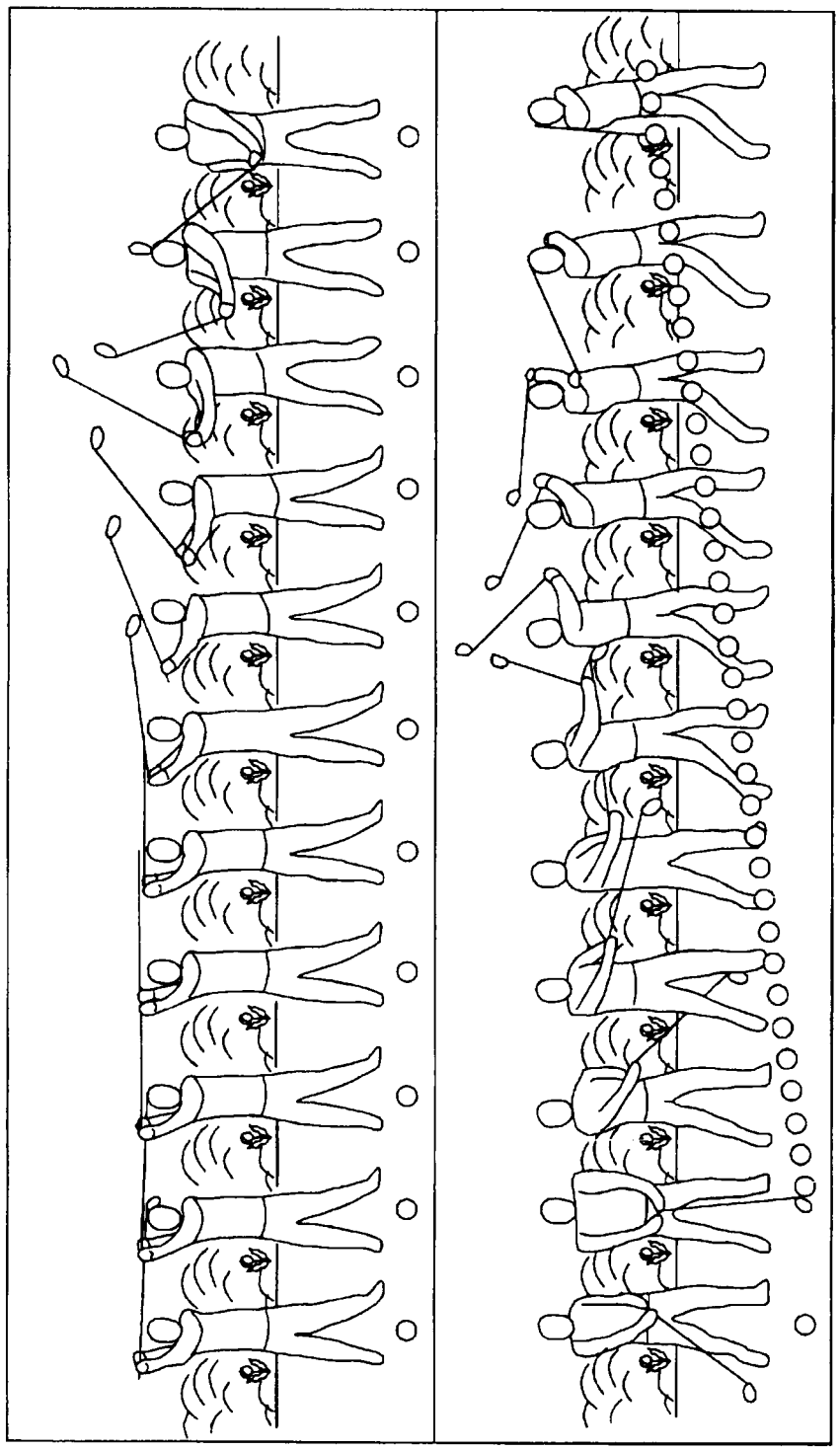
FIG. 17 is an explanatory view illustrating a moving object image-attached motion transition image according to a fifth embodiment.

In addition, in the case of the composite image of the first embodiment as shown in FIG. 3, the motion transition image portion and the ball trajectory image portion do not overlap with each other, such that there is no issue relating to the priority. However, as shown in FIG. 17 of a fifth embodiment described later, the motion transition image portion and the ball trajectory image may overlap with each other. In this case, it is considered that the ball trajectory layer is composed with a priority higher than that in each layer of the motion transition image.

2-3. Process Example

A specific process example of the image processing apparatus 1 will be described with reference FIGS. 11 and 12.

Figure 11:
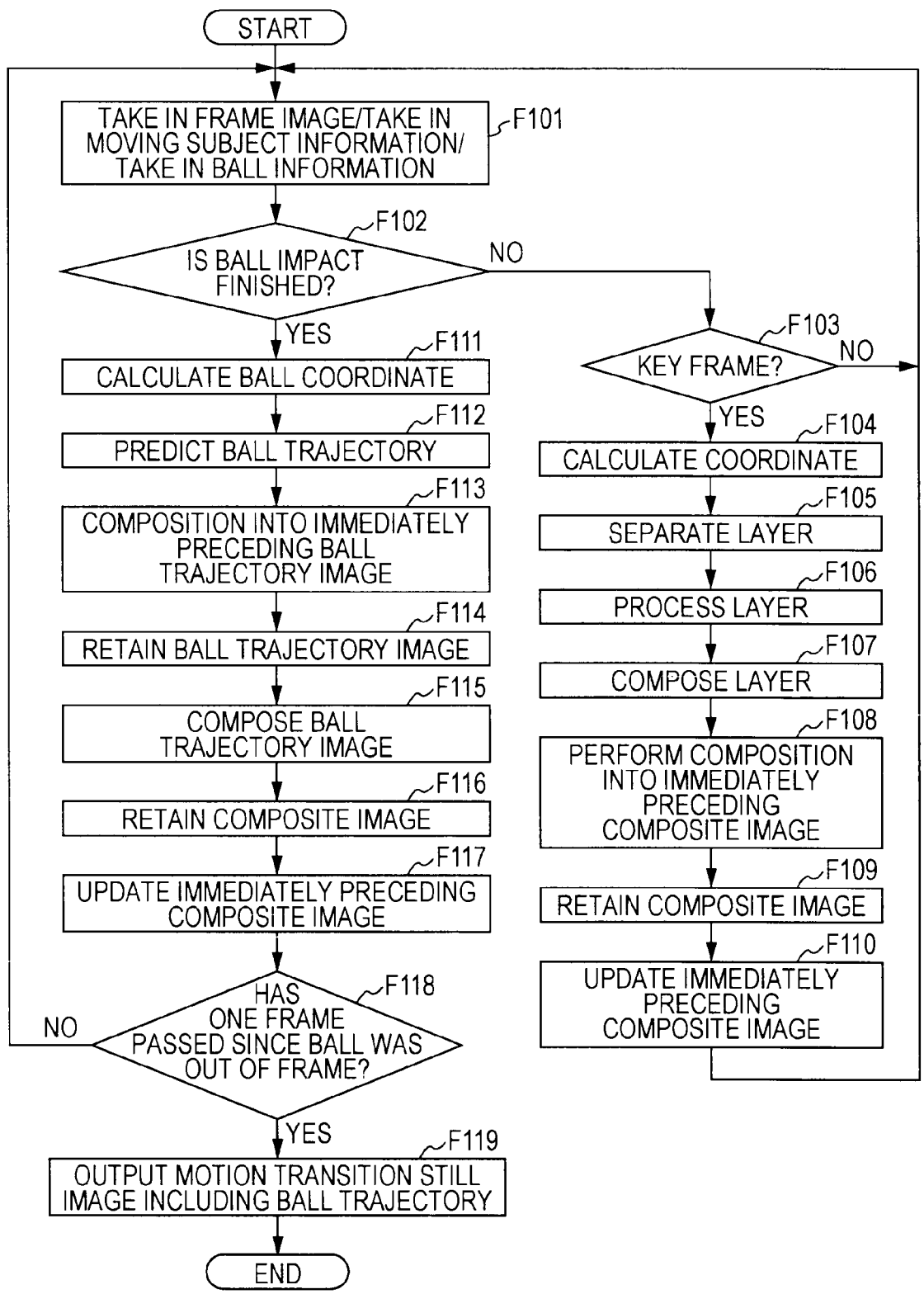
FIG. 11 is a flow chart illustrating a process of generating a moving object image-attached motion transition image according to the first embodiment.

FIG. 11 shows a process performed by the input image selecting unit 2, the layer processing unit 3, the image output unit 4, the composite image updating and retaining unit 5, and the ball trajectory image generating unit 6, when a moving object image-attached motion transition still image.

In step F101, the input image selecting unit 2 takes in frame image data and moving subject information of this frame. In addition, the ball trajectory image generating unit 6 takes in frame image data and ball information of this frame.

As described above, temporally continuous frame image data is supplied to the input image selecting unit 2 from the image input unit 10. Whenever data of one sheet of frame image is input, in step F101, the input image selecting unit 2 performs a process of taking in the frame image data, and moving subject information corresponding to the frame image data from the moving subject information generating unit 11 (or moving subject information input unit 12). In addition, the ball trajectory image generating unit 6 performs a process of taking in frame image data and ball moving information corresponding to the frame image data from the ball information generating unit 13 (or ball information input unit 14).

In step F102, it is determined whether a present input frame is a frame in a state where a ball impact is finished (after a moving object begins to move). This determination can be made due to the ball information supplied from the ball information generating unit 13 or the ball information input unit 14. That is, when it is determined that the ball is moving from the initial position on an image based on the ball information, it is determined that the impact is finished. In addition, the input image selecting unit 2 may perform an image analysis of the input frame image data, and for example, determine whether or not a golf club head image and a ball image come into contact with each other, and determine frames after a frame next to a frame in which the golf club head image and the ball image come into contact with each other as frames after the impact.

Before the impact, that is, at the point in time when each frame image data is taken in before it is determined that the ball is hit, the generation of the motion transition image is performed by processes in steps F103 to F110.

In step F101, the input image selecting unit 2 takes in the frame image data and the moving subject information, and in a case where this is a frame before the impact, determines whether this frame image data is selected as a key frame in step F103. For example, when the selection of the key frame is performed as shown in FIG. 5, frames for every five frames such as first, sixth, eleventh, ... are set as key frames.

In a case where the input frame image data is a key frame, the input image selecting unit 2 moves the process to step F104. In a case where the input frame image data is not a key frame, the input image selecting unit 2 returns the process to step F101, and performs the input process of next frame image data. That, in the process of generating a motion transition still image, a frame other than the key frame is not used in the composition process.

In a case where the frame image data taken-in in step F102 is the key frame, the input image selecting unit 2 performs a process for using the frame image data for the composition process. Therefore, in step F104, coordinate calculation by the coordinate calculating unit 22 is performed.

In this coordinate calculation, a pixel position for reflecting the current frame image data to a composite image is calculated. That is, the coordinate calculation is a process of calculating a pixel range for applying current frame image data within a size of the final composite image (size of a motion transition still image).

The input image selecting unit 2 outputs the coordinates calculated in this step F104 to the layer processing unit 3 together with the current frame image data (current key frame image) and the moving subject information.

In the layer processing unit 3, first, in step F105, the layer separating unit 31 performs a layer separation into four layers by using input frame image data (current key frame image), moving subject information, the immediately preceding key frame image, moving subject information of the immediately preceding key frame image. That is, as described with reference to FIG. 6, the layer separation into a moving subject layer and a background layer by using the moving subject information is performed, and as shown in FIG. 9A, the layer separation into a moving subject layer of a current key frame of, a moving subject layer of the immediately preceding key frame, a background layer of the current key frame, and a background layer of the immediately preceding key frame.

In addition, in regard to the moving subject layer of the immediately preceding key frame, and the background layer of the immediately preceding key frame, a layer separation result performed in step F105 when the immediately preceding key frame is input may be stored to be used in a current process. The image data of key frame input at the immediately previous time and the moving subject information may be stored to be used for this time.

The separation into four layers may be stored in a memory region by creating each of the layer image shown in FIG. 9A. However, here, an example where a layer separation is performed by creating "layer separation information" will be described.

This layer separation information expresses, as a pixel value, which layer is ultimately effective as each pixel in a portion in which transition motion effective areas of the immediately preceding key frame image and a current key frame image overlap with each other, that is, in the composition object area described with reference to FIG. 10.

This process is shown in FIG. 12. The process shown in FIG. 12 is a process of determining one by one with respect to all pixels in the transition motion effective area of the current key frame.

First, in step F500, the layer processing unit 3 sets a first pixel in the transition motion effective area of the current key frame as a determination object. With respect to the determination object pixel, determination processes in steps F501 to F510 are performed.

In step F511, until the determination process with respect to the all pixels in the transition motion effective area of this key frame is finished, the determination processes of steps F501 to F510 are repeated while changing the determination object in step F512 to a next pixel.

In step F501, with respect to one pixel of the determination object, the layer processing unit 3 determines whether the pixel is within a composition object area.

In a case where the pixel of the determination object is not within a composition object area, the process proceeds to step F502, and the layer processing unit 3 sets the pixel of the determination object in the current key frame as a pixel to be copied to composition result image (layer composition image). For example, in regard to the pixel of the determination object, a pixel value "0" is stored to the layer separation information. Then, the process proceeds to step F511.

For example, with respect to a pixel corresponding to the area B in FIG. 10, the process of steps F501→F502 is performed.

In a case where the pixel of the determination object is within the composition object area, the process proceeds to step F503, and the layer processing unit 3 determines whether or not the pixel of the determination object is a pixel within the moving subject area of the current key frame. In a case where the pixel of the determination object is a pixel within the moving subject area of the current key frame, in step F504, in regard to the pixel of the determination object, a pixel value "1" is stored to the layer separation information. Then, the process proceeds to step F511. The pixel value "1" is a value representing "first priority" in FIG. 9A.

For example, in the area A (within the composition object area) of FIG. 10, in regard to the pixel of the moving subject area of the current key frame, for example, a pixel of the end portion of a golf club, the process of steps F503→F504 is performed.

In a case where it is determined the pixel of the determination object is not a pixel within the moving subject area of the current key frame in step F503, the layer processing unit 3 determines whether or not the pixel of the determination object is within a moving subject area of the immediately preceding key frame in step F505. In this case, the process proceeds to step F506, and in regard to the pixel of the determination object, the layer processing unit 3 stores a pixel value "2" to the layer separation information. Then the process proceeds to step F511. The pixel value "2" is a value representing "second priority" in FIG. 9A.

For example, in the area A (within the composition object area) of FIG. 10, in regard to the pixel of the moving subject area of the immediately preceding key frame, for example, a pixel making up the moving subject F(x−1)D, or the like, the process of steps F505→F506 is performed.

In a case where it is determined the pixel of the determination object is not a pixel within the moving subject area of the immediately preceding key frame in step F505, the layer processing unit 3 determines whether or not the pixel of the determination object is within a background area of the current key frame in step F507. In this case, the process proceeds to step F508, and in regard to the pixel of the determination object, the layer processing unit 3 stores a pixel value "3". Then, the process proceeds to step F511. The pixel value "3" is a value representing "third priority" in FIG. 9A.

In a case where it is determined the pixel of the determination object is not a pixel within the background area of the current key frame in step F507, the layer processing unit 3 determines whether or not the pixel of the determination object is within a background area of the immediately preceding key frame in step F509. In this case, the process proceeds to step F510, and in regard to the pixel of the determination object, the layer processing unit 3 stores a pixel value "4". Then, the process proceeds to step F511. The pixel value "4" is a value representing "fourth priority" in FIG. 9A.

The above-described processes are performed until it is determined that the determination on all pixels of the transition motion effective area of the current key frame is completed in step F511.

The four layers in the composition object area as shown in FIG. 9A includes "a background layer of the immediately preceding key frame image (fourth priority)", "remaining background layer of a current key frame (third priority)", "a moving subject layer of the immediately preceding key frame image (second priority)", and "a moving subject layer of the current key frame (first priority)" in an order from the bottom. When these are sequentially overlapped with each other from the bottom, and the resulting overlapped images are seen from the top, this image becomes an output image. That is, an upper layer has a higher priority, such that in a case where an effective pixel is present in a layer above the layer itself, this fact has no relation to a case in which a pixel of the self layer is effective or ineffective, or has any pixel value.

The processes shown in FIG. 12 are performed, such that the layer separation information may retain the number of effective layers with respect to each pixel in the composition object area.

For example, when the layer separation information or the pixel value is "1", this represents that a pixel extracted from the moving subject layer of the current key frame image, which has the first priority, is to be used at the location of this pixel in the resultant image.

In addition, for example, when the layer separation information or the pixel value is "2", this represents that a pixel extracted from the moving subject layer of the immediately preceding key frame image, which has the second priority, is to be used at the location of this pixel in the resultant image.

That is, by the layer separation information, each layer shown in FIG. 9A is expressed.

Subsequently, in step F106 in FIG. 11, the layer processing unit 3 performs a processing process by the layer processing unit 32. That is, a processing necessary for the layer composition is performed. In addition, as this processing process, scaling, rotation of the image, or the like may be performed according to the size of an input image and the size for reflecting the input image on an image resulting from the composition. Particularly, in a case where each pixel of the input image is reflected on the composition result as is, or the like, the scaling or the rotation may not be necessary.

Subsequently, the layer processing unit 3 performs the layer composition in step F107, and generates a layer composition image in the current key frame and in the immediately preceding key frame. In addition, the term "layer composition image" described here means an image of the areas A and B in FIG. 10.

First, with respect to a pixel that is determined to have the pixel value "0" in step F502 in FIG. 12, that is, a pixel within the area B in the light of FIG. 10, a pixel extracted from the current key frame is copied and is applied to the layer composition image as is.

The layer composition is performed with respect to each pixel within the composition object area (area A).

In this case, in regard to a location of a pixel having the pixel value "1" when reference is made to the layer separation information, the pixel is extracted from the current key frame and is applied to the layer composition image. In addition, when the pixel value is "2", the pixel is extracted from the immediately preceding key frame and is applied to the layer composition image.

In regard to a location of a pixel having the pixel value "3", the pixel is extracted from the current key frame and applied to the layer composition image. In addition, when the pixel value is "4", the pixel is extracted from the immediately preceding key frame and is applied to the layer composition image.

As described above, the layer separation information retains information on which pixel of the four layers is made to be effective with respect to each pixel location. Therefore, in regard to each pixel location, a pixel is extracted from the current key frame or the immediately preceding frame according to the pixel value of the layer separation information and is applied, such that in regard to the composition object area shown in FIG. 10, the composition according to the priority in FIG. 9 is performed.

Through the above-described processes, the layer composition image corresponding to the areas A and B in FIG. 10 is generated, and in this layer composition image, as shown in FIG. 10, an image of a moving subject FRxD of the current key frame FRx and an image of a moving subject FR(x−1)D of the immediately preceding key frame partially overlap with each other, such that the moving subject FRxD of the current key frame FRx is not omitted and is expressed.

In addition, in the layer composition process, the moving subject layer of the current key frame has the first priority, such that in a portion in which the current and immediately preceding moving subject images overlap with each other, the image of the moving subject of the current frame, that is, of the newest frame at that point in time has the priority.

Subsequently, in step F108, the layer processing unit 3 composes the layer composition image onto the immediately preceding image. Immediately preceding composite image data that exists is retained in the composite image updating and retaining unit 5, such that the layer processing unit 3 composes the composite image generated in step F107 onto the immediately preceding composite image data read-out from the composite image updating and retaining unit 5.

When description is made in the light of the example shown in FIG. 10, existing composite image data at that point in time is in a state where each key frame image of areas including the area C and the area A is composed. In regard to this composite image data, the layer composition image of the areas A and B is copied. In regard to the area A, the layer composition image is overwritten by a layer composition. In this manner, composite image data shown in FIG. 10 is generated.

In step F109, the composite image data generated as described above is transmitted to the image output unit 4 from the layer processing unit 3 and is retained therein. After taking in the composite image data, the image output unit 4 supplies it to the composite image updating and retaining unit 5.

In step F110, the composite image updating and retaining unit 5 stores and retains the composite image data that is supplied as existing composite image data that is used for the next composition process. That is, the composite image updating and retaining unit 5 updates the content of existing composite image data by composite image data generated at this time.

The process returns to step F101, and proceeds to an input process of the next frame image data.

In addition, in the above-description, it is described that the layer composition is performed in step F107, and the layer composition image is composed into the existing composite image in step F108, but needless to say, the process when the first key frame is input, particularly, the composition process is not necessary. At this point in time, existing composite image data also does not exist.

In this case, in steps F107 and F108, each pixel of an image of the first key frame is copied onto an area of an upper-right portion of image data for composition having the size shown in FIG. 8, the first composite image data is generated, and this composite image data is retained in the composite image updating and retaining unit 5 in step F110.

After a second key frame is input, the immediately preceding key frame or existing composite image data at that time is present, such that above-described processes are performed.

In addition, the process of generating the composite image data may include various processes other than the processes in steps F107 and F108. For example, in regard to a pixel of the area B, the pixel may be first copied onto the existing composite image data, a layer composition image with respect to the area A may be generated, and then the layer composition image may be overwritten and copied onto the area A of the existing composite image data.

The above-described processes in steps F101 to F110 are repeated for each key frame, and thereby the motion transition image is formed.

During these processes, at any point in time, frame image data input by the input image selecting unit 2 becomes an image after the moment of impact of the ball.

In the case of the first embodiment, the motion transition image is made until the moment of impact as shown in FIG. 3, such that at an input point in time of the frame image data after the moment of impact, the steps F103 to F110 are not performed.

In this case, whenever the frame image data is input in step F101, the process proceeds from step F102 to step F111, and steps F111 to F118 are repeated.

In step F111, the ball coordinate calculating unit 61 of the ball trajectory image generating unit 6 calculates the coordinates of a ball image with reference to ball information in current frame image data.

In step F112, the ball trajectory predicting unit 62 performs ball trajectory prediction. This ball trajectory may be predicted by comparing the coordinates calculated in present step F111 and the coordinates calculated step F111 with respect to immediately preceding image data. In addition, in a case where the present frame image data relates to an image after the ball image is already out of frame, ball trajectory information is predicted and generated by using ball trajectories until that time.

In step F113, the image composing unit 63 composes a present ball image whose location is determined as a coordinate value or a prediction value onto the immediately preceding ball trajectory image.

In step F114, the ball trajectory image data as a composition result is stored and retained in the ball trajectory image retaining unit 64.

In step F115, the ball trajectory image stored in the ball trajectory image retaining unit 64 is transmitted to and received from the layer processing unit 3, and the ball trajectory image is composed into a motion transition image by the layer composition unit 33. The motion transition image that is composed is a composite image that is stored in the composite image updating and retaining unit 5 at that point in time.

The layer processing unit 3 transmits the composed image data to the image output unit 4.

In step F116, the motion transition image onto which the ball trajectory image is composed is retained as the newest composite image. In addition, the composite image is supplied to the composite image updating and retaining unit 5.

In step F117, the composite image updating and retaining unit 5 updates and retains the supplied composite image as the newest motion transition image.

The above described processes are performed until it is determined in step F118 that one frame has passed since the ball was out of frame.

Therefore, the processes performed in steps F111 to F117 are as follows in the light of time series of each frame of the input image data shown in FIG. 5.

For example, when a frame FR21 is an image at the moment of impact, frame image data immediately after the impact, that is, an image when the ball moves from the initial position is set as a frame FR22.

When frame image data from a frame FR1 to the frame FR21 is input, the above-described steps F103 to F110 are performed.

When the frame FR22 is input, a process proceeds to step F111. In this case, first, the ball coordinates in the frame FR22 are calculated by the ball coordinate calculating unit 61. A ball trajectory in this case becomes a trajectory connecting stationary location coordinates until before the frame FR21 and the present ball location coordinates.

An image according to this trajectory is generated and retained in steps F113 and F114, and the ball trajectory image is composed with a motion transition image to that point in step F115.

Next, when a frame FR23 is input, the coordinates of the ball location are also calculated in step F111, and a ball trajectory is predicted by an immediately preceding ball trajectory and the current coordinates in step F112. An image according to the trajectory is generated and retained in steps F113 and F114, and this ball trajectory image is composed with the newest motion transition image at that time in step F115.

These processes are also performed when a frame FR24 is input.

Then, even when an image that is already out of frame is input as a frame FR25, steps F111 to F117 are performed. However, at this time, it is determined that the ball image is not present from the ball information, and the calculation of coordinates in step F111 is not performed. Furthermore, in this case, a subsequent ball movement is estimated from a ball movement determined until the immediately previous time in step F112.

This estimation may be performed such that the ball trajectory to that point is linearly extended. In addition, for example, it is possible to estimate the ball speed from a ball coordinate value between the frames FR21 and FR22 or between the frames FR22 and FR23, and a time interval of each frame, such that a parabolic trajectory according to the speed may be estimated in consideration of the ball speed.

In addition, the ball trajectory may be estimated by analyzing the state of a club head and the state of the vicinity of the ball from an image at the moment of impact.

In this manner, when an input of the frame image data after the ball is out of frame is detected, the ball trajectory is estimated based on past coordinates or the like. Ball trajectory image data according to the estimated trajectory is generated and retained in steps F113 and F114. For example, a ball image included in the immediately preceding frame image data is arranged along the estimated ball trajectory and the ball trajectory image data is generated.

In step F115, the ball trajectory image data is transmitted to and received from the layer processing unit 3, and is composed with a motion transition image to that point.

For example, the image composed at this point in time becomes a motion transition image in which the ball is expressed ultimately, as shown in FIG. 3.

At this point in time, it is determined in step F118 that one frame has passed since the ball was out of frame, such that the process proceeds to step F119.

In step F119, the image output unit 4 outputs composite image data that is retained at that point in time (that is, composite image data in a state shown in FIG. 3) to the output device 40 as moving object image-attached motion transition still image data.

In this manner, one segment of moving object image-attached motion transition still image data is generated and output by the image processing apparatus 1 according to this embodiment.

However, in an example shown in FIG. 3, a background of the ball trajectory image data is also included. When the ball trajectory image data is transmitted to and received from the layer processing unit 3 in step F115, the ball background extracting and retaining unit 65 transmits and receives the background image to and from the layer processing unit 3, and this background image is supplied for the composition process.

This ball background image may be extracted by the following manner.

Figure 13A:
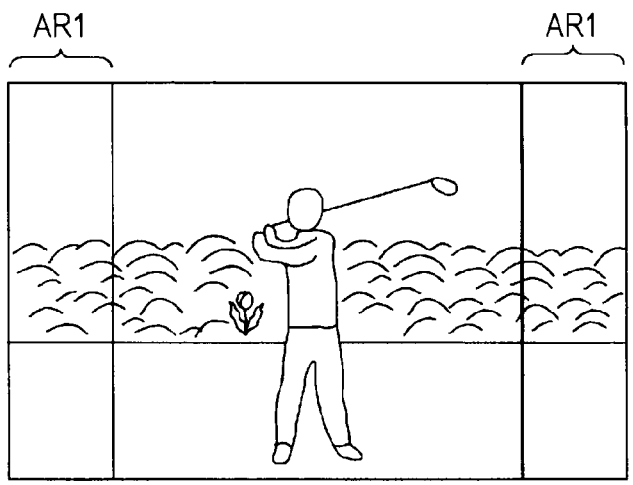
FIGS. 13A and 13B are explanatory views illustrating a background image of a ball trajectory image according to an embodiment.

First, as shown in FIG. 13A, a method of using areas AR1 other than a motion transition effective region, which are the left and right edges, is considered.

Figure 13B:
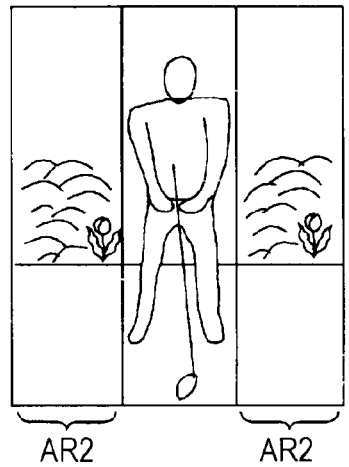

In addition, similarly to FIG. 13B, the using of information of areas AR2 that are the left and right edges may be considered. However, in this case, frame information at the moment of impact is used. This is because a body of the moving subject is assumed not to enter the left and right edges of the motion transition effective area at the moment of impact.

The ball background extracting and retaining unit 65 extracts the background image shown FIGS. 13A and 13B from the frame image data and retains this extracted background image. In addition, the ball background extracting and retaining unit 65 transmits and receives this background data to and from the layer processing unit 3, and allows all of this background data to be composed at the time of composing the ball trajectory image.

In addition, the layer processing unit 3 may perform the composition process in such a manner that the priority of the background image is made to be lower than that of the ball trajectory image data.

According to the above-described embodiment, in regard to an automatic generation of the motion transition image, compatibility between an exact expression of the moving subject through extension of a movable range and a temporal expression of an accurate motion transition by arranging a plurality moving subjects side by side may be realized.

Particularly, through the layer composition, each of the moving subject images is exactly expressed, for example, without omitting the end of a golf club, and it is possible to arrange a plurality of moving subject images side by side, such that it is possible to express the motion transition at a temporally very short interval.

In addition, it is possible to express a motion trajectory of a moving object that moves according to the motion transition, such that it is possible to easily realize an image that is valuable to user such as an image that capable of exactly expressing a motion in sports, and an interesting image.

In addition, in the case of the first embodiment, as shown in FIG. 3, an image in which the motion transition image portion such as a golf swing and the ball trajectory portion do not overlap with each other is formed.

That is, the composition process of the ball trajectory image data and the motion transition image data is performed in such a manner that the moving object (ball) image is arranged at an image area subsequent to the final moving subject image of a plurality of moving subject images that is sequentially arranged side by side in a predetermined direction.

Through this composition process, an image is obtained in which both of the motion transition and the ball trajectory are easily visible.

In addition, in regard to the background of the ball trajectory image, a background image included in the frame image data is made to be used, such that the background is substantially the same at portions of the motion transition image of a swing form and the ball trajectory image and therefore it is possible to obtain a sense of unity as one still image.

In addition, the image processing apparatus 1 according to this embodiment may be an apparatus capable of acquiring a plurality of frame image data that is captured by an image capturing apparatus capable of capturing a continuous still image or a moving picture. For example, the image processing apparatus 1 may be embedded in the image capturing apparatus, or may be embedded in a reproduction apparatus that reproduces the captured plurality of frame image data. In addition, the image processing apparatus 1 may be embedded in an apparatus which receives the captured plurality of frame image data and to which this image data is transmitted and input.

Therefore, for example, this image processing apparatus may be broadly applied to a cellular phone, a personal digital assistant (PDA), a personal computer, a video reproduction apparatus, a video editing apparatus, or the like.

3. Second Embodiment

Hereinafter, a second embodiment will be described. In addition, a configuration and a process of an image processing apparatus 1 according to the second embodiment is substantially the same as those of the first embodiment, and therefore only differing portions will be described.

Figure 14:
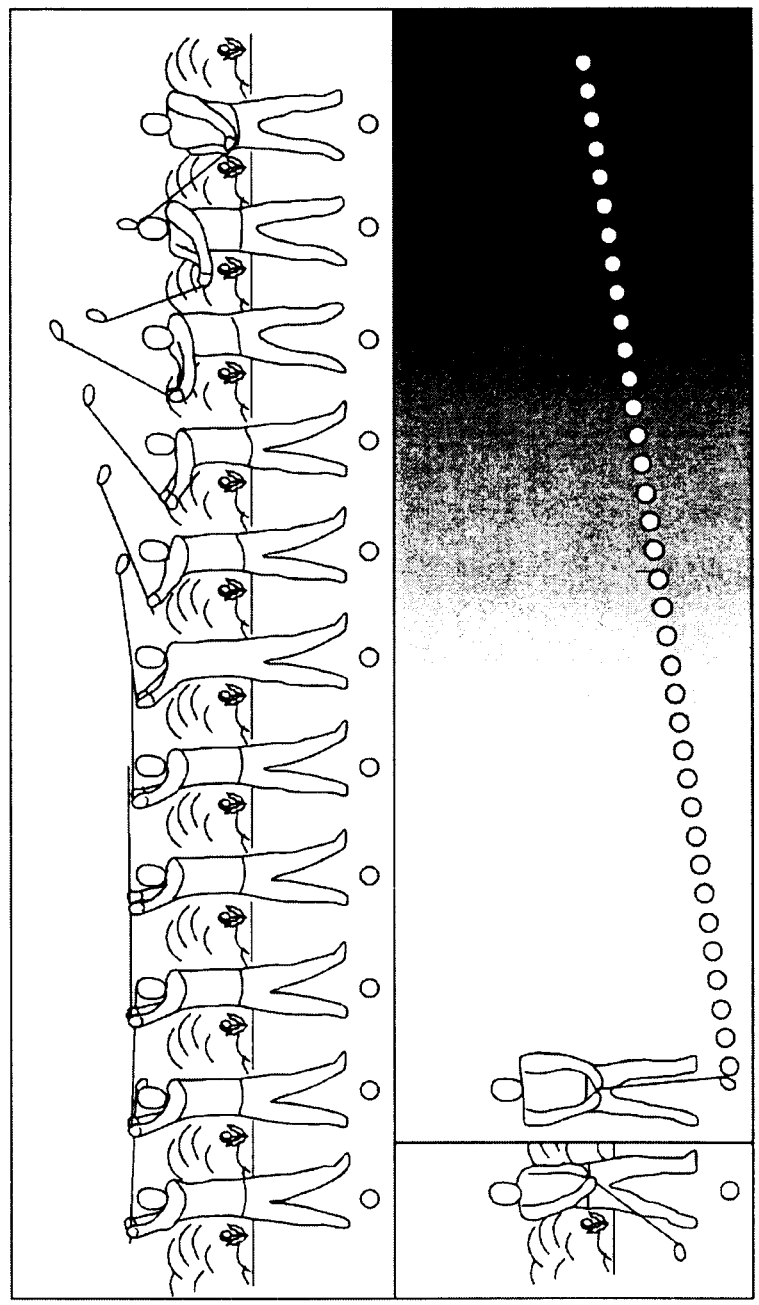
FIG. 14 is an explanatory view illustrating a moving object image-attached motion transition image according to a second embodiment.

FIG. 14 shows an example of a moving object image-attached motion transition still image that is generated according to the second embodiment.

This second embodiment is an example in which an image that is not present in frame image data such as an abstract image is as a background of a ball trajectory image.

First, in the above-described description, it is described that the ball background extracting and retaining unit 65 in the ball trajectory image generating unit 6 may retain an abstract background image that is not present in frame image data as an image that becomes the background of a ball trajectory. For example, a monotone image, an animated image, an image, or the like may be exemplified. FIG. 14 is an example in which the background of the ball trajectory image is formed by a gradation image as one kind of abstract image. That is, in the background of the ball trajectory image, an especially meaningful image is not arranged, and an image whose concentration only varies in the transverse direction is disposed.

In the ball background extracting and retaining unit 65, for example, an abstract background image such as this gradation background data is retained, and when the ball trajectory image is composed, the gradation background image is made to be transmitted to and received from the layer processing unit 3 as background image data, such that it is possible to obtain various composite images.

The example shown in FIG. 14 is illustrative only, and a background image in which a concentration direction of the gradation is different from the above-described example, a monotone image, one color image of red, blue, or the like, a geometric pattern image that is formed by various colors or shapes, or the like may be used as the background of the ball trajectory image.

In addition, a background image, which may be not visible in actual image-capturing, may be composed. This background image may include an image or a photographed image of rain, snow, and a clear sky, an animated image or a photographed image that expresses an image of outer space, see, mountain, or the like, an animated image or a photographed image of a plurality of audiences, or the like.

That is, an image, which is not obtained when a real golf swing is captured, is used as the background of the ball trajectory image, and a moving object image-attached motion transition image is generated.

In this manner, it is possible to generate an interesting image that has high entertainment value as a moving object image-attached motion transition image.

In addition, there is an effect of increasing a visibility of the ball trajectory image depending on the use of the monotone or gradation or the like as the background.

In addition, various abstract background images may be pre-set in the ball background extracting and retaining unit, and a user may select which image is to be used as the background.

In addition, a use may input an arbitrary image and allow this image to be retained in the ball background extracting and retaining unit, and the user may use the arbitrary image as the background of the ball trajectory image.

In addition, in regard to the background of the ball trajectory image shown in FIG. 14, an image different from a background at the time of real image capturing is used. However, in regard to the background of the motion transition image portion, that is, the background of a subject person who performs a golf swing, the above-described abstract background image that is not present in the frame image data may be used.

4. Third Embodiment

Hereinafter, a third embodiment will be described. In addition, a configuration and a process of an image processing apparatus 1 according to the third embodiment is substantially the same as those of the first embodiment, and therefore only differing portions will be described.

Figure 15:
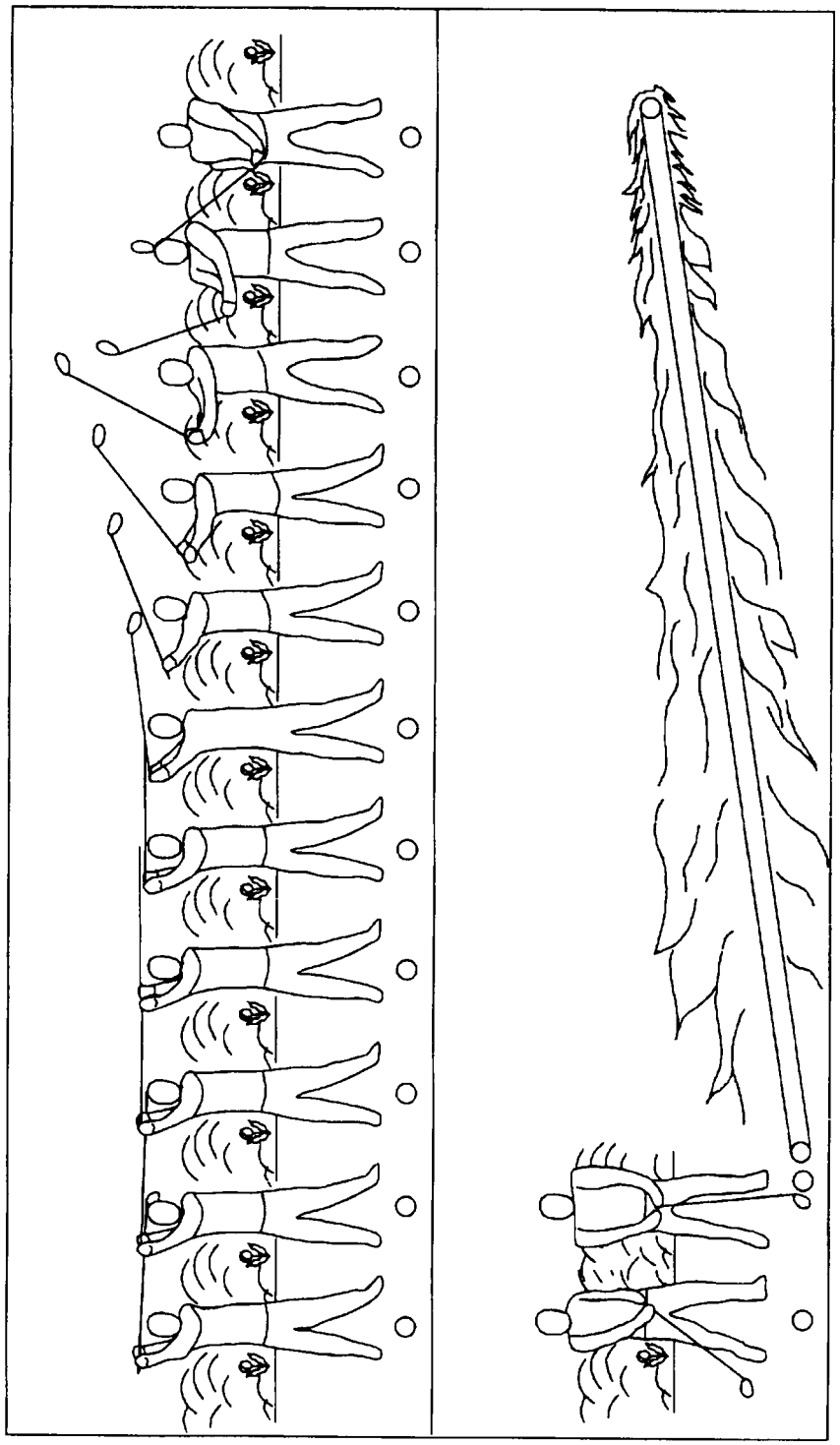
FIG. 15 is an explanatory diagram illustrating a moving object image-attached motion transition image according to a third embodiment.

FIG. 15 shows an example of a moving object image-attached motion transition still image that is generated according to the third embodiment.

This third embodiment is an example in which the ball trajectory image itself is generated by using an image other than a photographed ball image that is present in frame image data, for example, an abstract image.

The image composing unit 63 in the ball trajectory image generating unit 6 generates ball trajectory image data based on a ball trajectory estimated by the ball trajectory predicting unit 62.

In the first embodiment, for example, photographed ball images are arranged along a ball trajectory, and thereby the ball trajectory is expressed by a plurality of ball images.

On the contrary, in the third embodiment, a real ball image is not used, or may be partially used, but the ball trajectory is expressed by an image other than the real ball image. For example, a symbol mark image expressing a ball, an animated ball image, an image of a ball trajectory itself, or the like may be exemplified.

For example, an example shown in FIG. 15 is an example in which an image representing a ball (photographed or animated ball image) on the fly with flame while ripping space.

In addition to this, for example, the ball trajectory image data may be generated as an image such as a laser beam, an image of a rainbow-colored line, a broken line, and a line that proceeds while drawing a circle, or the like.

In addition, it may be considered that as the ball, a figure such as a shape of a star, a triangular shape, and a rectangular shape, or an image of an article other than the ball is used, and this figure or image is arranged along the ball trajectory.

In this manner, the image composing unit 63 generates ball trajectory image data by using an abstract image. This image data is transmitted to and received from the layer processing unit 3, and is composed with the motion transition image, such that a moving object image-attached motion transition image as shown in FIG. 15 may be generated.

In this manner, the ball trajectory image data is generated with an abstract image, such that various composite image with a highly entertaining property such as an interesting image, and a certain powerful image. When the ball trajectory is emphasized, it is possible to generate an image in which the trajectory is easily visible.

In addition, in regard to the abstract image for expressing the ball trajectory, various abstract images may be stored in the image composing unit 63 in advance, and a user may select which image is to be used.

In addition, a user may input an arbitrary image and allow this image to be retained in the image composing unit 63, and the user may use the arbitrary image to express the ball trajectory.

In addition, the abstract background image of the second embodiment, and the abstract ball trajectory image may be retained in a set, and the user may designate an arbitrary set.

5. Fourth Embodiment

Hereinafter, a fourth embodiment will be described.

The fourth embodiment is an example in which ball trajectory information is input to the image processing apparatus 1 from the outside.

For example, the ball information input unit 14 shown in FIG. 4 becomes a portion to which the ball trajectory information is input instead of a ball location within frame image data.

For example, in regard to serial frame image data that is already captured, in a case where an image analysis and an trajectory predicting process are performed at the outside of the image processing apparatus 1 shown in FIG. 1, when the composition is performed with the image processing apparatus 1, it may be considered a case where the ball trajectory information corresponding to the serial frame image data is already obtained. In this case, the ball trajectory information may be input from the ball information input unit 14.

In addition, in a case where an entertaining property is considered, it is not necessarily necessary to express an original ball trajectory. For example, as the ball trajectory, a ball trajectory that is rippled, or a ball trajectory that proceeds while drawing a circle may be considered. Ball trajectory information that is not present actually may be input to the image processing apparatus 1 from the outside.

As described above, in a case where the ball trajectory information is input from the ball information input unit 14, the ball trajectory image generating unit 6 does not perform the ball coordinate calculation and the ball trajectory prediction, and may determine a movement trajectory of the ball (moving object) based on the input ball trajectory information and may generate ball trajectory image data according to this determination.

Figure 16:
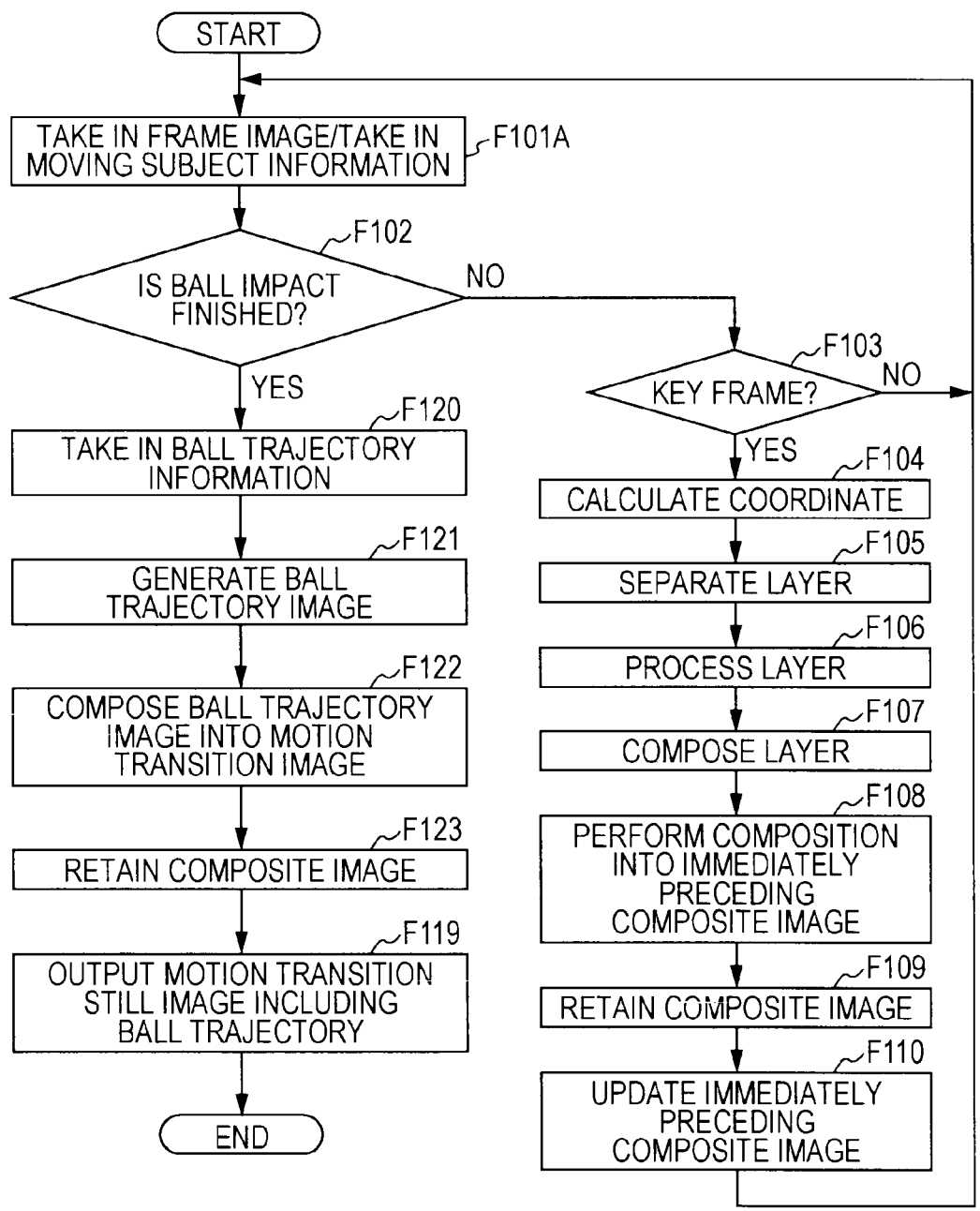
FIG. 16 is a flow chart illustrating a process of generating a moving object image-attached motion transition image according to a fourth embodiment.

Therefore, a process example shown in FIG. 16 may be considered.

In FIG. 16, steps F102 to F110 are substantially the same as steps F102 to F110 in FIG. 11, such that the description these steps will not be repeated.

In the case of FIG. 16, in step F101A, the input image selecting unit 2 performs the taking-in of the frame image data and the moving subject information. In addition, it is not necessary to perform the process of taking-in the ball information for each data input like step F101 in FIG. 11.

According to the taking-in of each frame image data until it is determined as a frame after the ball impact is finished in step F102, the motion transition image data is generated by the processes in step F103 to F110 as described in FIG. 11.

When the frame image data taken-in in step F101A is determined as a frame after the ball impact is finished in step F102, the process proceeds to step F120.

In step F120, the ball trajectory image generating unit 6 takes in the ball trajectory information from the ball information input unit 14.

In step F121, the image composing unit 63 of the ball trajectory image generating unit 6 generates the ball trajectory image data based on the input ball trajectory information.

In step F122, the ball trajectory image generated by the image composing unit 63 is transmitted to and received from the layer processing unit 3, and the ball trajectory image is composed into motion transition image data retained in the composite image updating and retaining unit 5 at that point in time.

In step F123, the composite image generated by the layer processing unit 3, that is, a moving object image-attached motion transition still image is retained in the image output unit 4 and in step F119, the moving object image-attached motion transition still image is output to the output device 40.

As described above, the ball trajectory image data may be generated by using the ball trajectory information input from the outside, and may be the motion transition image data.

In the ball trajectory image data in this case, similarly to the first embodiment, the ball trajectory image data may be generated by arranging the ball image present in the frame image data according to the ball trajectory information, and the image composite image as shown in FIG. 3 may be generated. In addition, a composite image as shown in FIG. 15 may be generated by generating an abstract ball trajectory image similarly to the third embodiment.

In addition, in the case of using the ball image extracted from the frame image data similarly to FIG. 3, step F101A in FIG. 11 may be substituted with a process of step F101, the ball trajectory generating unit 6 may input the ball information corresponding to the frame image data, and an image may be extracted from arbitrary frame image data based on the ball information.

6. Fifth Embodiment

Hereinafter, a fifth embodiment will be described. In the first embodiment described above, the motion transition image is formed by arranging side by side the moving subject images in a serial swing form until the impact.

The fifth embodiment is made to also express, for example, a follow-through of the swing by arranging the moving subject images after the impact side by side. In addition to this, the ball trajectory image is expressed.

An example of the moving object image-attached motion transition image is shown in FIG. 17. As shown in this drawing, the swing form is expressed by using the entire area of a screen from left-upper end to right-lower end.

For example, a ball location in an image at the moment of impact is made as a starting point, and the ball trajectory image is overlapped on the motion transition image.

A process of generating such a moving object image-attached motion transition still image will be described with reference FIG. 18. In addition, a configuration of the image processing apparatus 1 is the same as that of FIG. 4.

In step F201, the input image selecting unit 2 determines whether or not the taking-in of all serial frame image data that is an object to be composed is terminated.

At the points of time of taking-in each frame image data from the taking-in of the first frame image data to the taking-in of the final frame image data, the process proceeds from step F201 to step F202, and the input image selecting unit 2 performs the taking-in of the frame image data.

Temporally continuous frame image data is supplied to the input image selecting unit 2 from the image input unit 10. Whenever one sheet of frame image data is supplied, thin step F202, the input image selecting unit 2 takes in the frame image data, and moving subject information corresponding to the frame image data from the moving subject information generating unit 11 (or moving subject information input unit 12). In addition, the ball trajectory image generating unit 6 takes in the frame image data, and ball movement information corresponding to the frame image data from the ball information generating unit 13 (or ball information input unit 14).

In step F203, it is determined whether or not the frame image data that is taken in at this time is a frame of an image after the ball impact is finished. That is, it is determined whether or not the frame image data is an image after the moving object (ball) begins to move.

When the frame image data is not a frame after the ball impact is finished, the process proceeds to step F209.

Processes in steps F209 to F216 are substantially the same as steps F103 to F110 of FIG. 11, such that description thereof will not be repeated. In the case of FIG. 18, first, at the point in time of taking-in each frame image data until the moment of impact when a golf club head comes into contact with a ball, in steps F209 to F216, a motion transition image using a moving subject image of a key frame and a background image is generated.

At an arbitrary point in time, the frame image data input to the input image selecting unit 2 becomes an image after the moment of impact of the ball. In this case, the process proceeds from step F203 to step F204. In step F204, it is determined whether or not the frame image data that is taken in at this time is frame image data after one frame has passed since the ball was out of frame.

For example, description is made with reference to an example shown in FIG. 5. Processes in steps F205 to F208 are performed when frames FR22 to FR25 are taken in as a first frame that is out of frame immediately after the ball impact.

The processes in steps F205 to F208 are substantially the same as steps F111 to F114 in FIG. 11.

Therefore, for example, when the frames FR22 to FR25 shown in FIG. 5 are taken in, the following process is performed.

For example, at a point in time when the frame FR22 is input as frame image data immediately after the impact, the process proceeds to step F205. In this case, the ball coordinates in the frame FR22 are calculated by the ball coordinate calculating unit 61. In regard to a ball trajectory in this case, a trajectory connecting stationary location coordinates until before the frame FR21 and the present ball location coordinates is regarded as ball trajectory information in step F206.

An image corresponding to this ball trajectory information is generated in step F207 by the image composing unit 63, and is retained in step F208 by the ball trajectory retaining unit 64.

Then, the process proceeds to step F209.

In this case, when the frame FR22 is set as a key frame, processes in steps F210 to F216 are performed by using a moving subject image of this frame FR22. That is, the composition of the motion transition image is continuously performed. When the frame FR22 is not set as a key frame, the process returns to step F201, and a next frame image data is taken in.

Even when the frame FR23 is taken in as next frame image data, the same process is performed.

That is, the ball location coordinates are calculated in step F205, and in step F206, a ball trajectory is predicted by using the immediately preceding ball trajectory and the current coordinates. An image according to the trajectory is generated and is retained in steps F207 and F208. Then, the process proceeds to step F209. When the frame FR23 is a key frame, steps F210 to F216 are also performed.

This is true to a case where further next frame FR24 is input.

Then, even when an image in which the ball is already out of frame is input as the frame FR25, steps F205 to F208 are performed. However, at this time, it is determined that the ball image is not present from the ball information, and the calculation of coordinates in step F205 is not performed. Furthermore, in this case, a subsequent ball movement is estimated from a ball movement determined until the immediately previous time in step F206.

This estimation may be performed such that the ball trajectory to that point is linearly extended. In addition, for example, it is possible to estimate the ball speed from a ball coordinate value between the frames FR21 and FR22 or between the frames FR22 and FR23, and a time interval of each frame, such that a parabolic trajectory according to the speed may be estimated in consideration of the ball speed.

In addition, the ball trajectory may be estimated by analyzing a state of a club head and a state of the vicinity of the ball from an image at the moment of impact.

In this manner, when an input of the frame image data after the ball is out of frame is detected, the ball trajectory is estimated based on past coordinates or the like. Ball trajectory image data according to the estimated trajectory is generated and retained in steps F207 and F208. For example, a ball image included in the immediately preceding frame image data is arranged along the estimated ball trajectory and the ball trajectory image data is generated.

Then, the process proceeds to step F209. When the frame FR25 is a key frame, steps F210 to F216 are also performed.

Subsequently, even when a frame FR26 is input, the process proceeds from step F203 to F204. However, at this point in time, it is determined that one frame has passed since a ball was out of frame, such that steps F205 to F208 are not performed and the process proceeds to step F209. When the frame FR26 is a key frame, steps F210 to F216 are also performed.

This is true to a case where an input after a frame FR27 is performed.

Then, when taking-in of all serial frame image data is completed, the process proceeds from step F201 to step F217.

At this point in time, the motion transition image using each frame of the serial frame image data is composed. For example, the motion transition image is a motion transition image where images of a swing process sequentially including a backswing, an impact, and a follow-through are arranged side by side as shown in FIG. 17. This motion transition image is retained in the image output unit 4 and the composite image updating and retaining unit 5.

However, at this point in time, a ball trajectory image is not composed into the motion transition image.

Therefore, in step F217, a process of composing the ball trajectory image into a motion transition image. That is, the ball trajectory image data, which is generated by processes in step F205 to step F208 and is retained in the ball trajectory image retaining unit 64, is transmitted to and received from the layer processing unit 3. In the layer processing unit 3, a process of composing the newest motion transition image data retained in the composite image updating and retaining unit 5 and the ball trajectory image data is performed.

In addition, the composition is performed such that the ball trajectory image at this time is displayed in preference to the motion transition image.

In this manner, for example, a moving object image-attached motion transition still image as shown in FIG. 17 is generated.

In step F218, the composite image data is transmitted to the image output unit 4 and is retained therein. In step F219, the image output unit 4 outputs the composite image data (that is, composite image data in a state of FIG. 17) retained at that time to the output device 40 as moving object image-attached motion transition still image data.

In this manner, one sheet of moving object image-attached motion transition still image data is generated by the image processing apparatus 1 and is output.

As described above, in the fifth embodiment, the image processing apparatus 1 performs a process of composing the ball trajectory image data and the motion transition image data in such a manner that the moving object (ball) image is disposed to be imposed on a plurality moving subject images that is sequentially arranged side by side in a predetermined direction.

In this manner, as shown in FIG. 17, the number of moving subjects is many, such that there is obtained a motion transition image in which a swing form or the like is expressed in a relatively broad time interval, and a ball trajectory is expressed corresponding to this.

In this manner, it is possible to realize an exact and detailed expression of the motion transition image, an expression by the ball trajectory image, and an existing expression.

In addition, in this case, it is also possible to create a highly entertaining composite image by expressing the ball trajectory with an abstract image similarly to the third embodiment.

On the other hand, in the case of the fifth embodiment, the motion transition image and the ball trajectory image overlap with each other, such that in some cases, both of the images may be difficult to see.

Therefore, one side of these images may be made to be invisible at an overlapping portion.

Figure 19:
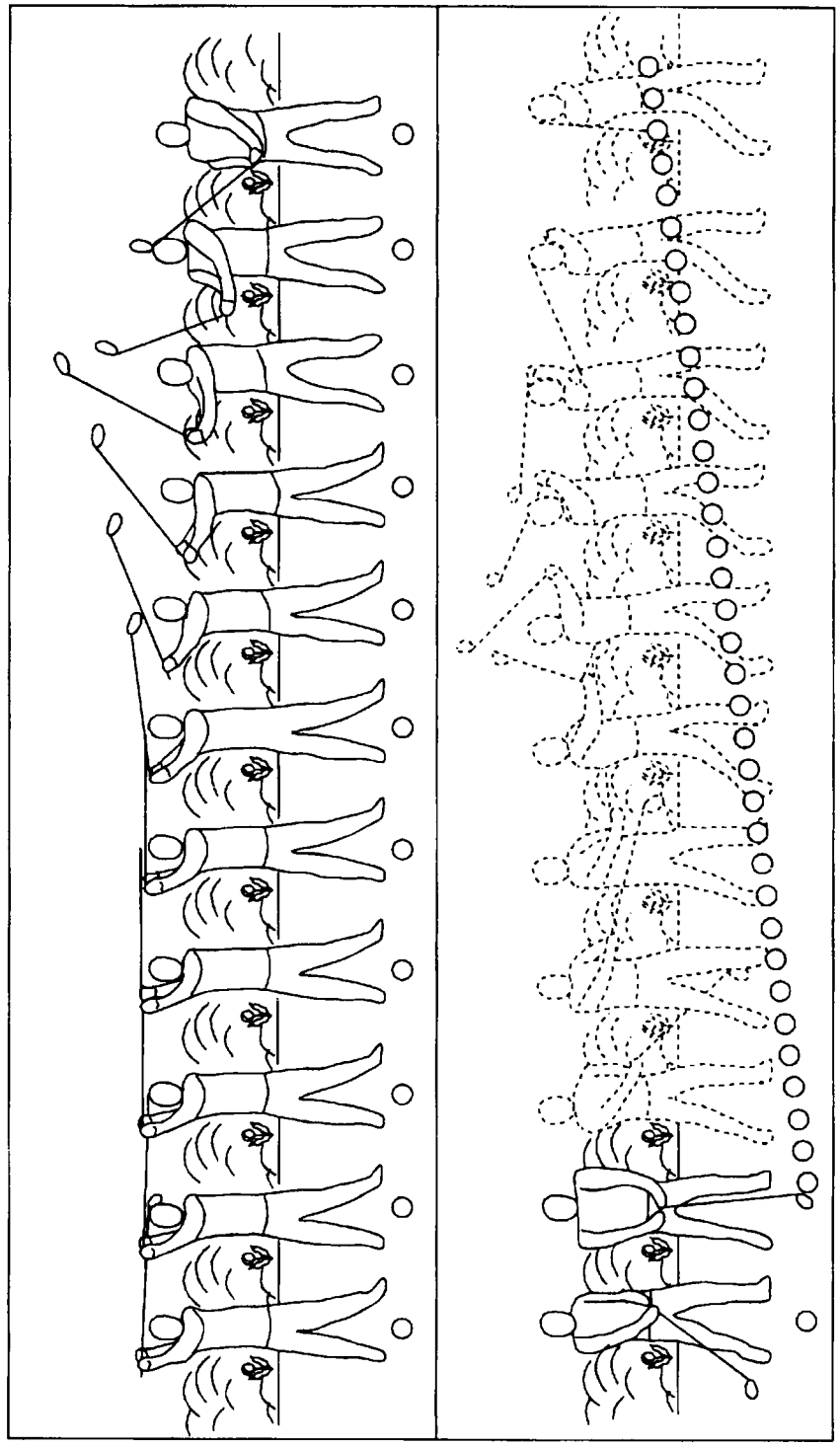
FIG. 19 is an explanatory view illustrating a moving object image-attached motion transition image according to a modification of the fifth embodiment.

For example, in FIG. 19, the moving subject image and the background image after the impact are expressed by a broken line, but actually, this broken line portion is formed of, for example, a monochrome image, a grayed out image, or the like. That is, in regard to a key frame after the impact, for example, in addition to a processing into a monochrome image, a grayed out image, or the like, through a layer processing process in step F212, a layer composing process in step F213 is performed.

In this manner, illegibility due to the overlapping does not occur, such that moving object image-attached motion transition still image in which the ball trajectory is explicitly expressed can be obtained.

7. Sixth Embodiment

Hereinafter, a sixth embodiment will be described. This sixth embodiment will be described as a process according to a user operation after outputting the moving object image-attached motion transition still image similarly to the fifth embodiment. However, this embodiment may be also applied to a process according to a user operation after outputting the moving object image-attached motion transition still image of the first embodiment.

For example, it is assumed that a moving object image-attached motion transition still image as shown in FIG. 17 is generated and is displayed on a display device as an output device 40.

Figure 20:
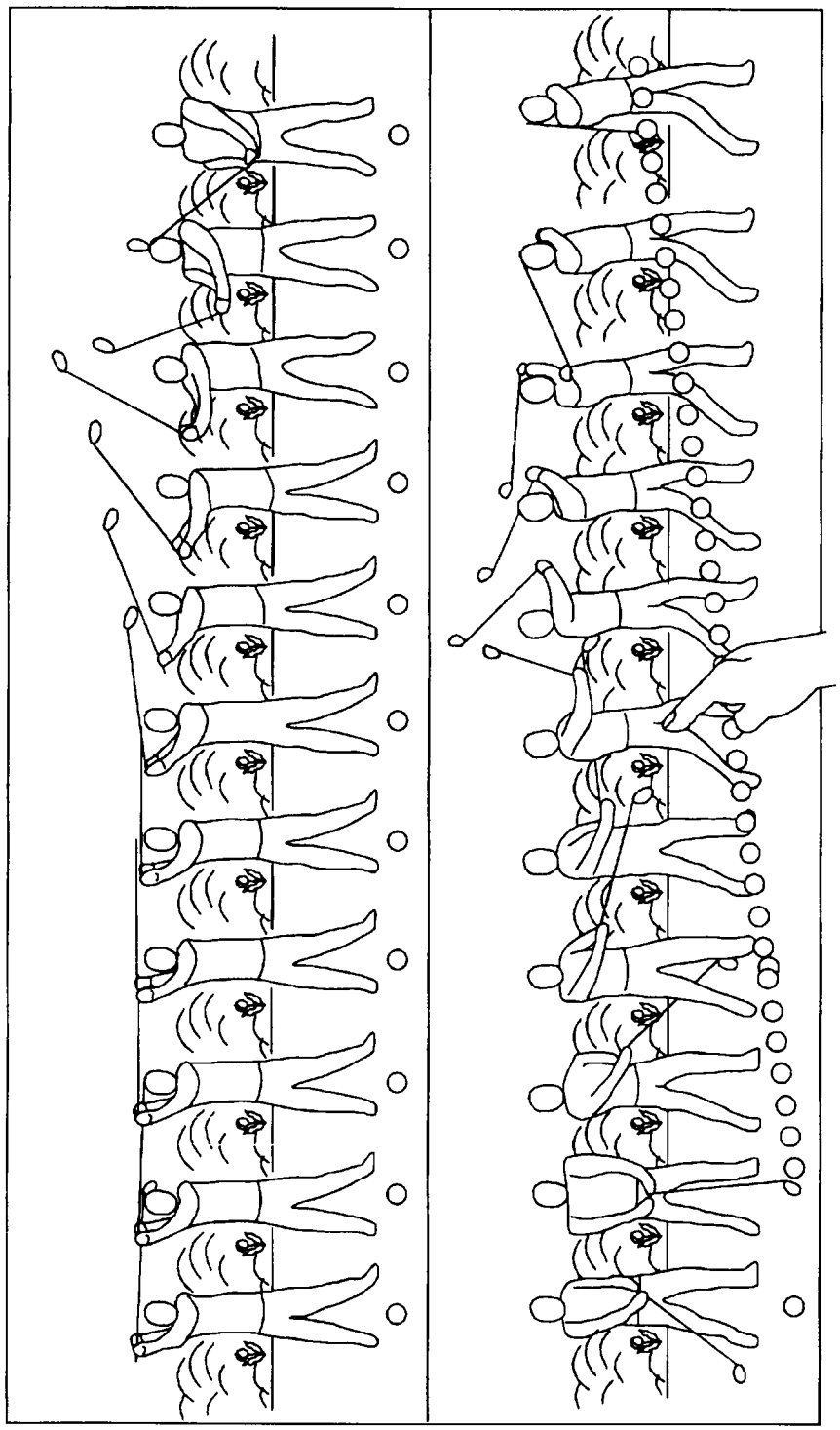
FIG. 20 is an explanatory view illustrating a designation of a moving subject in regard to a sixth embodiment.

With respect to this still image, a user performs an operation input for designating a moving object image of an arbitrary frame as shown in FIG. 20. When the display device is provided with a touch panel function, this operation may be performed through a touch input by a finger or the like. In addition, a designation input may be performed by operating a cursor, a mouse pointer, or the like that is made to move on a screen. In addition, the designation may be performed by using an operation unit such as a remote controller and hardware keys. Any designation method may be adopted as long as the user can designate an arbitrary moving subject image that is displayed side by side in the displayed motion transition image.

Figure 21:
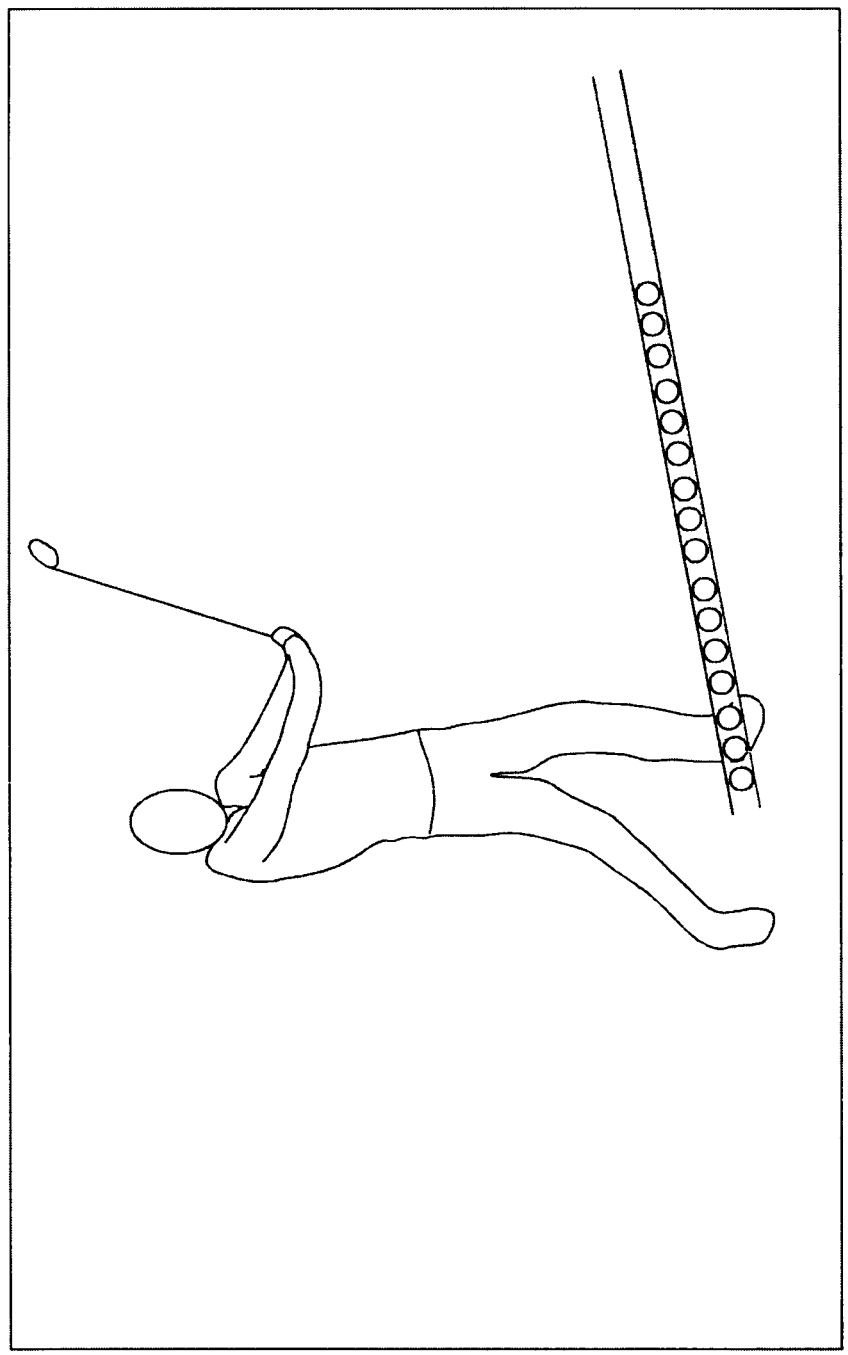
FIG. 21 is an explanatory view illustrating a composite image according to the sixth embodiment.

When a user designates an arbitrary moving subject image, a composite image in which this designated moving subject image is enlarged and a ball trajectory image is composed is output as shown in FIG. 21.

Figure 22:
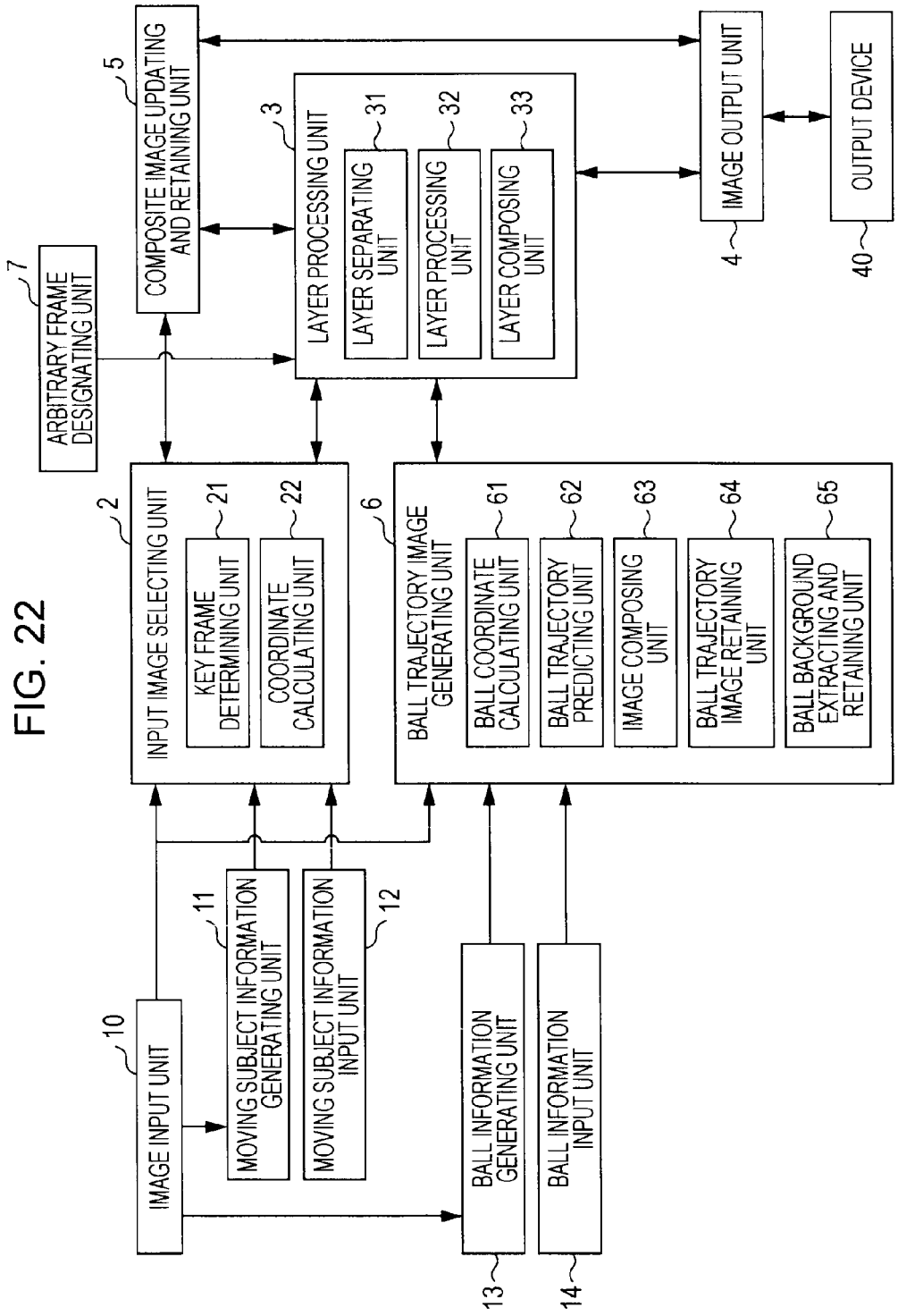
FIG. 22 is a block diagram illustrating a configuration of an image processing apparatus according to the sixth embodiment.

To realize this motion, the image processing apparatus 1 has a configuration of FIG. 22. In addition, like reference numerals will be given to the same parts as those of FIG. 4, and description thereof will not be repeated. A difference between FIG. 22 and FIG. 4 is that an arbitrary frame designating unit 7 is provided in FIG. 22.

The arbitrary frame designating unit 7 detects an operation input of a user, specifies the designated moving subject, and informs the layer processing unit 3 of the specified moving subject.

This arbitrary frame designating unit 7 is configured as a unit that detects the touch panel input, the mouse pointer input, the remote controller input, or the like, and determines a moving subject image designated by the user.

Figure 23:
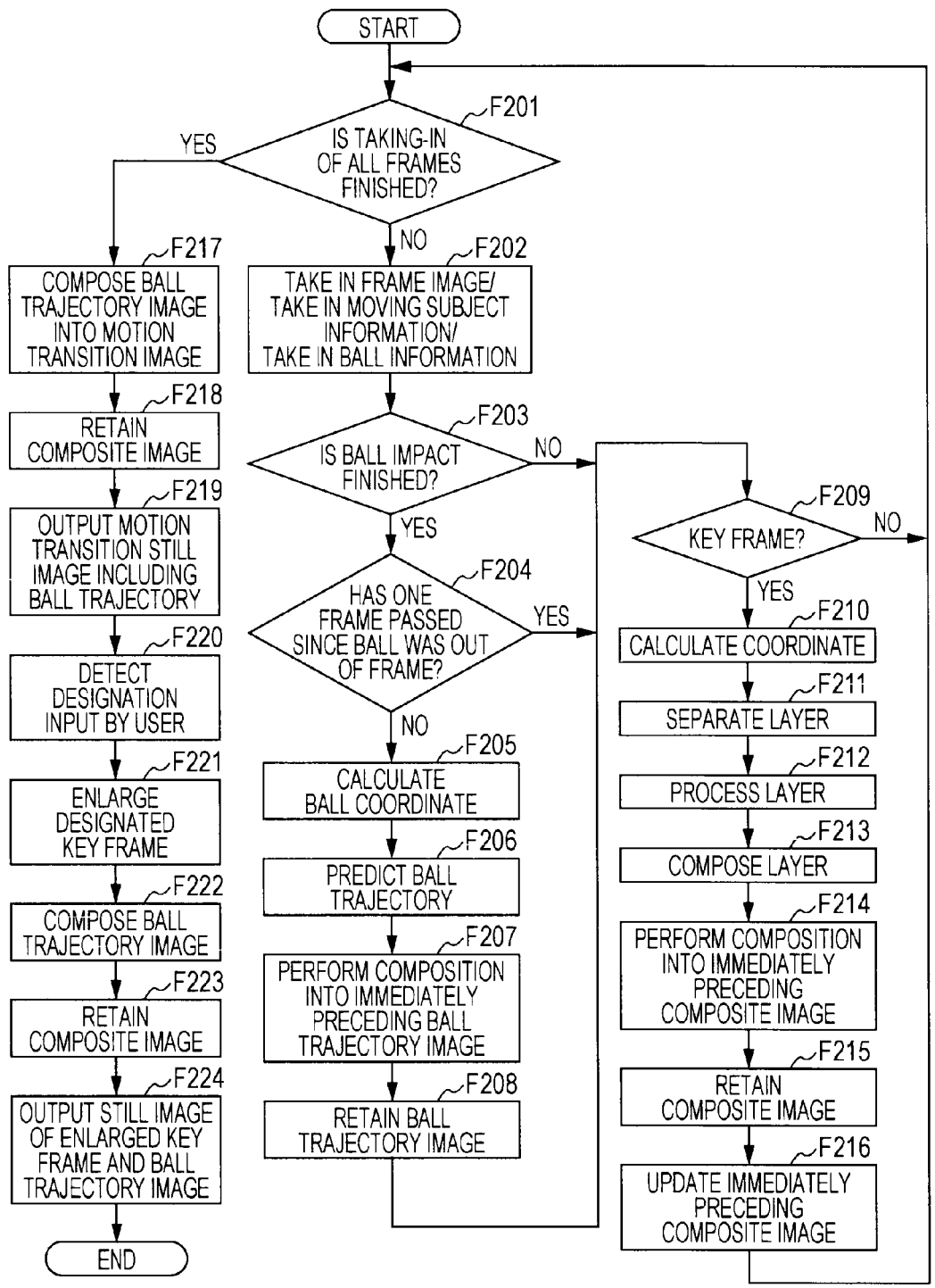
FIG. 23 is a flow chart illustrating a composition process according to the sixth embodiment.

The image processing apparatus 1 has the above-described configuration and performs a process shown in FIG. 23.

Figure 18:
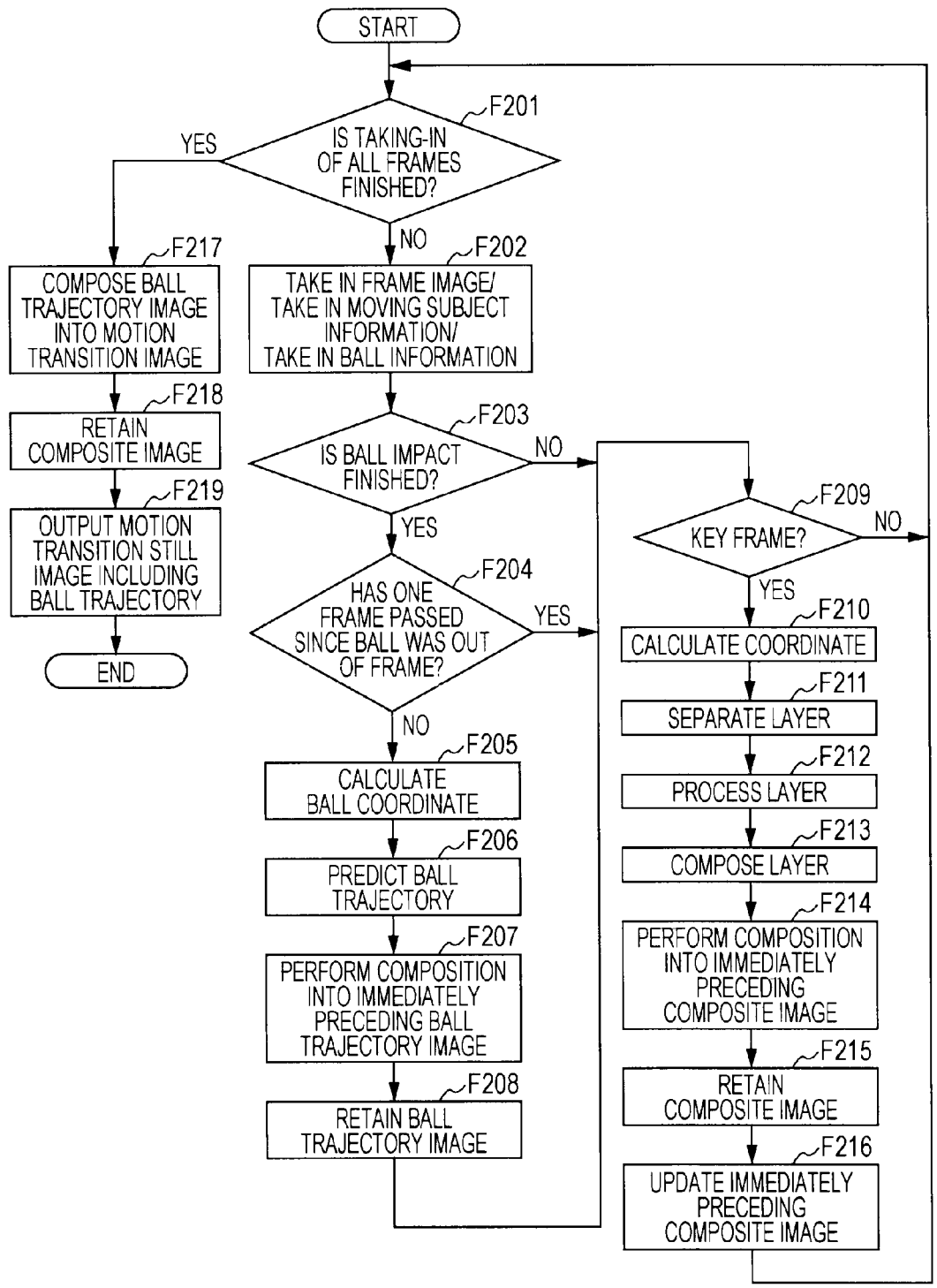
FIG. 18 is a flow chart illustrating a process of generating a moving object image-attached motion transition image according to the fifth embodiment.

In addition, in steps F201 to F219 of FIG. 23, the same process as that in FIG. 18 in the fifth embodiment is performed. In this sixth embodiment, the above-described enlargement display is performed after step F220.

Through steps F201 to F219, for example, a moving object image-attached motion transition still image as shown in FIG. 17 is generated and is displayed and output.

With respect to this display, as shown in FIG. 20, for example, a user may perform a designation operation through a touch operation. In step F220, the arbitrary frame designating unit 7 detects the designation input of the user. For example, the coordinates of the designated location on a screen are correlated with the coordinates of the moving object image-attached motion transition still image, and it is determined whether or not the an area in which the moving subject image of which frame image data (key frame) is designated. The arbitrary frame designating unit 7 informs the layer processing unit 3 of the number of the determined key frame.

The layer processing unit 3 performs an enlargement process of an image with the designated number as a process in step F221.

That is, the layer processing unit 3 cuts out a moving subject image of the designated frame among motion transition images that is retained in the composite image updating and retaining unit 5, and subjects this cut-out moving subject image to an enlargement process by the layer processing unit 32.

Furthermore, in step F222, the layer processing unit 3 performs the composition process of the ball trajectory image. That is, the layer processing unit 3 receives the ball trajectory image data that is retained in the ball trajectory image retaining unit 64, and composes this ball trajectory image data and the moving subject image of the designated frame that is enlarged in the layer processing unit 32 by the layer composing unit 33. Then, the layer processing unit 3 outputs the composite image data to the image output unit 4.

In step F223, the image output unit 4 stores and retains the supplied composite image. In step F224, image output unit 4 supplies the composite image to the output device 40, for example, a display device to be displayed and output. In this manner, a composite image in which the enlarged key frame and the ball trajectory image are composed is displayed as shown in FIG. 21.

As described above, in the sixth embodiment, the arbitrary frame designating unit 7 is provided as a designation unit that designates one moving subject image among a plurality of moving subject images that is sequentially arranged side by side in a predetermined direction. In addition, in the layer processing unit 3, a moving subject image of the frame is enlarged and is composed with the ball trajectory image. This composite image is output, such that the user can obtain an image in which an arbitrary moving subject image and a ball trajectory image are expressed.

In this manner, an image at a favorite timing (pose) and a ball trajectory image are composed, and thereby a new image is created, such that it is possible to increase a usability of the motion transition image. For example, an image in which a user hits a ball with the most preferable pose may be easily created.

In addition, in regard to a background image, a background image of a designated frame may be used as is. That is, in regard to the designated frame, the composition may be performed in such a manner that not only the moving subject portion but also the background portion are enlarged, and a ball trajectory image overlaps on the enlarged portion.

In addition, a composite image shown in FIG. 21 may be generated in such a manner that the background image is not extracted from a frame, and an abstract background described in the second embodiment is used.

In addition, in the above description, a composite image that is composed by overlapping a motion transition image and a ball trajectory image as shown in FIG. 17 is presented to a user in step F219 of FIG. 23, and a user is allowed to designate an arbitrary frame in step F220. In addition to this, like FIG. 3 in the first embodiment, it may be also possible that a user designate an arbitrary frame, composes an enlarged image of the designated frame and a ball trajectory image, and generates a composite image as shown in FIG. 21 and outputs the generated composite image, in a state where a composite image in which the motion transition image and the ball trajectory image are not overlapped is presented to a user.

In addition, it may be considered that for example, in a step F219, a motion transition image in a state where the ball trajectory image is not composed yet is presented, a user is allowed to select an arbitrary frame, and then a composite image as shown in FIG. 21 is generated and is output with a process in steps F221 to F224.

8. Seventh Embodiment

Hereinafter, a seventh embodiment will be described. The seventh embodiment is an example in which a user is allowed to adjust a layout of a moving object image-attached motion transition still image or this layout is automatically adjusted to a very appropriate layout. In addition, this embodiment is made under the assumption that a moving subject image and a ball trajectory image do not overlap with each other, and the ball trajectory image is disposed at an image area subsequent to a final moving subject of a plurality of moving subject images that is sequentially arranged side by side in a predetermined direction similarly to the first embodiment.

Figure 24:
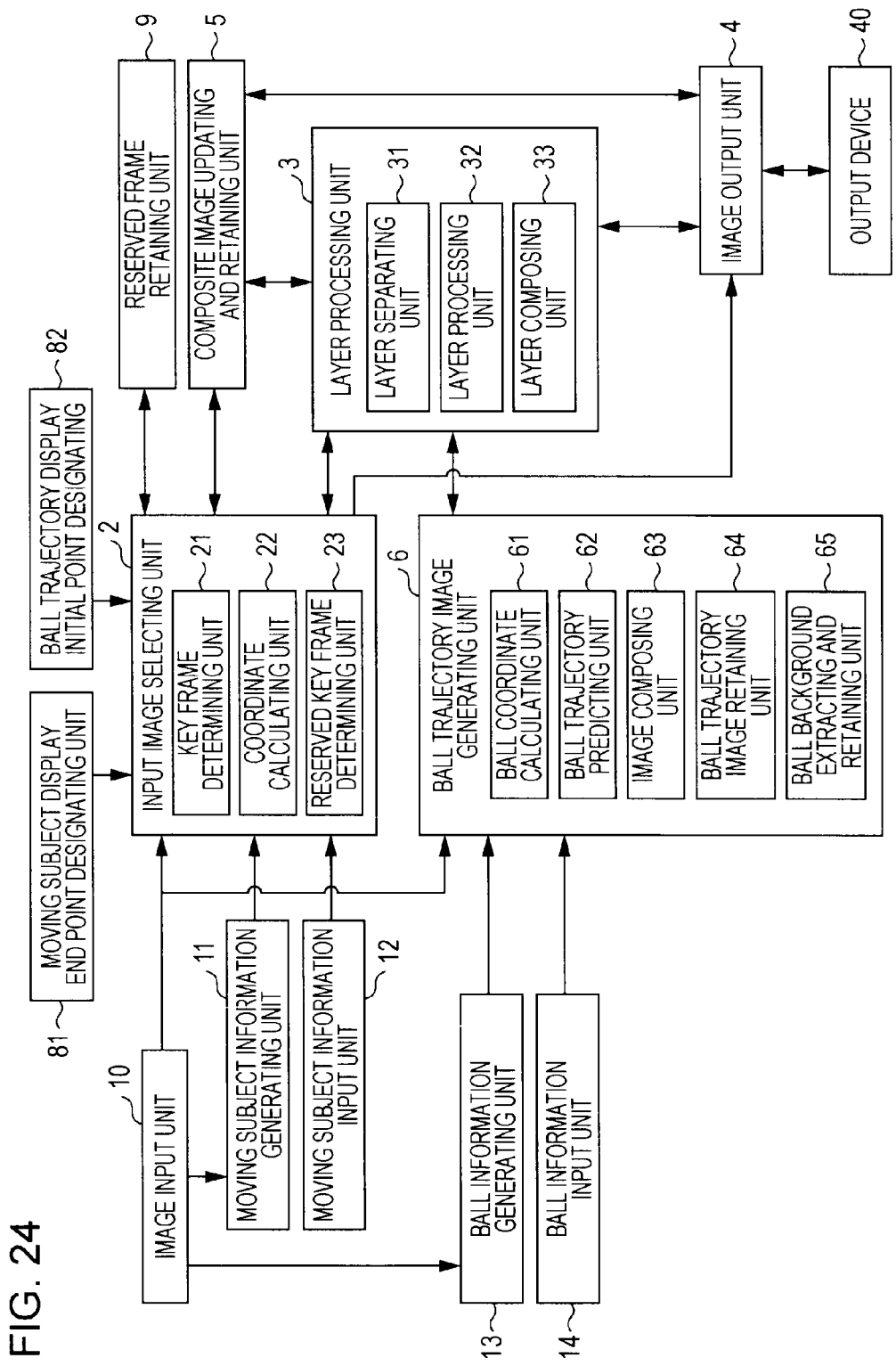
FIG. 24 is a block diagram illustrating a configuration of an image processing apparatus according to a seventh embodiment.

A configuration of the image processing apparatus 1 is shown in FIG. 24. In addition, like reference numerals will be given to the same parts as those of FIG. 4, and description thereof will not be repeated. A difference between FIG. 24 and FIG. 4 is that a moving subject display end point designating unit 81, a ball trajectory display initial point designating unit 82, a reserved key frame retaining unit 9, and a reserved key frame determining unit 23 are provided in addition to the configuration of FIG. 4.

The moving subject display end point designating unit 81 detects an operation input of a user, specifies a designated moving subject, and informs the input image selecting unit 2 of this specified moving subject.

The moving subject display end point designating unit 81 detects, for example, a touch panel input, a mouse pointer input, a remote controller input, a hardware key input, a communication input, or the like, and determines a moving subject image designated by a user.

The ball trajectory display initial point designating unit 82 detects an operation input of a user, specifies an area on the designated image, and informs the input image selecting unit 2 of the designated area.

The ball trajectory display initial point designating unit 82 may detect, for example, a touch panel input, mouse pointer input, remote controller input, hardware key input, communication input, or the like, and determine an area in the image designated by a user.

When a composite image of the motion transition image and the ball trajectory image is output, the moving subject display end point designating unit 81 and the ball trajectory display initial point designating unit 82 make it possible to set that a fraction of an area of the image is to be used for the expression of the ball trajectory (ball trajectory display initial point designating unit 82), or to set that to which swing motion among the entirety of swing form is to be expressed (moving subject display end point designating unit 81).

The reserved key frame determining unit 23 is provided as a function of the input selecting unit 2. This reserved key frame determining unit 23 performs a process of determining relatively plural key frames including the key frame determined by the key frame determining unit 21 as a reserved key frame.

The reserved key frame retaining unit 9 stores and retains the frame image data determined as the reserved key frame by the reserved key frame determining unit 23.

The reserved key frame determining unit 23 and the reserved key frame retaining unit 9 determines and retains a reserved key frame that becomes a candidate based on the input of a user with respect to the moving subject display end point designating unit 81 and the ball trajectory display initial point designating unit 82, because the reserved image frame becomes necessary when a motion transition still image is reconstructed.

For example, description is made with reference to FIGS. 28A and 28B, and FIGS. 29A and 29B, but for example, to cope with a case where the motion transition to a point in time of a stage in which a swing form is relatively fast is appropriately arranged, the determination on the reserved key frame is more frequent than that of normal key frame.

A flow of serial processes will be described with reference a flow chart in FIG. 25.

Figure 25:
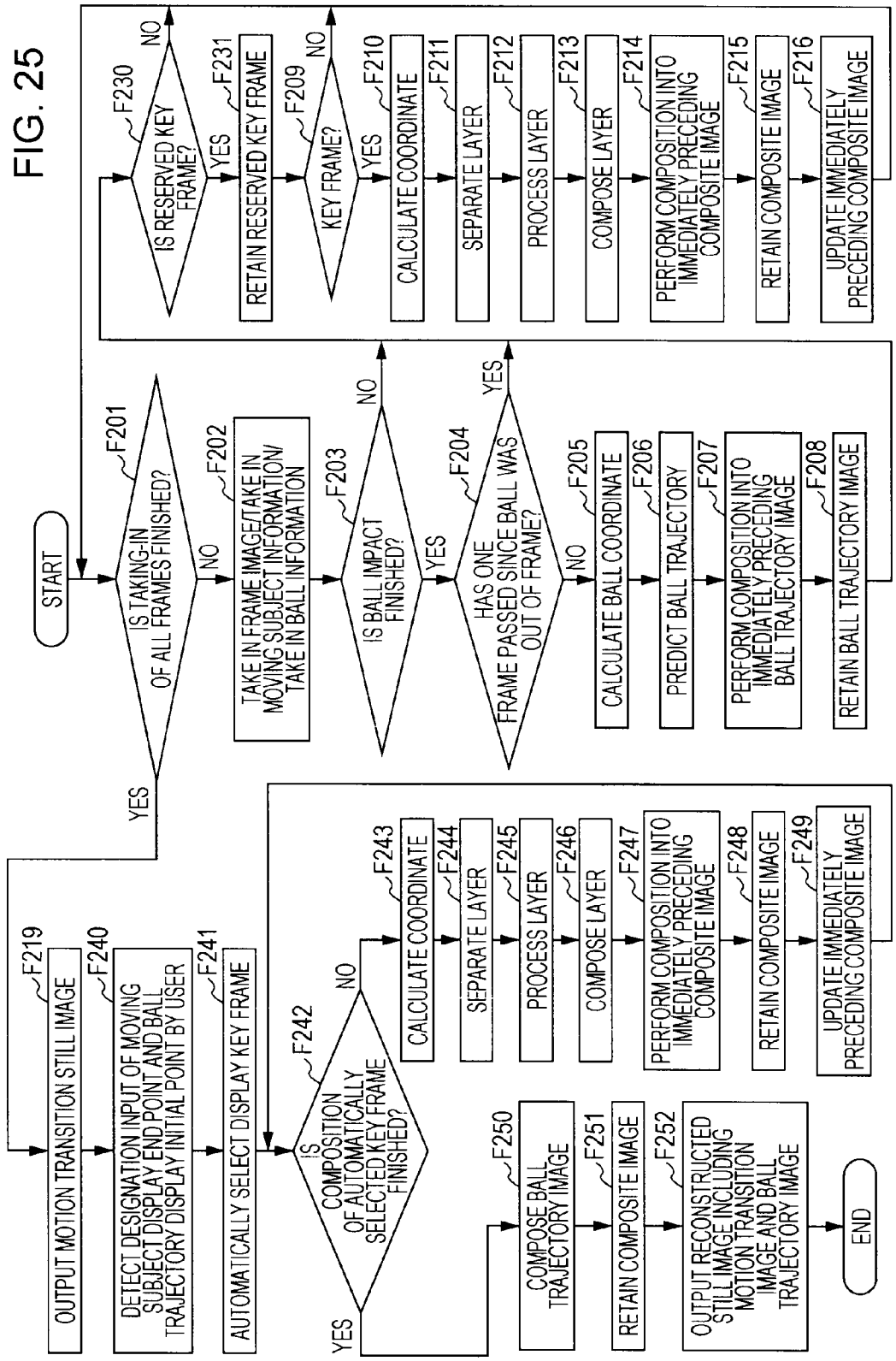
FIG. 25 is a flow chart illustrating a composition process according to the seventh embodiment.

In addition, a basic process in each step of steps F201 to F219 of FIG. 25 is substantially the same as that in steps F201 to F219 of FIG. 18, such that the description will not be repeated. However, configurations of FIG. 18 and FIG. 25 are different from each other in that in the case of FIG. 25, steps F230 and F231 are added before step F209, and in the case of FIG. 18, steps F217 and F218 are not necessary (but may be executed). On the basis of this, a process of FIG. 25 will be described.

Temporally continuous frame image data is supplied to the input image selecting unit 2 from the image input unit 10. Until it is determined that the composition of the serial frame image data that is an object to be processed is terminated in step F201, whenever one sheet of frame image data is supplied, the input image selecting unit 2 performs a process of taking-in the frame image data, and moving subject information corresponding to the frame image data from the moving subject information generating unit 11 (or the moving subject information input unit 12) in step F202. In addition, the ball trajectory image generating unit 6 performs a process of taking-in ball information corresponding to the frame image data from the ball information generating unit 13 (or the ball information input unit 14).

In step F203 and step F204, when it is determined that the ball is hit, and it is determined that one frame has not passed since the ball was out of frame, the calculation of a ball coordinates, the prediction of a ball trajectory, the composition into the immediately preceding ball trajectory image, and the retaining of a ball trajectory image are performed in steps F205 to F208.

In steps F209 to F216, the generation of the motion transition image is performed, but the determination on the reserved key frame is performed in step F230, and the retaining of the reserved key frame is performed in step F231, this is different from the above-described process of FIG. 18 or the like.

The reserved key frame determining unit 23 determines a normal key frame and a frame other than the normal key frame as a reserved key frame. As an example, when the key frame determining unit 21 determines frame image data for every four frame as a key frame, the reserved key frame determining unit 23 determines frame image data for every two frames as a reserved key frame.

The reserved key frame includes a normal key frame, such that in a process when a frame determined as not being the reserved key frame in step F230 is taken-in, this frame is automatically regarded as not being the key frame, and not only step F231 and but also steps F209 to F216 are skipped and the process returns to step F201.

When it is determined as a reserved key frame in step F230, present frame image data is retained as a reserved key frame by the reserved key frame retaining unit 9 in step F231.

Then, when it is determined as a key frame through the determination in step F209, the generation of the motion transition image in steps F210 to F216 similarly to FIG. 18 or the like.

Then, when it is determined that the taking-in of all frames is terminated in step F201, the process proceeds to step F219, and the image output unit 4 outputs a motion transition still image that is retained at that point in time.

Figure 26A:
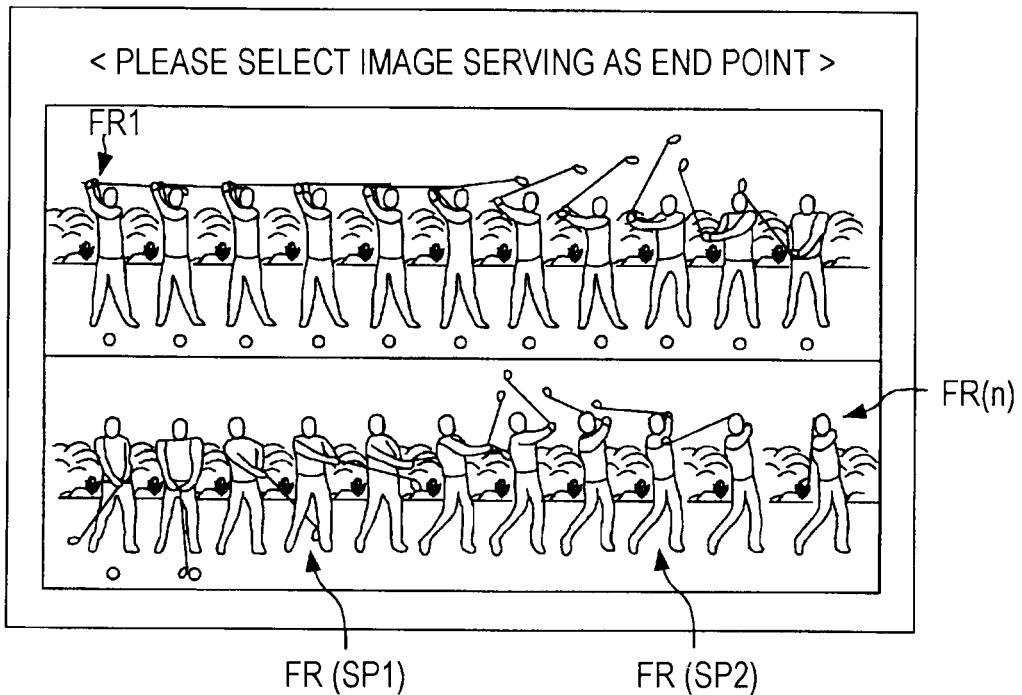
FIGS. 26A and 26B are explanatory views illustrating a selection of an end point according to the seventh embodiment.

In this case, for example, as shown in FIG. 26A, a composite image in which the ball trajectory image is not composed yet is output. For example, a motion transition image in which moving subject images extracted from respective key frames as frames FR1 to FR(N) are arranged side by side may be exemplified.

However, at a point in time of step F219, a motion transition image in which the ball trajectory image is composed may be output. For example, at the point in time of processing a frame in which a ball is out of frame, ball trajectory image data that is generated in step F207 and is retained in step F208 may be transmitted to the layer processing unit 3 and may be composed in step F213. In addition, similarly to FIG. 18, the ball trajectory image may be composed into the motion transition image by performing steps F217 and F218 of FIG. 18 immediately before step F219.

Anyway, in the case of this embodiment, there is no problem in step F219 as long as a motion transition image generated by composition of at least key frame is present.

In addition, in the case of this embodiment, at the point of output in step F219, as shown in FIG. 26, for example, it is preferable that a message "Please select an image to be set as an end point." be displayed to a user.

In step F240, the image processing apparatus 1 performs a detection of a user input by the moving subject display end point designating unit 81 and the ball trajectory display initial point designating unit 82.

For example, in a display output like FIG. 26A, the image processing apparatus 1 waits a user input.

Figure 26B:
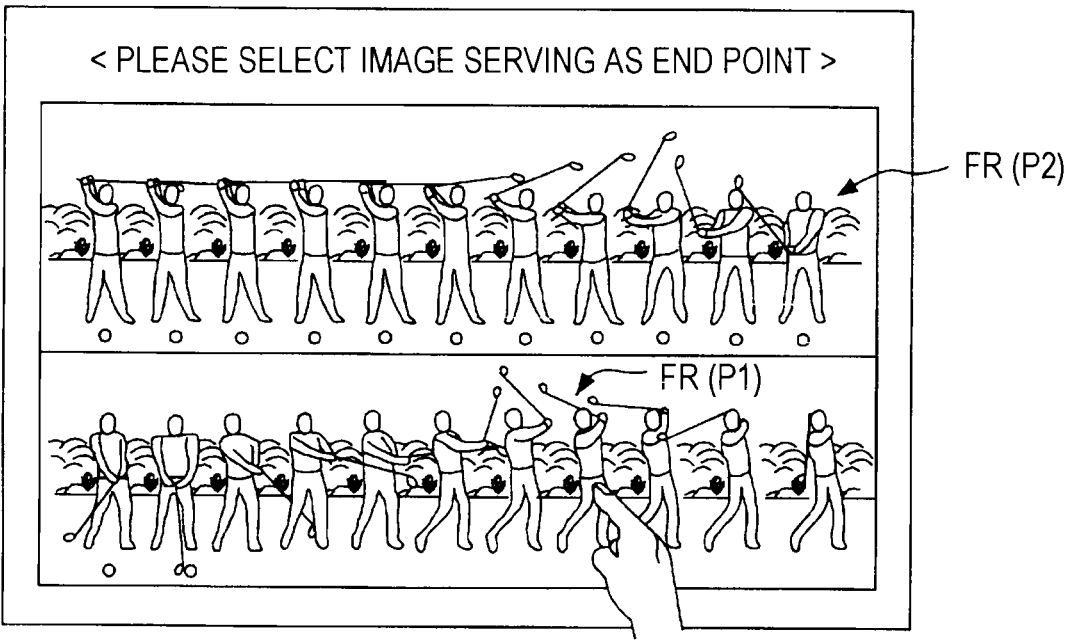

On the contrary, as shown in FIG. 26B, it is assumed that a user designates an arbitrary moving subject (frame FR(P1)) through a touch panel operation.

The moving subject display end point designating unit 81 detects this designation input, and informs the input image selecting unit 2 that the frame FR(P1) is designated as the motion transition image.

Figure 27A:
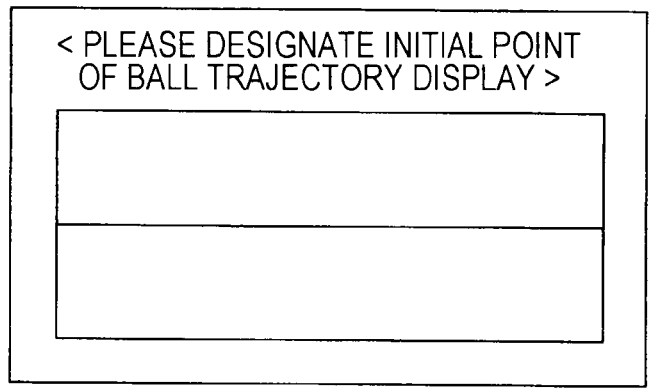
FIGS. 27A to 27C are explanatory views illustrating a selection of an initial point of a ball trajectory according to the seventh embodiment.

In addition, subsequently, as shown in FIG. 27A, the image output unit 4 displays an image, in which the designation of an initial point is requested, to the output device 40 (display device).

In FIG. 27A, an image that shows two-stage frame and a message "please designate an initial point of a ball trajectory display". For example, when receiving information indicating a designation of an end point from the moving subject display end point designating unit 81, the input image selecting unit 2 provides an instruction to the image output unit 4 to output an image as shown in FIG. 27A, and according to this instruction, the output unit 4 supplies the image data for the designation to the output device 40.

In addition, the image for the designation of the ball trajectory display initial point is not limited to that shown in FIG. 27A. For example, only the message text may be changed while the motion transition image of FIG. 26A is displayed.

Figure 27B:
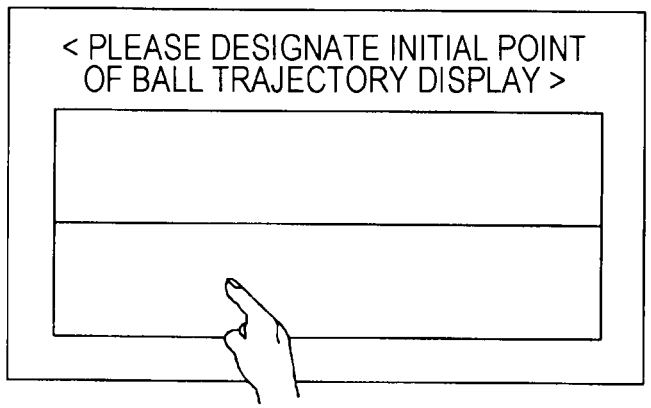
Figure 27C:
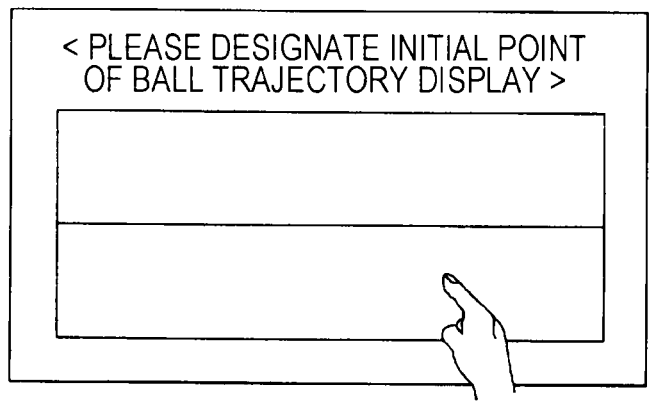

For example, with respect to the display as shown in FIG. 27A, a user designates an area in the image through a touch panel operation or the like. FIG. 27B is an example where a user designates a portion (a location corresponding to one third of the lower stage in the transverse direction) close to a left end of a lower stage, and FIG. 27C is an example where a user designates a portion (a location corresponding to three fourths of the lower stage in the transverse direction).

When a user performs an input for designating a location, the ball trajectory display initial point designating unit 82 detects this input, and transmits location information within the designated image (for example, coordinates or a frame number of a subject image disposed at that location) to the input image selecting unit 2.

Similarly to the above-described example, a process of detecting a user designation of a moving subject display end point and a ball trajectory display initial point by a user is performed in step F240.

In step F241, the key frame determining unit 23 of the input unit selecting unit 2 automatically selects a key frame displayed as a motion transition image. This is a process of re-selecting necessary numbers of frames as a key frame among reserved key frames that are retained in the reserved key frame retaining unit 9 in consideration of a display end point of a moving subject designated at this time and a ball trajectory display initial point. A specific example of the automatic selection will be described.

When the key frames are automatically selected, in steps F242 to F249, a re-composition of the motion transition image is performed by using a selected key frame.

A coordinate calculation in step F243, a layer separation in step F244, a layer processing in step F245, a layer composition in step F246, a composition into an immediately preceding composite image in step F247, a retention of a composite image in step F248, and the updating of the immediately preceding composite image in step F249 are the same processes as those in steps F210 to F216.

That is, in this case, a plurality of re-selected key frames is sequentially read out for each frame in the reserved key frame retaining unit 9, processes in steps F242 to F249 are performed, and a motion transition image is generated.

Therefore, with respect to all of the newly automatically selected key frames, processes in steps F242 to F249 are performed, and at the point in time when in step F242, it is determined that a composition of the automatically selected key frame is completed, a motion transition image by a newly automatically selected key frame is generated, and is retained in the image output unit 4 and the image updating and retaining unit 5.

Then, the process proceeds to step F250, and a ball trajectory image is composed into the motion transition image at that point in time. In this case, ball trajectory image data retained in the ball trajectory image retaining unit 64 is transmitted to and received from the layer processing unit 3. The layer processing unit 3 performs the composition process by using the newest motion transition image data that is retained in the composite image updating and retaining unit 5 and ball trajectory image data that is supplied, and thereby generates a moving object image-attached motion transition still image.

In addition, in this case, the ball trajectory image is made to be disposed from the ball trajectory display initial point designated by a user. Therefore, the length of the ball trajectory image is adjusted.

When the ball trajectory image is composed, and the moving object image-attached motion transition still image is generated, in step F252, the moving object image-attached motion transition still image data is retained in the image output unit 4. In step F252, the image output unit 4 supplies the moving object image-attached motion transition still image data to the output device 40 to be output.

Figure 28A:
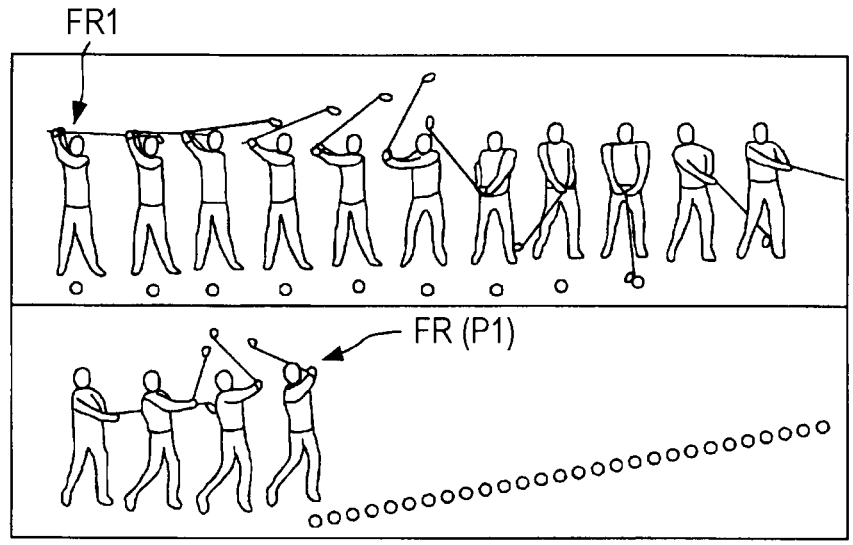
FIGS. 28A and 28B are explanatory views illustrating a moving object image-attached motion transition image according to the seventh embodiment.
Figure 28B:
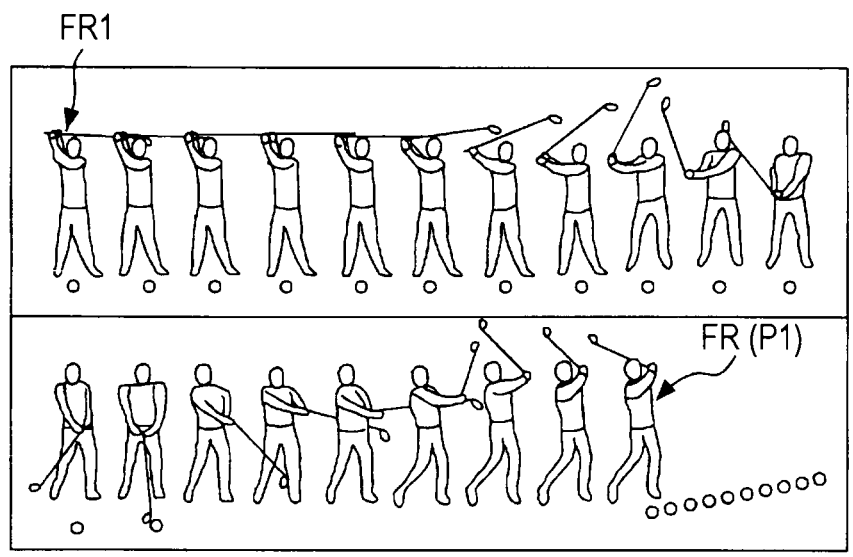

For example, a composite image in which a motion transition image of a ball trajectory image and a swing form are composed, as shown in FIGS. 28A and 28B, is output.

Here, a specific example of the automatic selection of the key frame in step F241 will be described.

First, a case where a resultant composite image as shown in FIG. 28A is output will be described. This case corresponds to a case where a user designates a frame FR(P1) as an image that becomes an end point as shown in FIG. 26B, and the one-third location of the lower stage is designated as a ball trajectory initial point as shown in FIG. 27B.

For example, at first, 22 key frames are selected among serial frame image data, such that in step F219, a motion transition image in which 22 moving subjects are arranged side by side is displayed as shown in FIG. 26A. That is, the frame FR(n) of FIG. 26 is a frame that is selected as a $22^{nd}$ key frame among the serial frames.

This is an example of a case where 11 moving subjects are disposed at the upper stage and the lower state, respectively.

Here, as shown in FIG. 26B, the frame FR(P1) that is designated by the user as the final display frame is a $19^{th}$ key frame in the motion transition image of FIG. 26B.

On the other hand, as shown in FIG. 27B, in a case where the one third location of the lower stage is designated by the user as the ball trajectory initial point, the ball trajectory image is disposed from this location. In the case of this embodiment, as described above, the motion transition image and the ball trajectory image do not overlap with each other.

The designated frame FR(P1) as the final display frame is disposed in the vicinity of the initial point location of the ball trajectory image. This initial location corresponds to a dispositional location of $15^{th}$ key frame FR(SP1) in the light of image of FIG. 26A.

That is the frame FR(P1) set as the $19^{th}$ key frame at first is set as the $15^{th}$ key frame in FIG. 28A that is finally generated, and thereby a motion transition image is generated.

Therefore, in this case, when the key frame is re-selected in step F241, the number of key frames is adjusted and the key frames are selected in such a manner that the 19$^{th}$ selected key frame at first becomes 15$^{th}$ selected key frame.

In the case of this example, among 22 frames used as the key frame at first in processes in steps F209 and F210, key frames including FR(P1) is further selected among 19 key frames from FR1 to FR(P1). 4 frames may be discarded among 19 key frames from the frame FR1 to FR(P1), or 15 frames including the frame FR(P1) and previous frames thereof may be selected using a plurality of key frames that is retained in the reserved key frame retaining unit 9.

With respect to the 15 key frames re-selected as described above, processes in steps F243 to F249 are performed, and thereby it is possible to generate a motion transition image portion of FIG. 28A.

When a composition process with respect to 15 key frames, a ball trajectory composition is performed in step F250. In this case, the composition is performed in such a manner that the ball trajectory image is disposed in the remaining two-thirds of the area of the lower stage on an image.

As a result, as shown in FIG. 28A, there is generated a moving object image-attached motion transition still image of a layout corresponding to the designation of the moving subject display end point and the ball trajectory display initial point by the user.

Next, a case where a resultant composite image as shown in FIG. 28B is output will be described. This case corresponds to a case where a user designates a frame FR(P1) as an image that becomes an end point as shown in FIG. 26B, and the three-quarters location of a lower stage is designated as a ball trajectory initial point as shown in FIG. 27C.

In this case, the frame FR(P1) designated as the final display frame by the user as shown in FIG. 26B becomes a 19$^{th}$ key frame in the motion transition image of FIG. 26.

On the other hand, as shown in FIG. 27C, when the three-quarters location of a lower stage is designated as a ball trajectory initial point by the user, from this location, the ball trajectory image is disposed. Therefore, the frame FR(P1) designated as the final display frame is disposed in the vicinity of the initial point of the ball trajectory image, but this initial point location corresponds to a dispositional location of 20$^{th}$ key frame FR(SP2) in the light of the image of FIG. 26A.

That is, the frame FR(P1) set as 19$^{th}$ key frame at first is set as the 20$^{th}$ key frame in FIG. 28B that is finally generated, and thereby a motion transition image is generated.

Therefore, in this case, when the key frame is re-selected in step F241, the number of key frames is adjusted and the key frames are selected in such a manner that the 19$^{th}$ selected key frame at first becomes 20$^{th}$ selected key frame.

In the case of this example, 20 key frames selected as frames including the frame FR(P1) and previous frames thereof. Form this, it can be seen that in regard to the original key frames, one frame is insufficient. Therefore, 20 frames including the frame FR(P1) and the previous frames thereof are selected by using frames retained in the reserved key frame retaining unit 9.

With respect to the 20 key frames re-selected as described above, processes in steps F243 to F249 are performed, and thereby it is possible to generate a motion transition image portion of FIG. 28B.

When a composition process with respect to 20 key frames is finished, a ball trajectory composition is performed in step F250. In this case, the composition is performed in such a manner that the ball trajectory image is disposed in the remaining one fourth area of the lower stage on an image.

As a result, as shown in FIG. 28B, there is generated a moving object image-attached motion transition still image of a layout corresponding to the designation of the moving subject display end point and the ball trajectory display initial point by the user.

As described above, in the case of the seventh embodiment, there is provided the moving subject display end point designating unit 81 as a designation unit that designates the final moving subject image of a plurality of moving subject images that is sequentially arranged side by side in a predetermined direction.

In addition, there is provided the ball trajectory display initial point designating unit 82 as a designation unit that designates an image area in which the moving object image is disposed.

Motion transition image data until the final moving subject image by the user designation detected by the moving subject display end point designating unit 81 is generated, and the composition process is performed in such a manner that the moving object image according to the moving object image data is disposed in an image area subsequent to the final moving subject image.

In addition, the ball trajectory display initial point is set as a location of the user designation detected by the ball trajectory display initial point designating unit 82. At the time of composition process, until that location, a plurality of moving subject images is arranged side by side, and the ball trajectory image is disposed in an image area subsequent to the final moving subject.

According to the operation of this embodiment, the user can designate an operational range that is expressed by the motion transition image, or a display range of the ball trajectory image according to his preference and object, such that it is possible to obtain a composite image of a layout according to user's preference or the like.

In addition, due to the layout of the motion transition image and the ball trajectory image, it is possible to realize an image with a relative good balance.

In addition, various designation input methods by the use may be considered. A touch operation on a screen as shown in FIGS. 26A to 27C may be considered, and an operation by a mouse or a remote controller may be considered.

In addition, a menu type designation may be considered instead of designating a frame or location on a screen.

For example, as a designation menu of the moving subject display end point, items such as "backswing", "impact", and "follow-through" may be designated and selected by the user. The input image selecting unit 2 may determine a corresponding frame and set it as the moving subject display end point.

In addition, it may be a designation method where at the ball trajectory display initial point, items such as "a lower left", "center of a lower stage", and "a lower right" is selected, or a value corresponding to a location on a screen is displayed and is input. In addition, it may be a method where the number of ball images that are displayed, the length of the ball trajectory, or the like is designated and input.

In addition, as a designation range of the moving subject making up the motion transition image, not only an end point frame but also an initial point frame may be designated.

Similarly, as the ball trajectory display range, not only an initial point location but also an end point location may be designated.

In addition, it may be considered a method where various setting with respect to a range of the moving subject or a range of the ball trajectory display is pre-set, and a user selects from the pre-set setting.

However, in addition to the user's designation, an automatic adjustment for realizing a very appropriate image may be performed.

For example, it is assumed that a user designates a frame FR(P2) at a right end of the upper stage of FIG. 26B as the moving subject display end point. Furthermore, it is assumed that a user designates a left end of the lower stage as the ball trajectory display initial point.

Figure 29A:
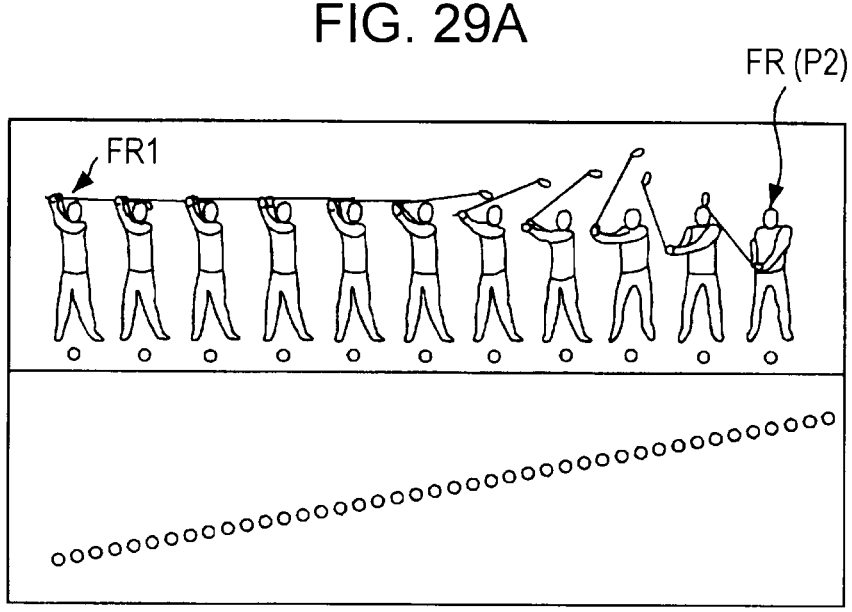
FIGS. 29A and 29B are explanatory views illustrating an adjustment of the number of moving subject images according to the seventh embodiment.

When performing the above-described processes in this assumption state as is, a composite image as shown in FIG. 29A is generated. The user may want this image, but the opposite situation may be frequently present. For example, a case where the user is not familiar with the operation, a case where the designation is performed without being deeply considered, or the like may be exemplified. In this case, the operation transition image and the ball trajectory image are divided into the upper stage and the lower stage, resulting in an image with a bad balance or an image that is not powerful.

Therefore, a disposition with good balance to some degree may be set in advance and a function of automatically adjusting a disposition layout may be provided.

Figure 29B:
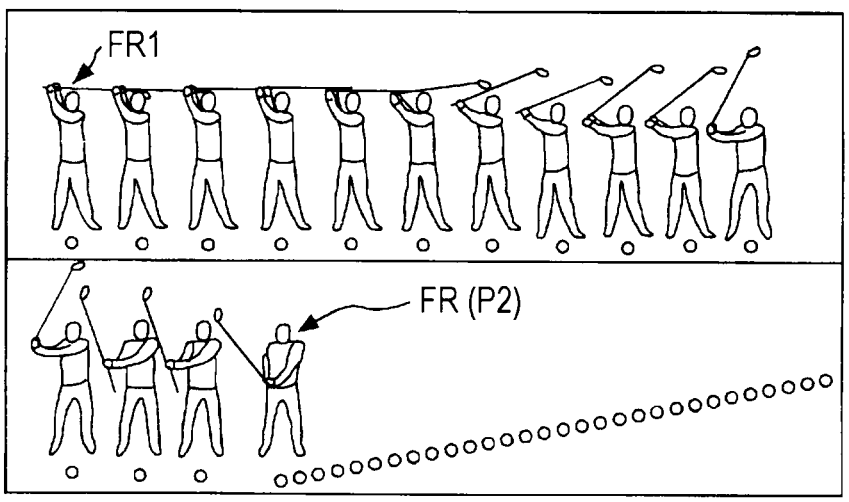

For example, an area up to one third of the lower stage may be set for the motion transition image, the remaining two-thirds of the area of the lower stage may be set for the ball trajectory image, and so on. All this may be set as appropriate examples. In a case where the designation operation is performed to generate an image as shown in FIGS. 29A and 29B, the ball trajectory display initial point is automatically changed to the one third location of the lower stage according to this setting. Furthermore, according to this, the selection of the key frame in step F241 is performed such that the designated frame FR(P2) is present at a location in vicinity of the ball trajectory display initial point after the change.

In this manner, it is possible to generate a composite image as shown in FIG. 29B, in which the motion transition image and the ball trajectory image are in good valance.

When such a function of performing a layout automatic adjustment is provided, it is possible to be easily used by a relatively unskilled user.

Actually, at the point in time when user's designation is received, in a case where it is determined that the resultant image has bad balance by the image processing apparatus 1, when the composition process is performed according to this designation, the performing of the automatic adjustment function may be considered.

Furthermore, the image composing process is performed according to the user's designation and a composite image is presented. When the user does not like the composite image and makes an instruction for adjustment, it may be considered that the automatic adjustment function is put into operation, and a composite image that is adjusted again is generated.

9. Eighth Embodiment

Hereinafter, an eighth embodiment will be described. In the embodiments described until now, an example where the composition process is performed based on serial frame image data obtained by capturing a scene in which a subject person hits a ball through a golf swing. That is, this corresponds to a case where in frame image data of the captured image the ball is present as a subject.

On the other hand, it is also possible to generate a moving object image-attached motion transition still image obtained by composing a ball trajectory image by using serial frame image data obtained by capturing a scene in which a subject person performs a practice swing without hitting a ball. In an eighth embodiment, a composition process using frame image data as a practice swing image will be described.

Figure 30:
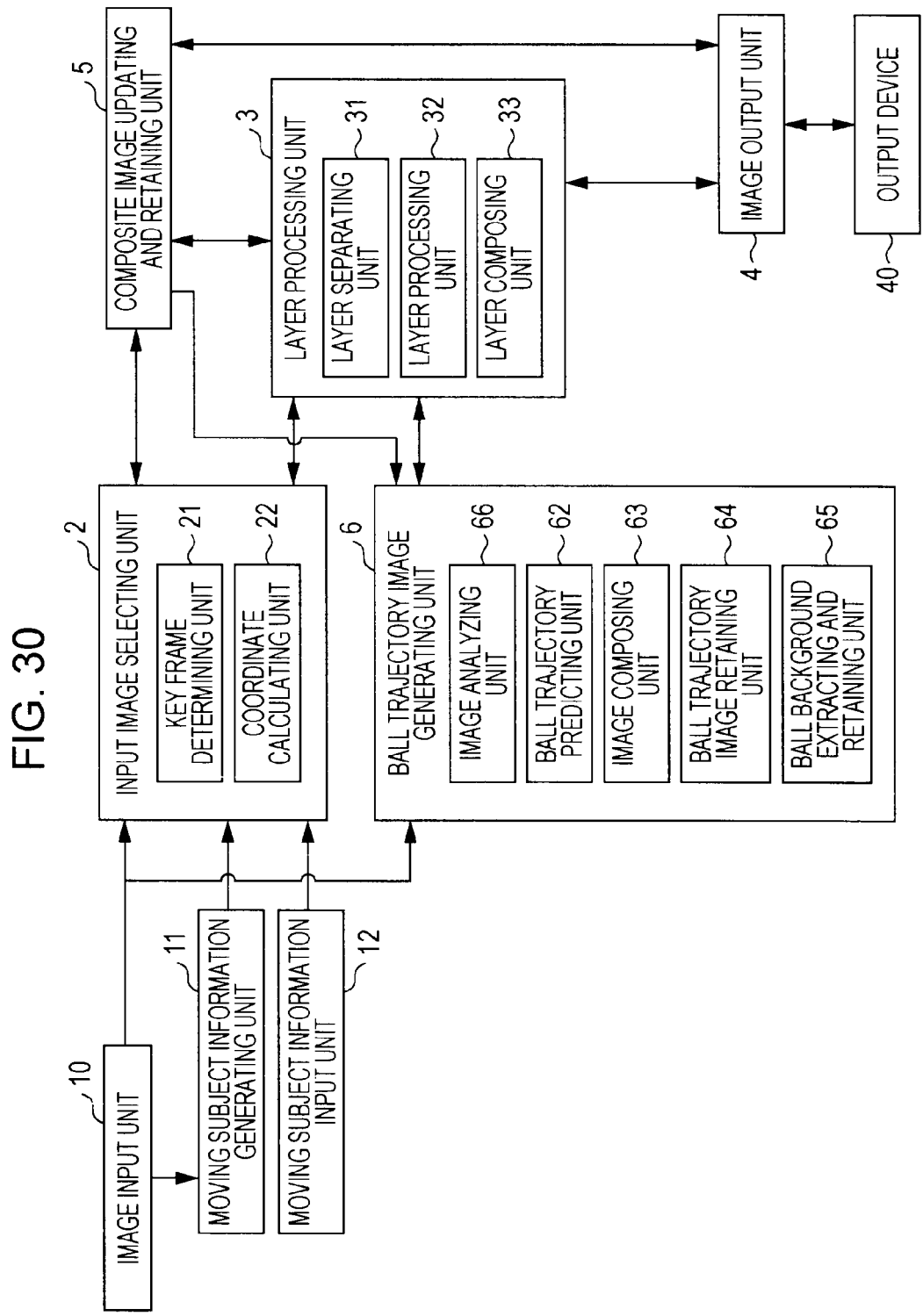
FIG. 30 is a block diagram illustrating a configuration of an image processing apparatus according to an eighth embodiment.

FIG. 30 shows a configuration example of the image processing apparatus 1. FIG. 30 is different from FIG. 4 in that the ball information generating unit 13 and the ball information input unit 14 are not provided, and an image analyzing unit 66 is provided instead of the ball coordinate calculating unit 61 in the ball trajectory image generating unit 6.

When a motion transition image retained in the composite image updating and retaining unit 5 is input, the image analyzing unit 66 analyzes an operation of a moving subject.

Figure 31:
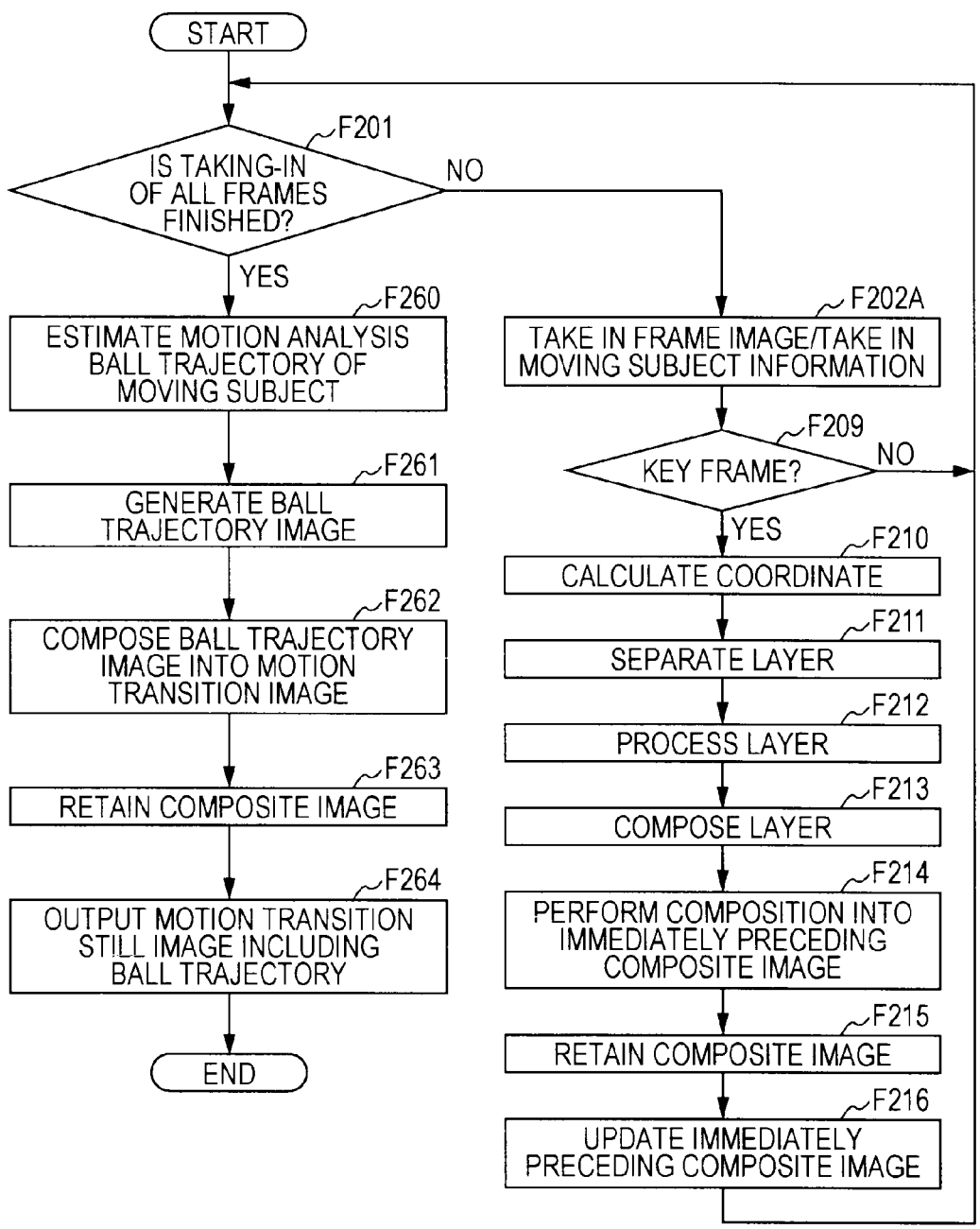
FIG. 31 is a flow chart illustrating a process of generating a moving object image-attached motion transition image according to the eighth embodiment.

FIG. 31 shows a process example of the image processing apparatus 1.

The serial frame image data that is input is an image captured when the subject person performs a practice swing.

In step F201, the input image selecting unit 2 determines whether the taking-in of serial frame image data is terminated.

At a point in time when the serial frame image data is sequentially input, in step F202A, the input image selecting unit 2 performs the taking-in of the frame image data and moving subject information.

In step F209, it is determined whether or not the frame image data taken-in is a key frame.

In the case of the key frame, in steps F210 to F216, the composition process of the motion transition image. This process is the same as steps F210 to F216 in FIG. 18 or the like.

When the taking-in of the serial frame image data that is an object is terminated, the process proceeds to step F260. In step F260, the image analyzing unit 66 of the ball trajectory image generating unit 6 performs an analysis of a moving subject that is retained in the composite image updating and retaining unit 5 at that point in time. For example, a movement trajectory and a moving speed of a golf club head are analyzed. The moving speed may be estimated by a time interval of each frame and a positional variation on an image. In addition, a club head angle in an image corresponding to the moment of impact is determined.

When the movement trajectory and the moving speed of the golf club head, the head angle at the moment of impact, or the like are analyzed, the ball trajectory predicting unit 62 estimates the ball trajectory. That is, from situations of the analyzed golf club, a ball trajectory, which is not present actually during image-capturing, is estimated.

In step F261, according to the estimated ball trajectory information, the image composing unit 63 generates ball trajectory image data, and the ball trajectory image data is retained in the ball trajectory image retaining unit 64.

In step F262, a process of composing the ball trajectory image into the motion transition image generated in steps F209 to F216. That is, the ball trajectory image data retained in the ball trajectory image retaining unit 64 is transmitted to and received from the layer processing unit 3. The layer processing unit 3 performs a process of composing the newest motion transition image data retained in the composite image updating and retaining unit 5 and the ball trajectory image data.

The composed composite date is transmitted to the image output unit 4 in step F263, and is stored and retained therein. In step F264, the image output unit 4 outputs the composite image data that is retained at that point in time, that is, a motion transition image to which the ball trajectory is composed to the output device 40 as moving object image-attached motion transition still image data.

In this manner, one sheet of moving object image-attached motion transition still image data is generated and output by the image processing apparatus 1 of this embodiment.

According to this eighth embodiment, from frame image data obtained by capturing a practice swing performed without hitting a ball, it is also possible to obtain a composite image in which a ball trajectory image, such that it is possible to realize an image for confirming a form, or a highly entertaining image.

10. Modification

Hereinbefore, various embodiments is described, but the present disclosure is not limited to the above-described each example, but various modifications may be considered.

First, it is needless to say that processes described in plural embodiments among the first to eighth embodiments may be combined.

In the embodiments, an example where a moving object image-attached motion transition still image is output is described, but a motion transition moving picture may be output.

For example, in regard to a process example in FIG. 11, in step F109, when the image output unit 4 supplies composite image data at that point in time to a display device as the output device 40, a moving picture that sequentially expresses moving subject images may be displayed.

To more specifically express the moving picture, the composition is performed with respect to frame image data other than the key frame, and each composite image data may be supplied to the output device 40 as a frame making up each moving picture.

In the embodiments, an image of a subject who performs a golf swing is described as an example, but the subject is not limited thereto. For example, the motion transition image of the moving subject may be generated by using frame image data obtained by capturing various operations such as the swing of a bat and a pitching form of baseball, the swing of a racket of tennis, a serve or spike of volleyball, a shot of basketball, and a rolling of bowling as a subject. In this case, a baseball ball, a tennis ball, a volleyball ball, or the like is expressed as the moving object, and thereby it is possible to generate a meaningful composite image.

This moving object is not limited to the ball as a spherical body.

As a moving object whose location is changed according to serial motions of the moving subject, Frisbee, javelin of javelin throw, a shot of shot put, a badminton shuttle, a rugby ball, In addition, a composite image in various subjects may be considered in regard to various games or normal activities related to daily living other than sports.

In the embodiments, as a screen example of a composite image, an example where the composite image proceeds from a left side to a right side of the motion transition image on a screen having two stages of upper and lower stages is exemplified, but the screen example is not limited thereto.

The screen may have a one stage configuration, or a configuration other than three stages. In addition, a plurality of columns that is vertically divided may be adopted.

Directionality for disposing the moving subject according to the elapse of time may be from a left side to a right side, from a right side to a left side, from an upper side to a lower side, or from a lower side to an upper side. In addition, an oblique direction may be also present. In addition, the directionality may be selected depending on a kind of subject.

11. Program

In the above-described embodiments, the description is made with reference to the image processing apparatus 1, but the image processing apparatus 1 according to the present disclosure may be applied to various apparatuses that perform an image processing in addition to be applied to an apparatus dedicated for generating the motion transition image. For example, an image reproducing apparatus, an image capturing apparatus, a communication apparatus, an image recording apparatus, a game machine, a video editing apparatus, or the like may be assumed.

In addition, in regard to an information processing apparatus other than a general purpose personal computer, it may be assumed to realize the image processing apparatus 1.

For example, when a program that allows a calculation processing device to execute each process of FIG. 11 (and FIG. 12), FIG. 18, FIG. 23, FIG. 25, and FIG. 31 is provided as image processing application software, it is possible to realize an appropriate image processing in a personal computer or the like.

That is, a program realizing the image processing of the image processing apparatus 1 is a program that allows the calculation processing device to execute each of the following steps.

Specifically, the program allows the calculation processing device to execute a step of generating motion transition image data expressing a motion transition of a moving subject in such a manner that moving subject images are sequentially arranged side by side in a predetermined direction by performing a composition process using the moving subject images included in a plurality of frame image data that is input.

In addition, the program allows the calculation processing device to execute a step of generating moving object image expressing a moving object that moves according to the motion transition of the moving subject images.

In addition, the program allows the calculation processing device to execute a step of performing a composition process that generates a moving object image-attached motion transition image data including the moving object images by composing the moving object image data and the motion transition image data.

Due to such a program, the embodiments of the present disclosure may be adopted to allow various information processing apparatus using image data in addition to a personal computer, a cellular phone, a personal digital assistant (PDA) to perform the image processing.

In addition, such various programs may be recorded in advance in an HDD that is embedded in a personal computer or the like as a recording medium, a ROM, a flash memory, or the like in a microcomputer that has a CPU.

In addition, the program may be temporarily or permanently stored (recorded) in a removable recording medium such as a flexible disk, a CD-ROM (Compact Disc Read Only Memory), a MO (magneto-optical) disc, a DVD, a Blu-ray disc, a magnetic disk, a semiconductor memory, a memory card or the like. This removable recording medium may be provided as so-called package software.

In addition, the program may be downloaded from a download site over a network such as a LAN (Local Area Network) and the Internet, in addition to being installed on a personal computer or the like from the removable recording medium.

The present disclosure contains subject matter related to that disclosed in Japanese Priority Patent Application JP 2010-240299 filed in the Japan Patent Office on Oct. 27, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus, comprising:
circuitry configured to
input frame image data of a moving person and a moving object,
determine whether the moving person in the input frame image data meets a predetermined condition,
generate motion transition image data expressing a motion transition of the moving person in such a manner that a plurality of moving person images are sequentially arranged side by side in a predetermined direction by performing a composition process using moving person images included in a plurality of frame image data, and
when the moving person in the input frame image data satisfies the predetermined condition
compose the moving object image data expressing the moving object that moves according to the motion transition image data of the moving person images,
generate moving object trajectory image data based on a trajectory determining process performed on the moving object of the moving object image data when the input frame satisfies the predetermined condition,
wherein the circuitry overlays the moving object trajectory image data on a portion of the motion transition image data following an image data frame in which the moving person satisfies the predetermined condition,
the frame image data is captured in ambient lighting, and
the moving object is a ball, a frisbee, a javelin or a badminton shuttle.

2. The image processing apparatus according to claim 1, wherein the predetermined condition is an end to an impact of the moving object or a release of the moving object.

3. The image processing apparatus according to claim 1, wherein the trajectory determining process on the moving object includes,
a process of predicting, by using a location of the moving object image present in the input frame image data, a location of the moving object after a point in time when the moving object is expressed by the frame image data, and of determining a movement trajectory of the moving object.

4. The image processing apparatus according to claim 1, wherein the trajectory determining process on the moving object is a process of determining a movement trajectory of the moving object based on moving object trajectory information that is input.

5. The image processing apparatus according to claim 1, wherein the trajectory determining process on the moving object is a process of analyzing a moving person motion expressed by the motion transition image data, and of determining a movement trajectory of a moving object that is not present in the input frame image data as an image.

6. The image processing apparatus according to claim 1, wherein the circuitry is further configured to output the moving object image-attached motion transition image data.

7. The image processing apparatus according to claim 1, wherein the circuitry performs a composition process of the moving object trajectory image data and the motion transition image data in such a manner that the moving object image is arranged at an image area subsequent to a final moving person image of the plurality of moving person images that is sequentially arranged side by side in a predetermined direction.

8. The image processing apparatus according to claim 7, wherein the circuitry performs the composition process by using a background image included in the frame image data as a background image of an image area in which the moving object image is arranged.

9. The image processing apparatus according to claim 7, wherein the circuitry performs the composition process by using a background image not included in the frame image data as a background image of an image area in which the moving object image is arranged.

10. The image processing apparatus according to claim 7, wherein the circuitry is further configured to designate the final moving person image of the plurality of moving person images that is sequentially arranged side by side in a predetermined direction, and
generate a motion transition image data until the final moving person image designated, and perform the composition process of the moving object trajectory image data and the motion transition image data in such a manner that a moving object image according to the moving object image data is disposed at an image area subsequent to the final moving person image.

11. The image processing apparatus according to claim 7, wherein the circuitry is further configured to designate an image area in which the moving object image is disposed, and
perform the composition process of the moving object trajectory image data and the motion transition image data in such a manner that the plurality of moving person images are arranged side by side in an image area until reaching the image area designated, and the moving object image according to the moving object image data is arranged in the designated image area that is subsequent to the final moving person image.

12. The image processing apparatus according to claim 1, wherein the circuitry is further configured to designate one moving person image among the plurality of moving person images that is sequentially arranged side by side in a predetermined direction, and
perform a composition process of an enlarged image of the moving person image designated and the moving object trajectory image data.

13. The image processing apparatus according to claim 1, wherein the circuitry generates the moving object trajectory image data by using a moving object image included in the input frame image data.

14. The image processing apparatus according to claim 1, wherein the circuitry generates the moving object trajectory image data by using an image other than a photographed moving object image included in the input frame image data.

15. The image processing apparatus according to claim 1, wherein the circuitry generates the motion transition image data by selecting a plurality of key frames from the input frame image data, and by sequentially arranging moving person subject images extracted from the selected plurality of key frames side by side in a predetermined direction.

16. The image processing apparatus according to claim 1, wherein the circuitry generates the motion transition image data by performing the composition process in a state where a moving person layer of a newest input frame image data has a first priority, a moving person layer of the frame image data according to a immediately preceding composition process has a second priority, a remaining background layer of the newest input frame image data has a third priority, and a remaining background layer of the frame image data according to the immediately preceding composition process has a fourth priority.

17. An image processing method, comprising:
  determining whether a moving person in input frame image data meets a predetermined condition, the input frame including the moving person and a moving object;
  generating motion transition image data expressing a motion transition of the moving person in such a manner that moving person images are sequentially arranged side by side in a predetermined direction by performing a composition process using the moving person images included in a plurality of frame image;
  when the moving object in the input frame data meets the predetermined condition
    composing moving object image data expressing a moving object that moves according to the motion transition of the moving subject images, and
    generating a moving object trajectory image data based on a trajectory determining process performed on the moving object of the moving object image data; and
  overlaying the moving object trajectory image data on a portion of the motion transition image data following an image data frame in which the moving person satisfies the predetermined condition,
  wherein the frame image data is captured in ambient lighting, and the moving object is a ball, a frisbee, a javelin or a badminton shuttle.

18. A non-transitory computer-readable medium encoded with computer-readable instructions thereon, the computer-readable instructions when executed by a computer cause the computer to perform a method comprising:
  determining whether a moving person in input frame image data meets a predetermined condition, the input frame including the moving person and a moving object;
  generating motion transition image data expressing a motion transition of the moving person in such a manner that moving person images are sequentially arranged side by side in a predetermined direction by performing a composition process using the moving person images included in a plurality of frame images;
  when the moving object in the input frame data meets the predetermined condition
    composing moving object image data expressing a moving object that moves according to the motion transition of the moving subject images, and
    generating a moving object trajectory image data based on a trajectory determining process performed on the moving object of the moving object image data; and
  overlaying the moving object trajectory image data on a portion of the motion transition image data following an image data frame in which the moving person satisfies the predetermined condition,
  wherein the frame image data is captured in ambient lighting, and the moving object is a ball, a frisbee, a javelin or a badminton shuttle.

* * * * *